Oct. 7, 1941.  H. ANDERSON  2,257,777
MACHINE FOR SHAPING AND SEALING FILLED PAPER BAGS
Filed Sept. 13, 1939  51 Sheets-Sheet 1

INVENTOR
HELMER ANDERSON
BY
ATTORNEY

Oct. 7, 1941. H. ANDERSON 2,257,777
MACHINE FOR SHAPING AND SEALING FILLED PAPER BAGS
Filed Sept. 13, 1939 51 Sheets-Sheet 3

INVENTOR
HELMER ANDERSON
BY *Arthur R. Wylie*
ATTORNEY

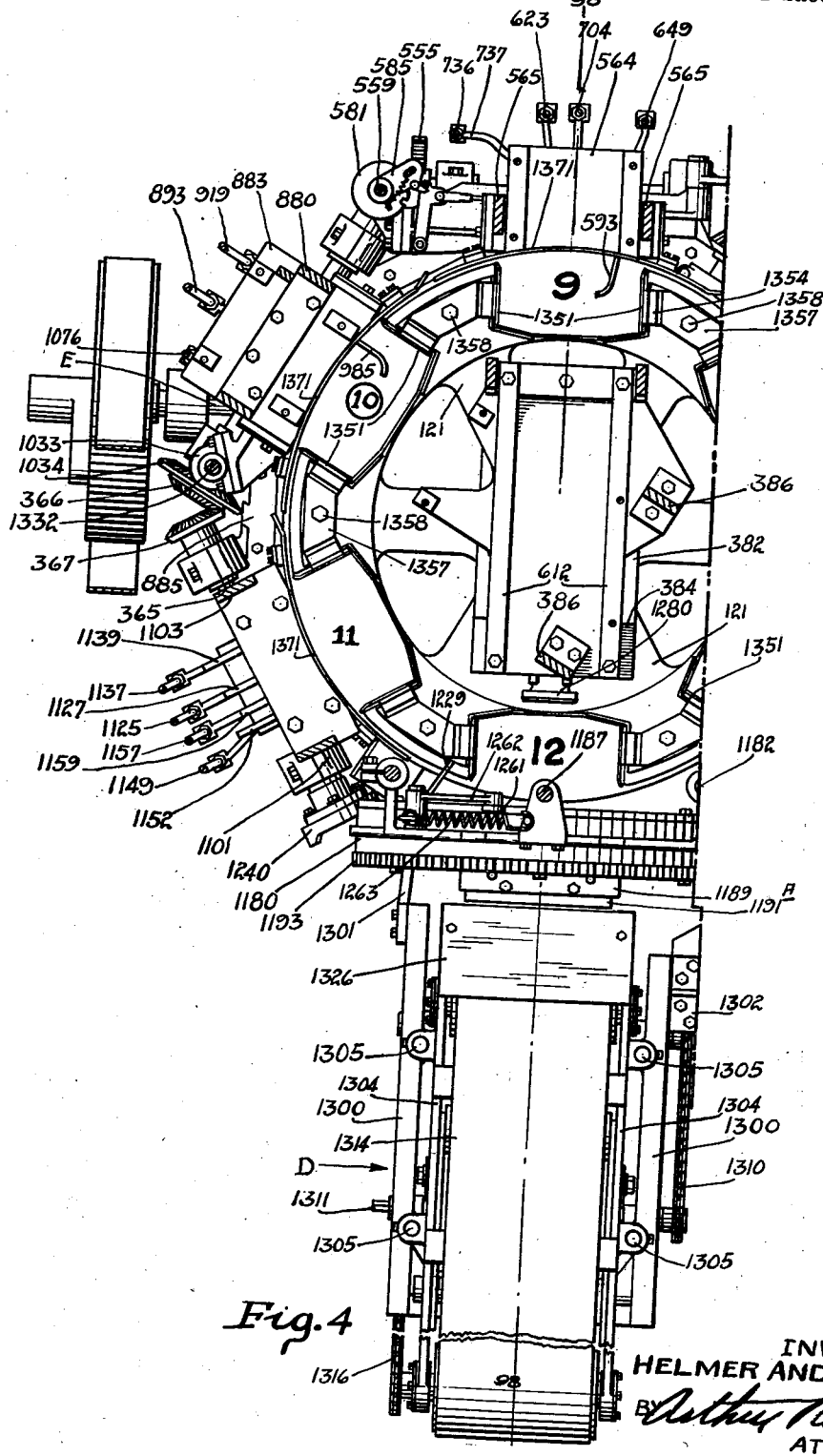

Oct. 7, 1941.   H. ANDERSON   2,257,777
MACHINE FOR SHAPING AND SEALING FILLED PAPER BAGS
Filed Sept. 13, 1939   51 Sheets-Sheet 5

INVENTOR
HELMER ANDERSON
BY Arthur R. Wylie
ATTORNEY

Oct. 7, 1941.  H. ANDERSON  2,257,777
MACHINE FOR SHAPING AND SEALING FILLED PAPER BAGS
Filed Sept. 13, 1939  51 Sheets-Sheet 11

INVENTOR
HELMER ANDERSON
BY Arthur R. Wylie
ATTORNEY

Oct. 7, 1941.   H. ANDERSON   2,257,777
MACHINE FOR SHAPING AND SEALING FILLED PAPER BAGS
Filed Sept. 13, 1939   51 Sheets-Sheet 12
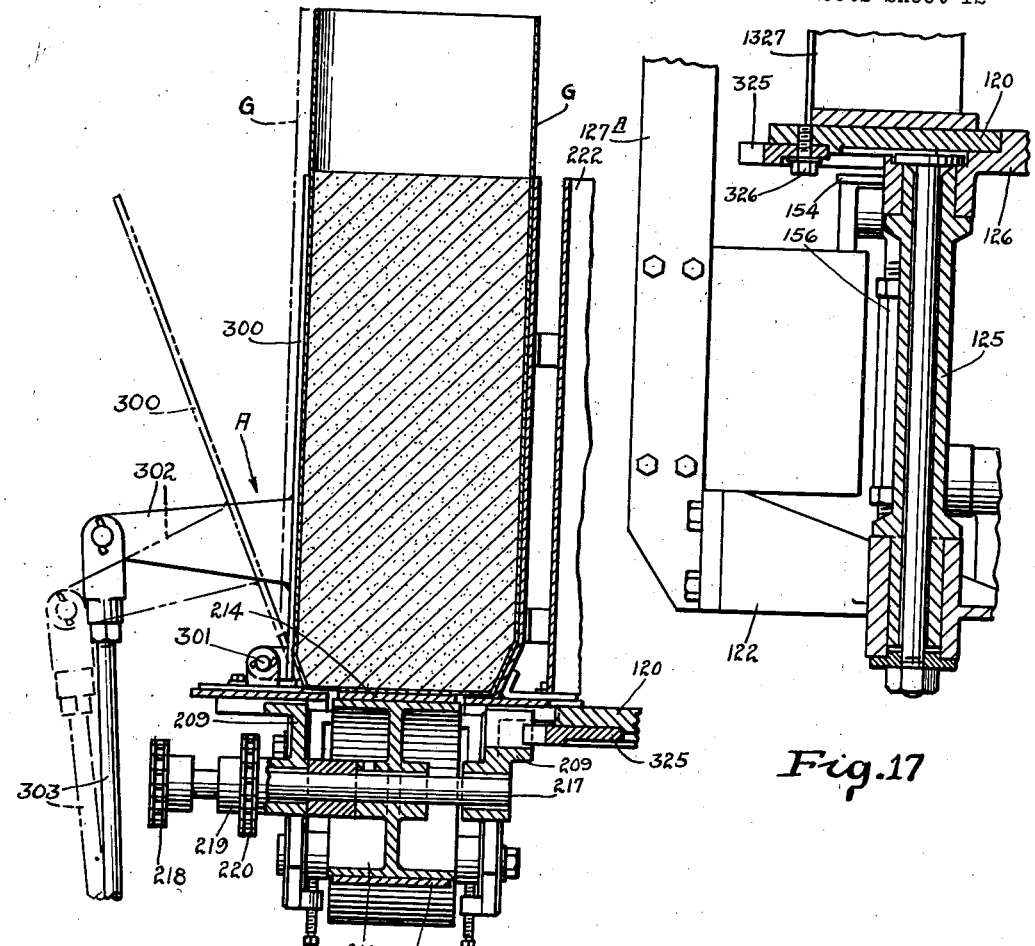
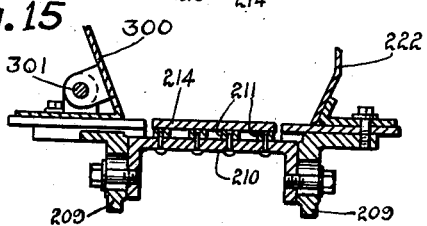
Fig.15
Fig.16
Fig.17
INVENTOR
HELMER ANDERSON
ATTORNEY

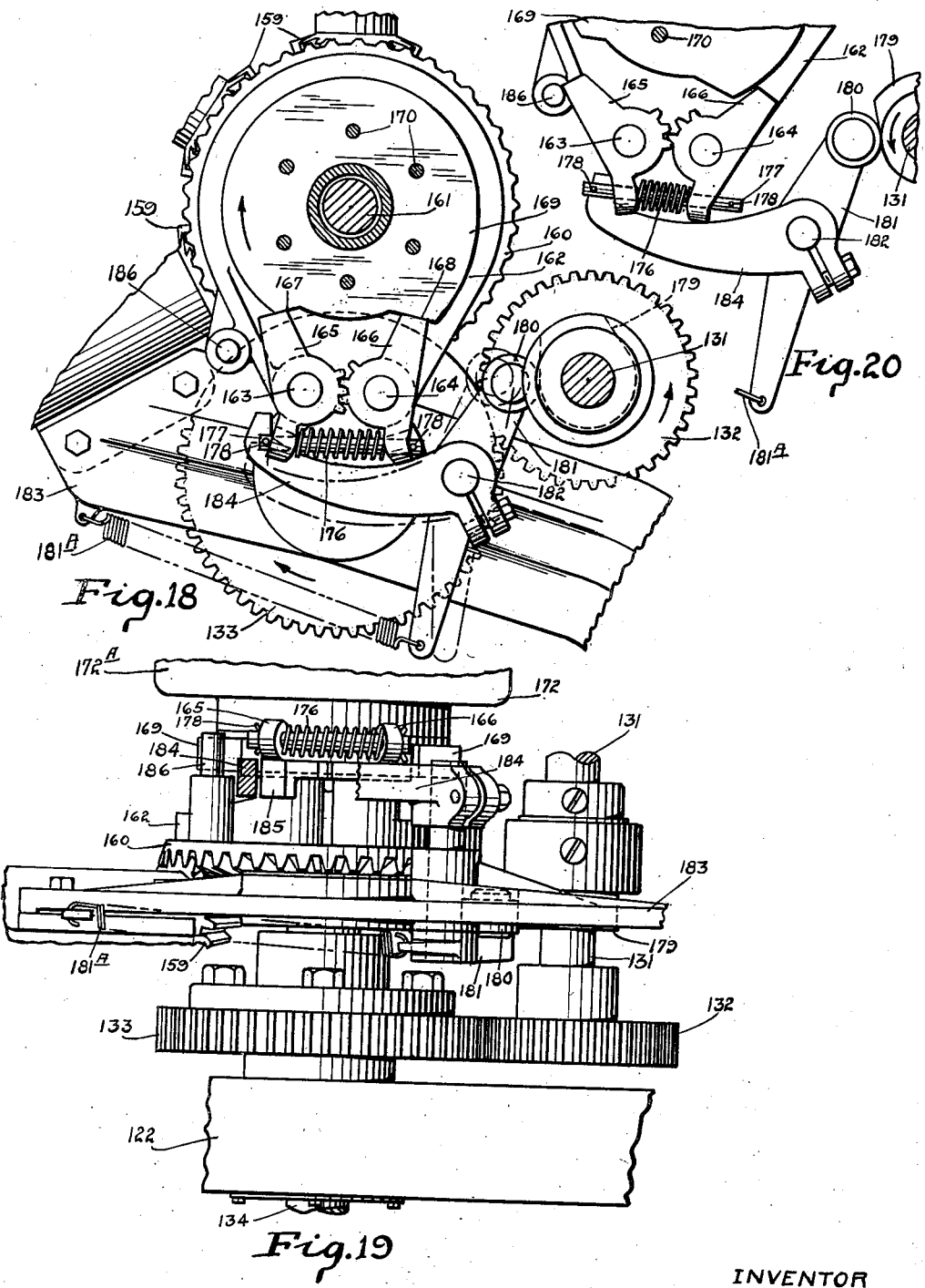

Oct. 7, 1941.  H. ANDERSON  2,257,777
MACHINE FOR SHAPING AND SEALING FILLED PAPER BAGS
Filed Sept. 13, 1939  51 Sheets-Sheet 14
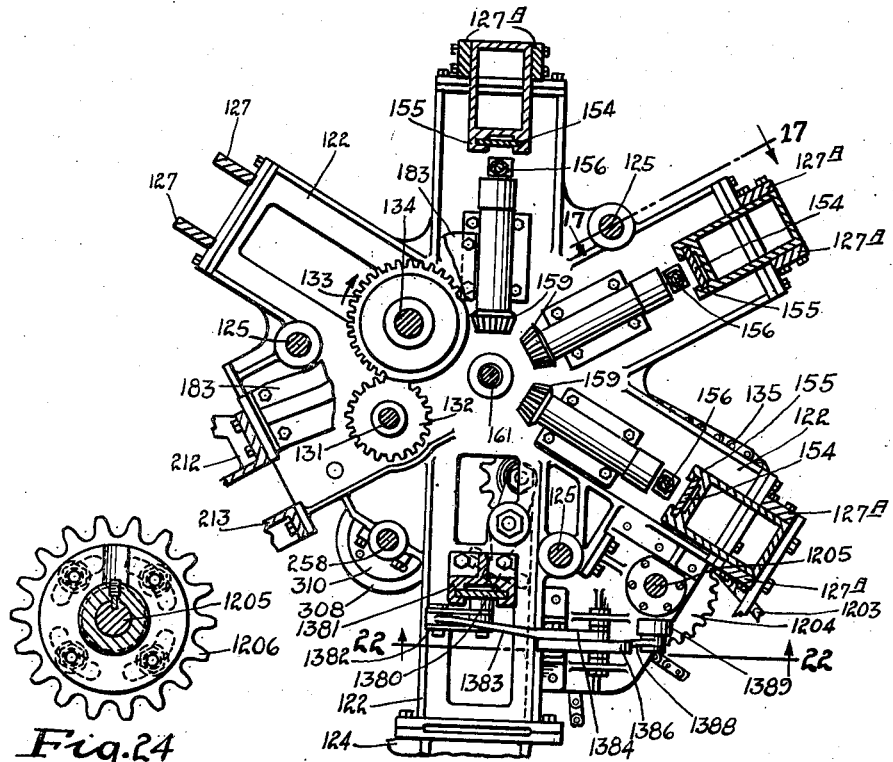
Fig. 21
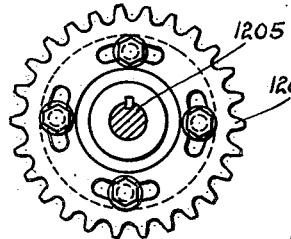
Fig. 24
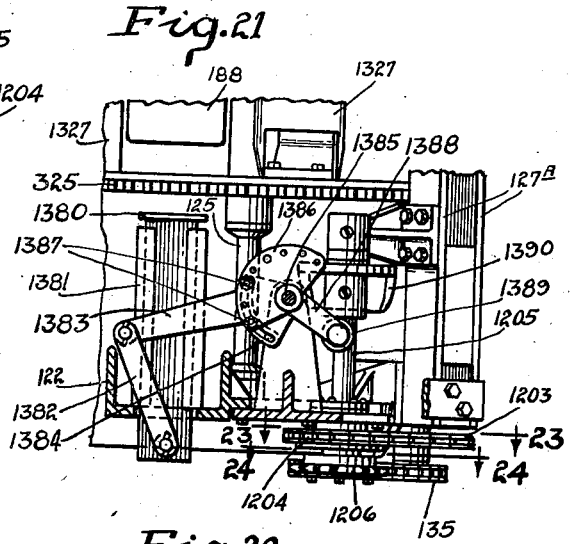
Fig. 23
Fig. 22
INVENTOR
HELMER ANDERSON
BY Arthur R. Clyde
ATTORNEY

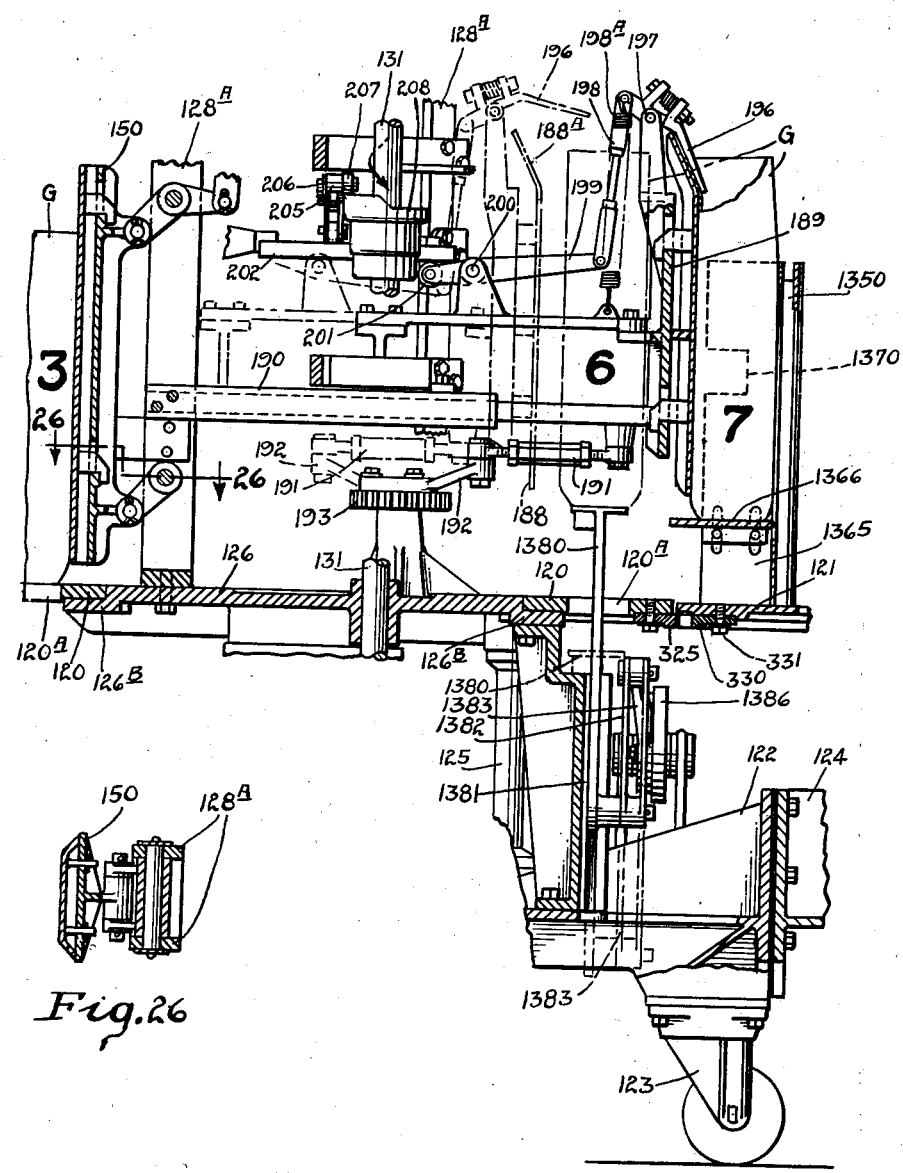

Oct. 7, 1941.  H. ANDERSON  2,257,777
MACHINE FOR SHAPING AND SEALING FILLED PAPER BAGS
Filed Sept. 13, 1939  51 Sheets-Sheet 17
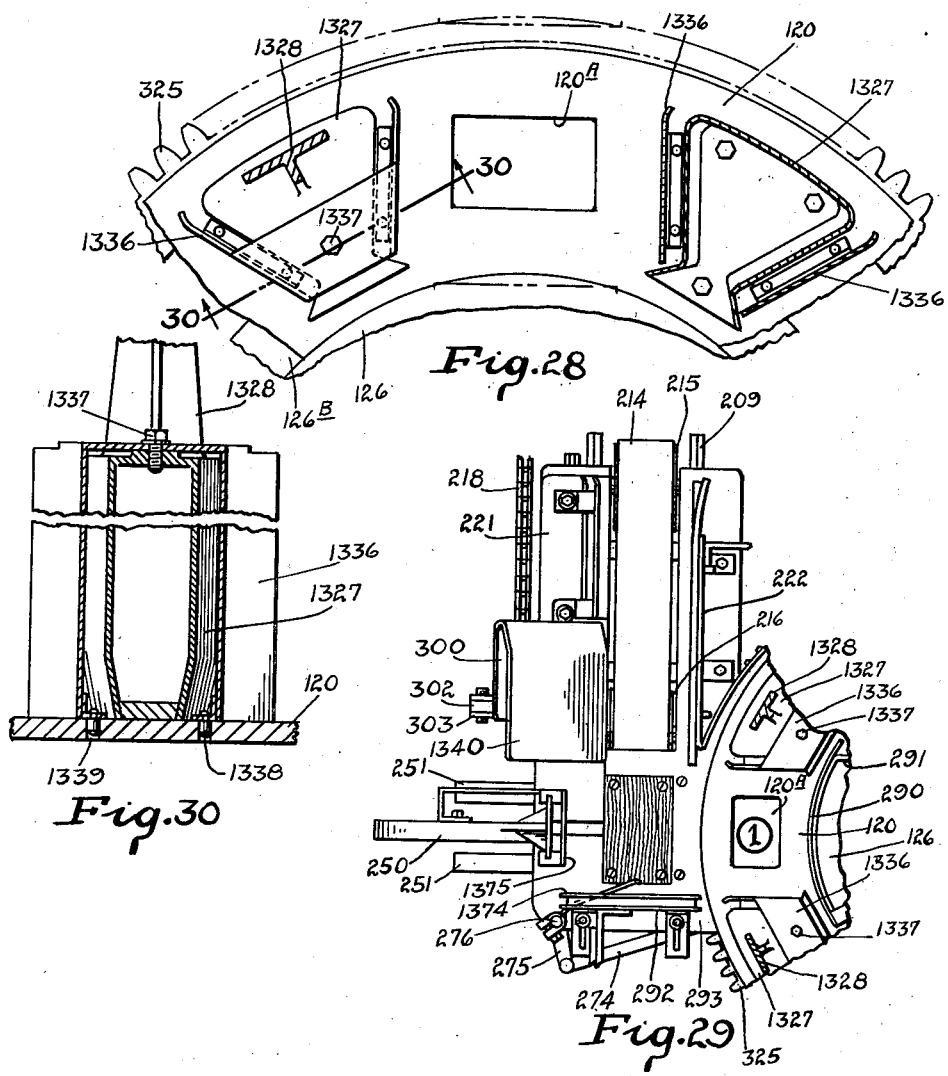
INVENTOR
HELMER ANDERSON
BY *Arthur R. Libbey*
ATTORNEY Oct. 7, 1941.	H. ANDERSON	2,257,777
MACHINE FOR SHAPING AND SEALING FILLED PAPER BAGS
Filed Sept. 13, 1939	51 Sheets-Sheet 19

INVENTOR
HELMER ANDERSON
ATTORNEY

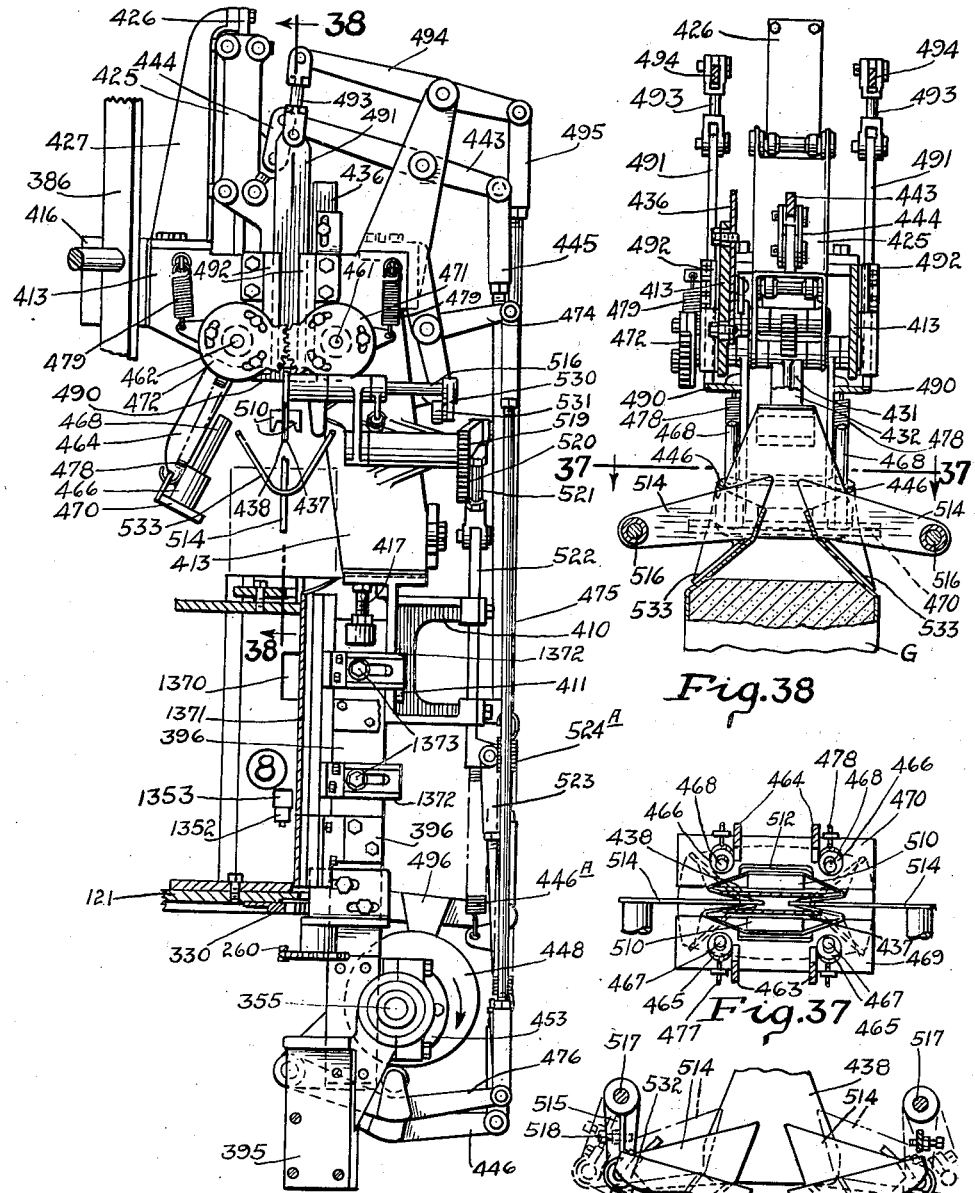

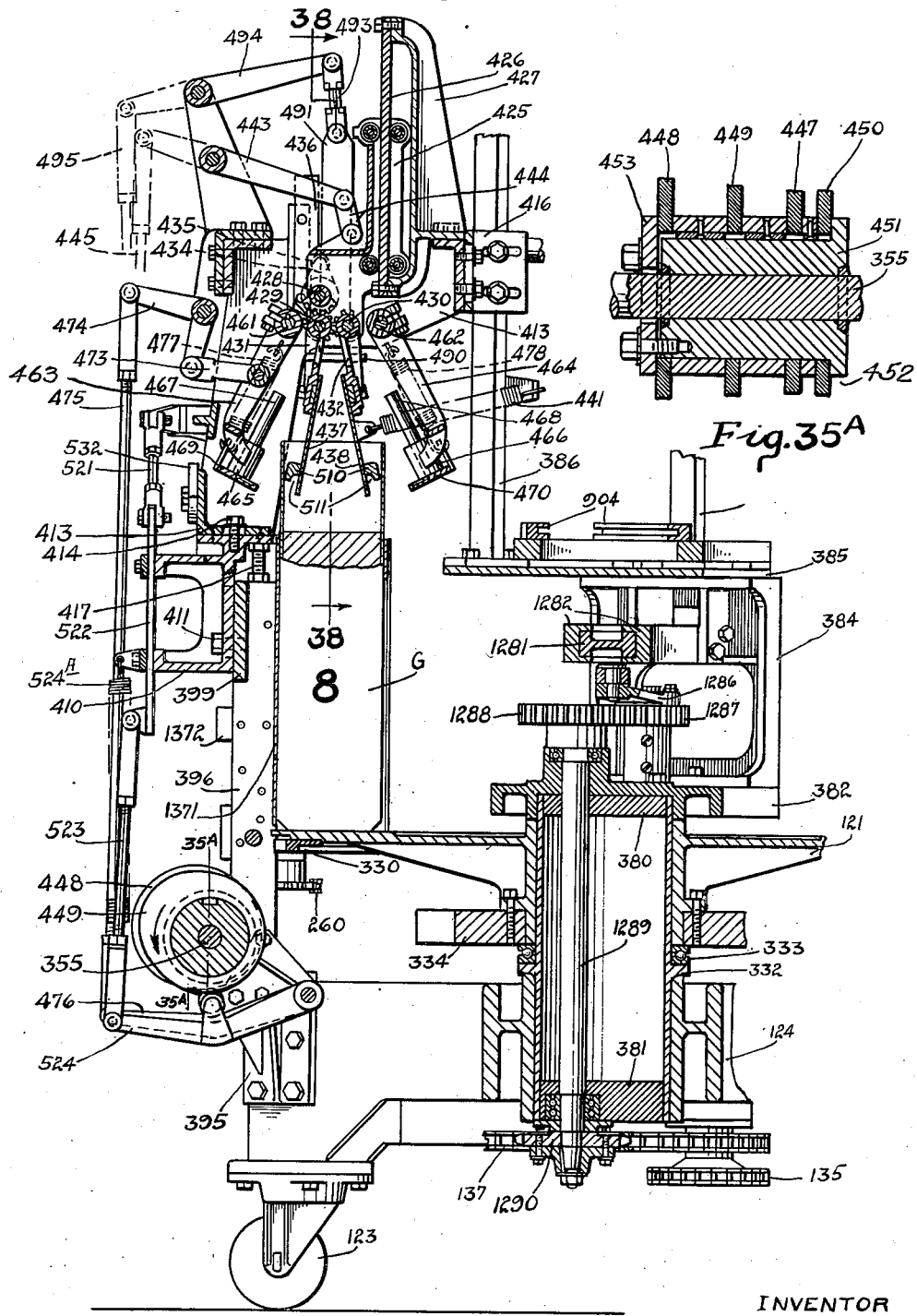

Oct. 7, 1941.  H. ANDERSON  2,257,777
MACHINE FOR SHAPING AND SEALING FILLED PAPER BAGS
Filed Sept. 13, 1939  51 Sheets-Sheet 23
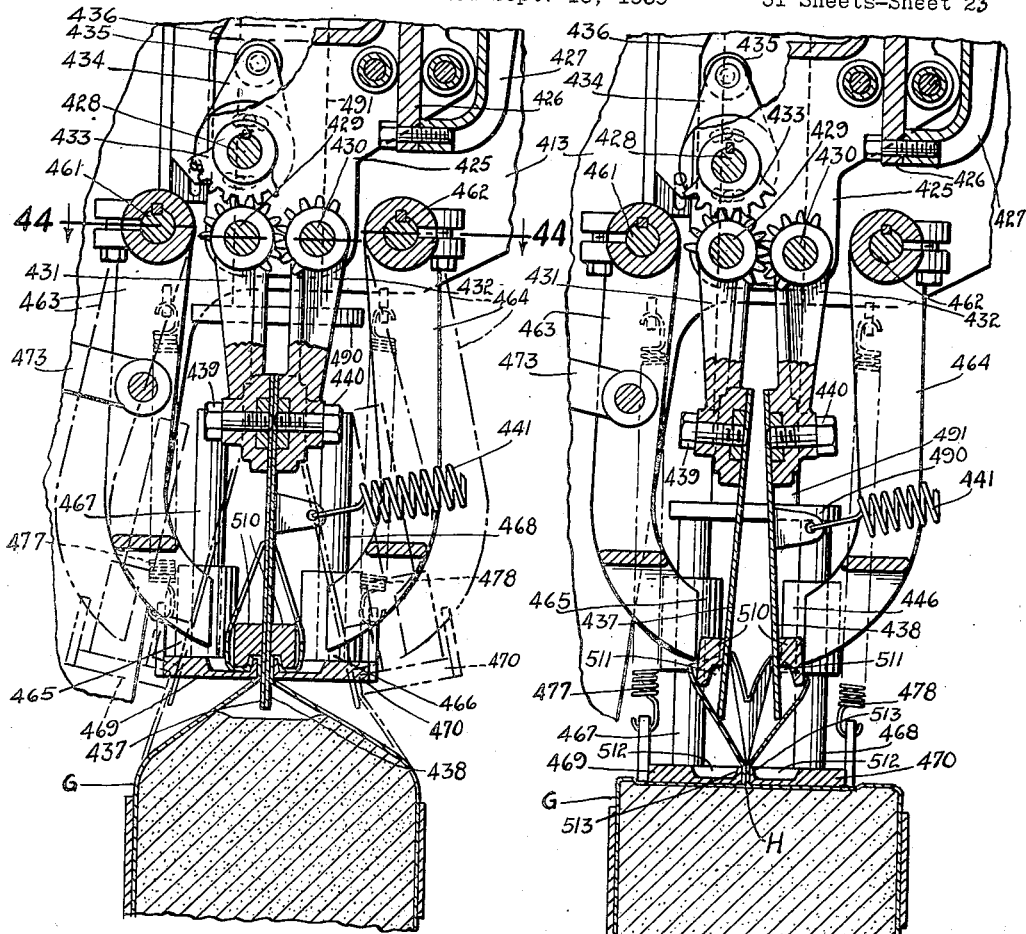
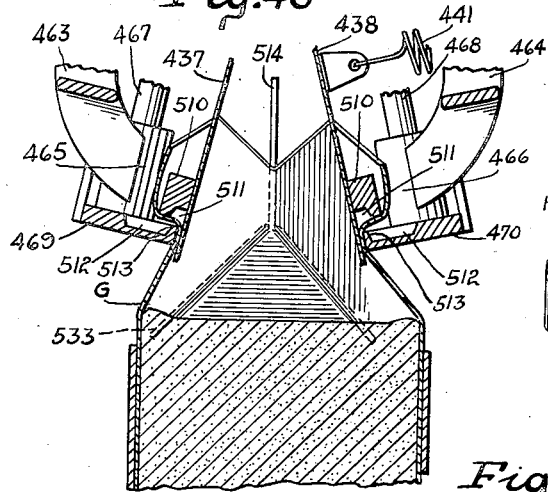
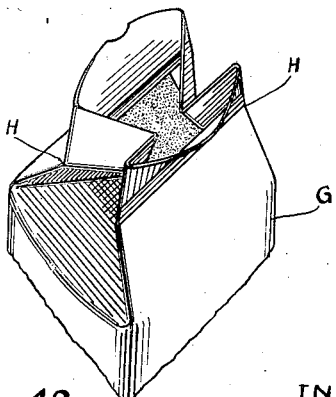
INVENTOR
HELMER ANDERSON
ATTORNEY Oct. 7, 1941.   H. ANDERSON   2,257,777
MACHINE FOR SHAPING AND SEALING FILLED PAPER BAGS
Filed Sept. 13, 1939   51 Sheets-Sheet 26

INVENTOR
HELMER ANDERSON
BY Arthur R. Clyde
ATTORNEY

Oct. 7, 1941.   H. ANDERSON   2,257,777
MACHINE FOR SHAPING AND SEALING FILLED PAPER BAGS
Filed Sept. 13, 1939   51 Sheets-Sheet 27

INVENTOR
HELMER ANDERSON
BY Arthur R. Blythe
ATTORNEY

Oct. 7, 1941.  H. ANDERSON  2,257,777
MACHINE FOR SHAPING AND SEALING FILLED PAPER BAGS
Filed Sept. 13, 1939  51 Sheets-Sheet 28

INVENTOR
HELMER ANDERSON
BY Arthur R. Wylie
ATTORNEY

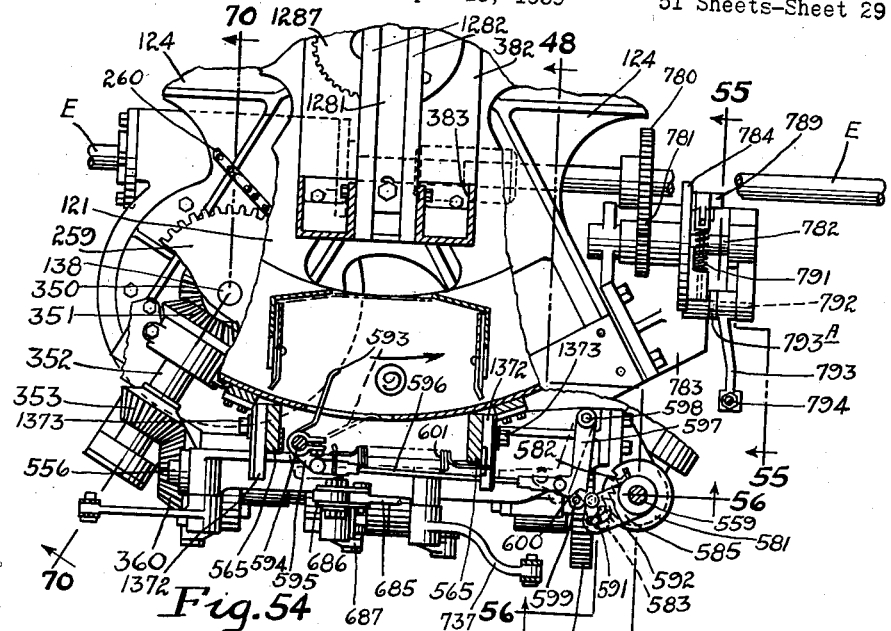
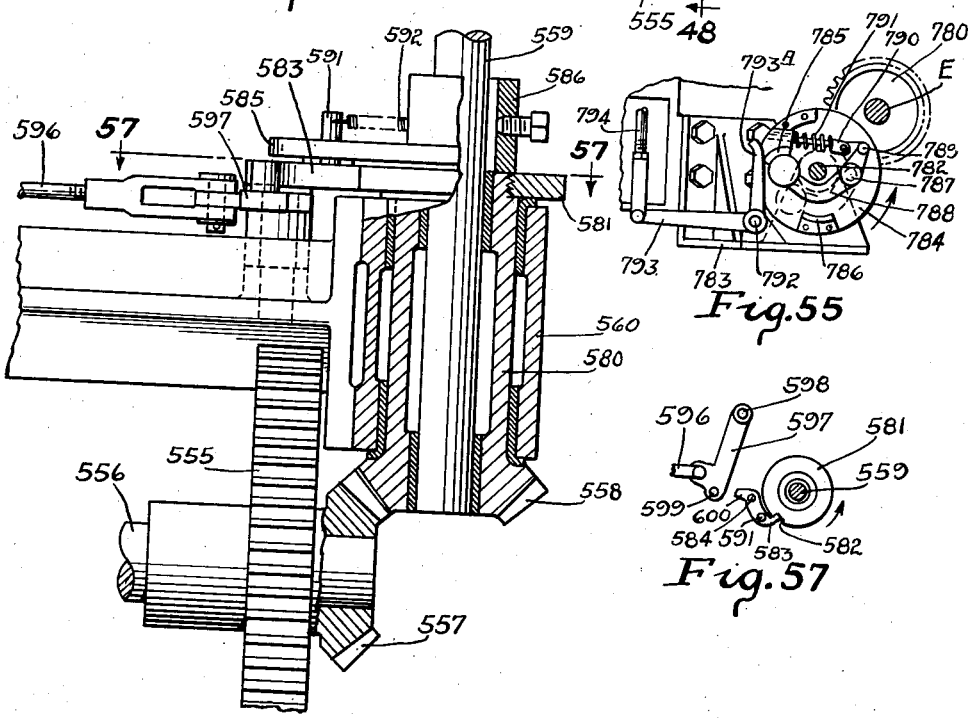

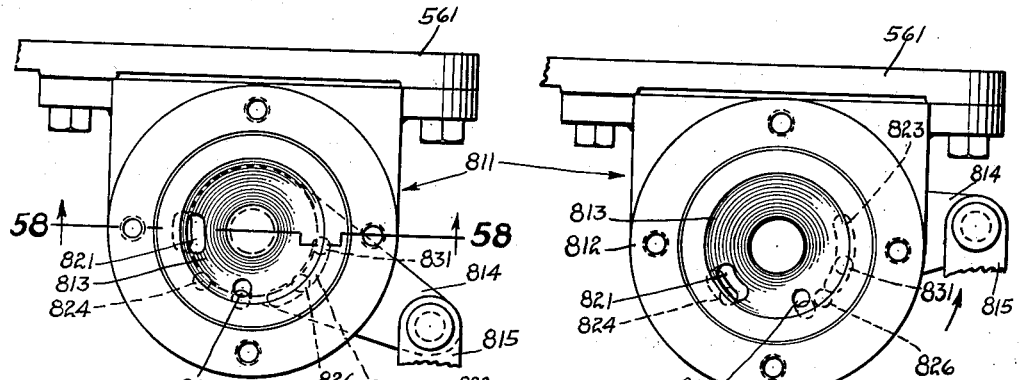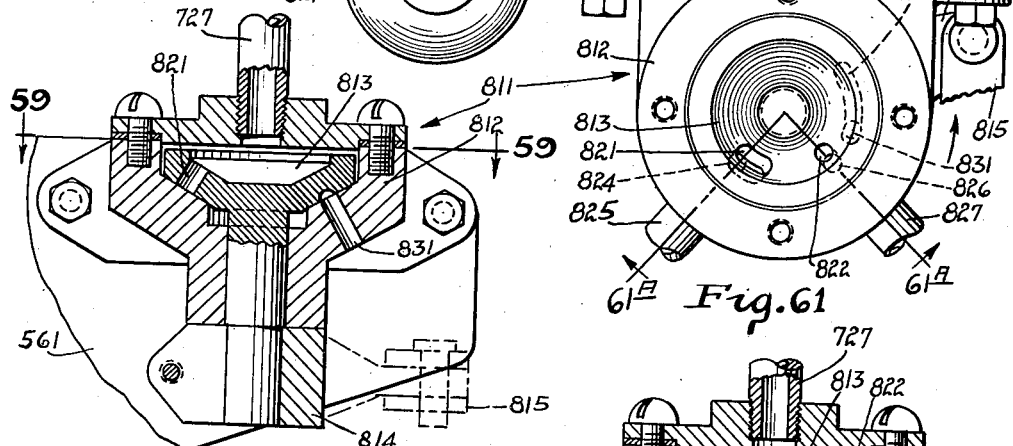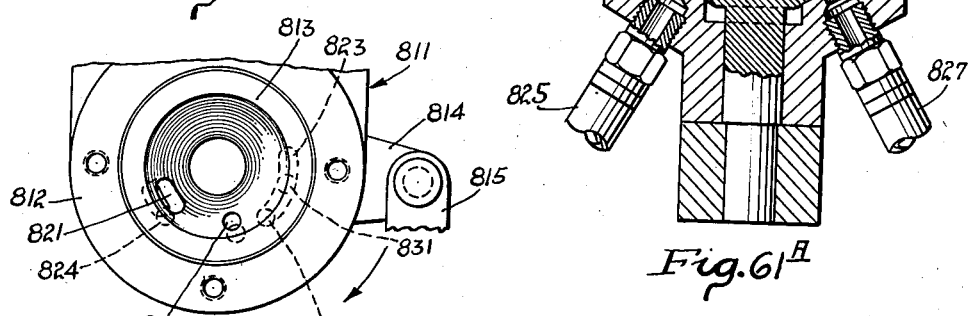

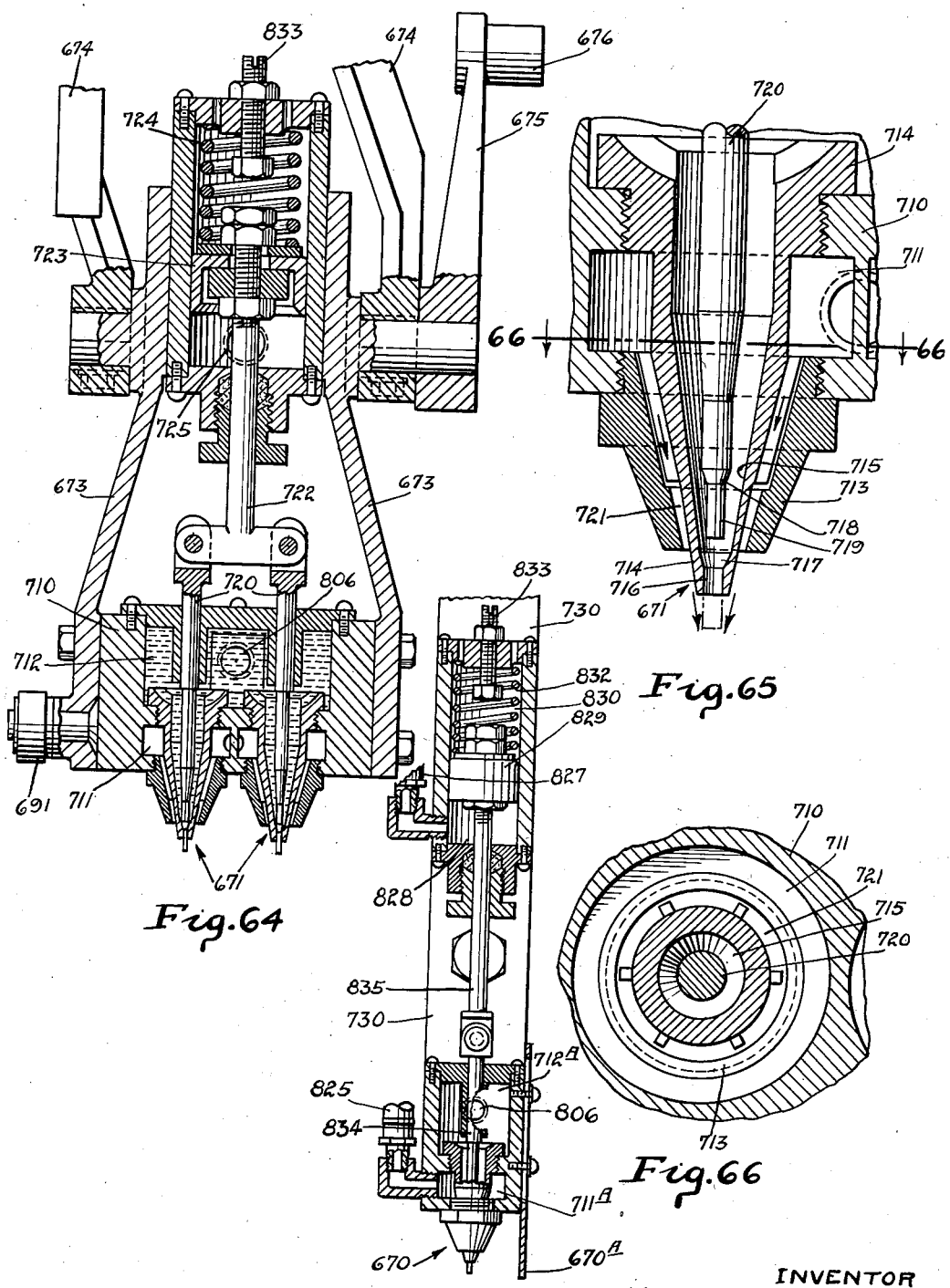

Oct. 7, 1941.    H. ANDERSON    2,257,777
MACHINE FOR SHAPING AND SEALING FILLED PAPER BAGS
Filed Sept. 13, 1939    51 Sheets-Sheet 32

INVENTOR
HELMER ANDERSON
BY *Arthur R. Wylie*
ATTORNEY

Oct. 7, 1941.   H. ANDERSON   2,257,777
MACHINE FOR SHAPING AND SEALING FILLED PAPER BAGS
Filed Sept. 13, 1939   51 Sheets-Sheet 33

INVENTOR
HELMER ANDERSON
BY
ATTORNEY

Oct. 7, 1941. H. ANDERSON 2,257,777
MACHINE FOR SHAPING AND SEALING FILLED PAPER BAGS
Filed Sept. 13, 1939  51 Sheets-Sheet 34

INVENTOR
HELMER ANDERSON
ATTORNEY

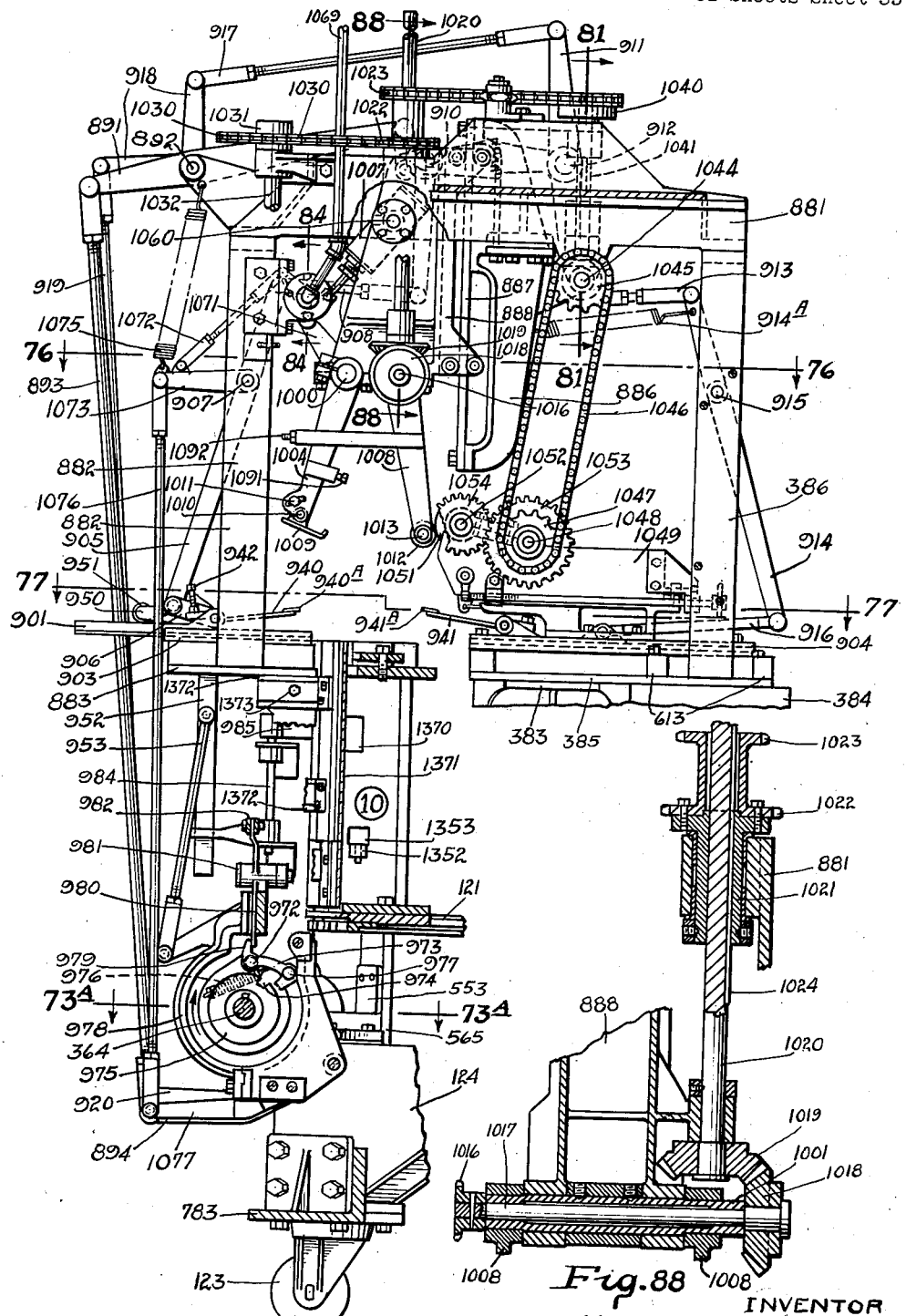

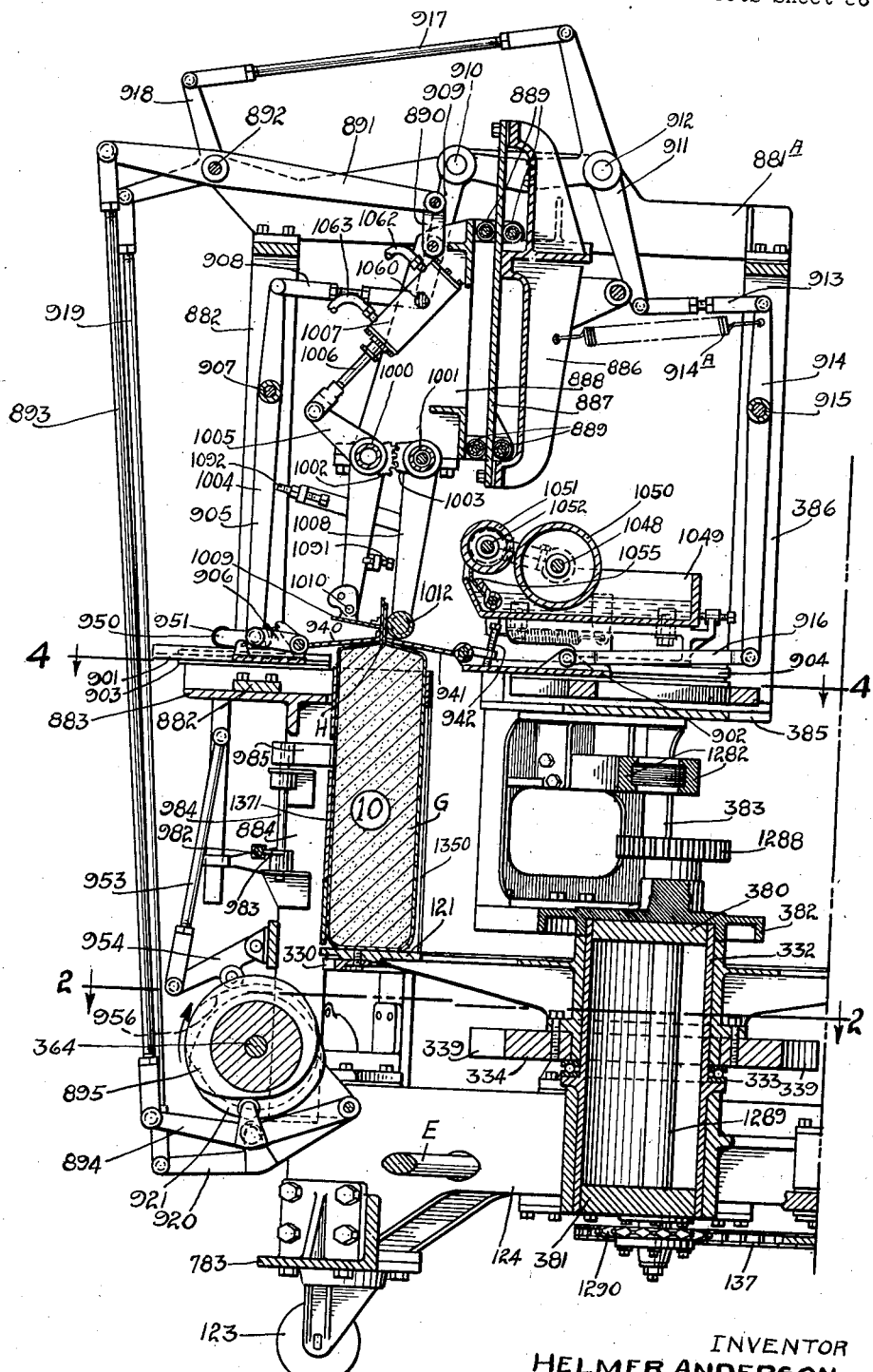

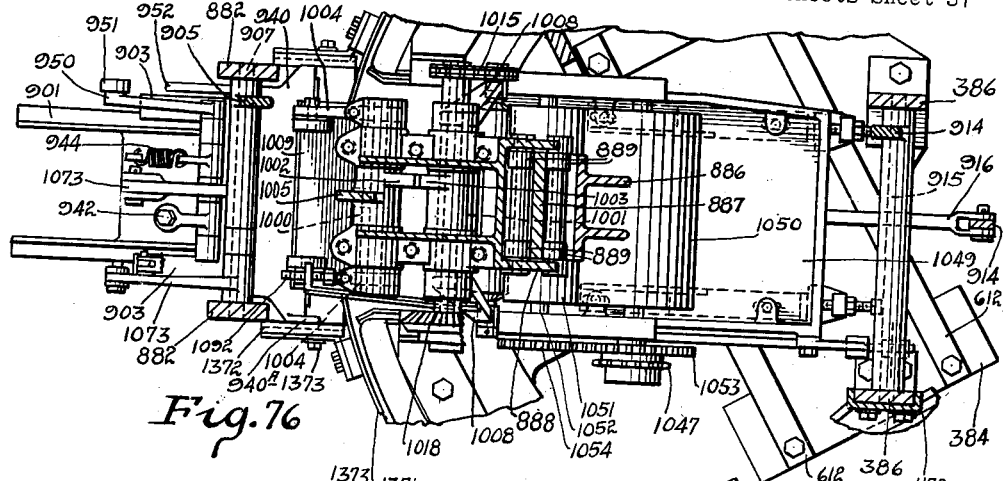
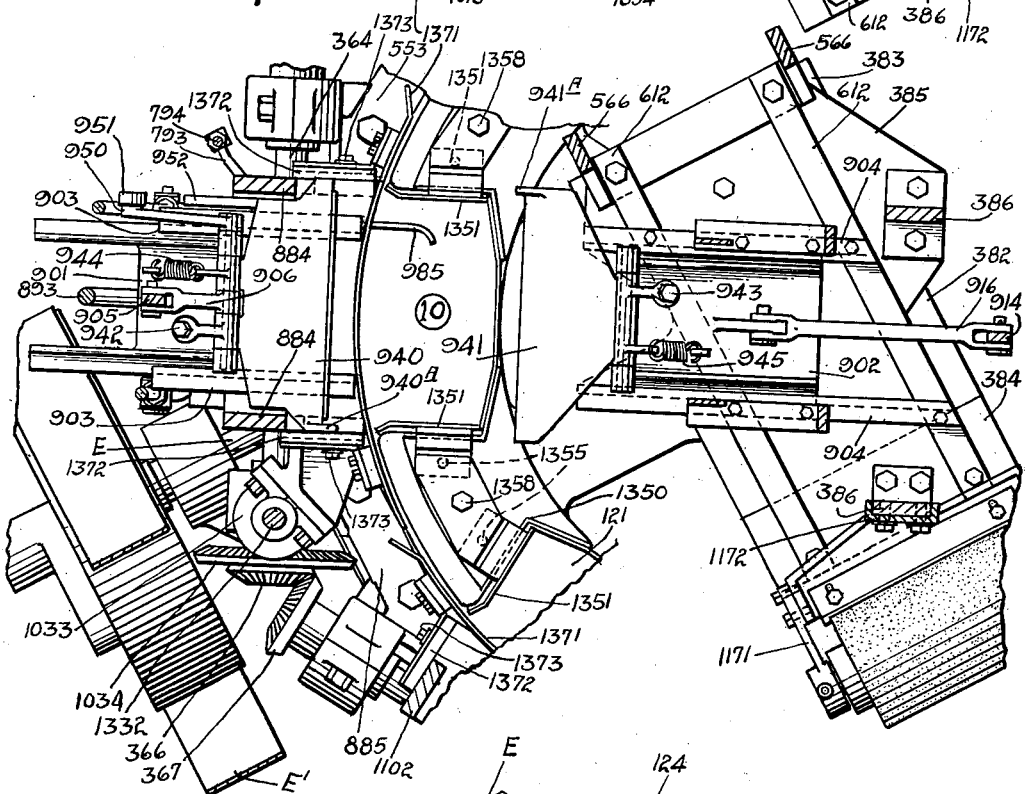
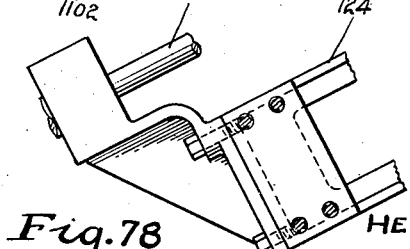

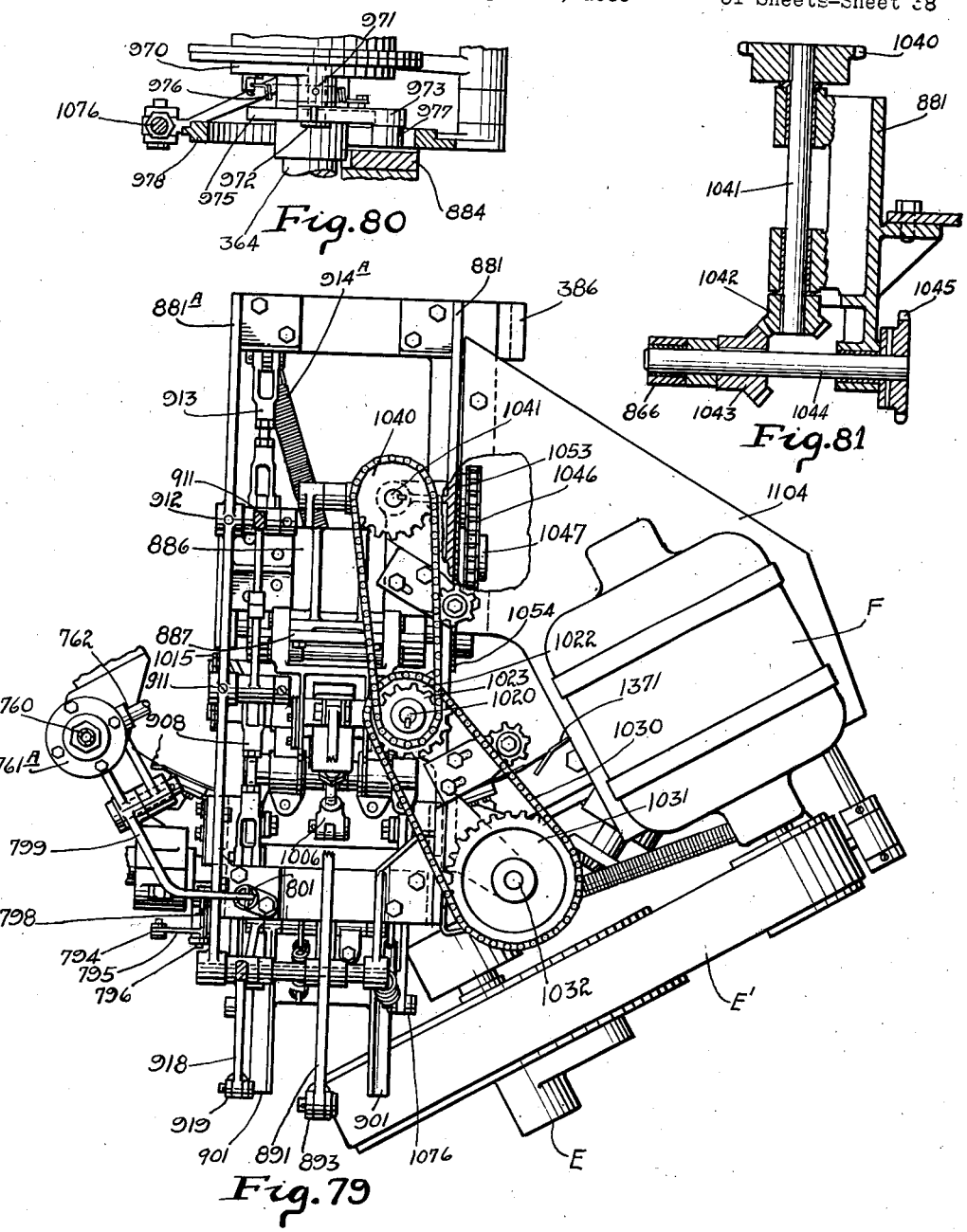

Oct. 7, 1941.   H. ANDERSON   2,257,777
MACHINE FOR SHAPING AND SEALING FILLED PAPER BAGS
Filed Sept. 13, 1939   51 Sheets-Sheet 39

INVENTOR
HELMER ANDERSON
BY Arthur R. Kyle
ATTORNEY

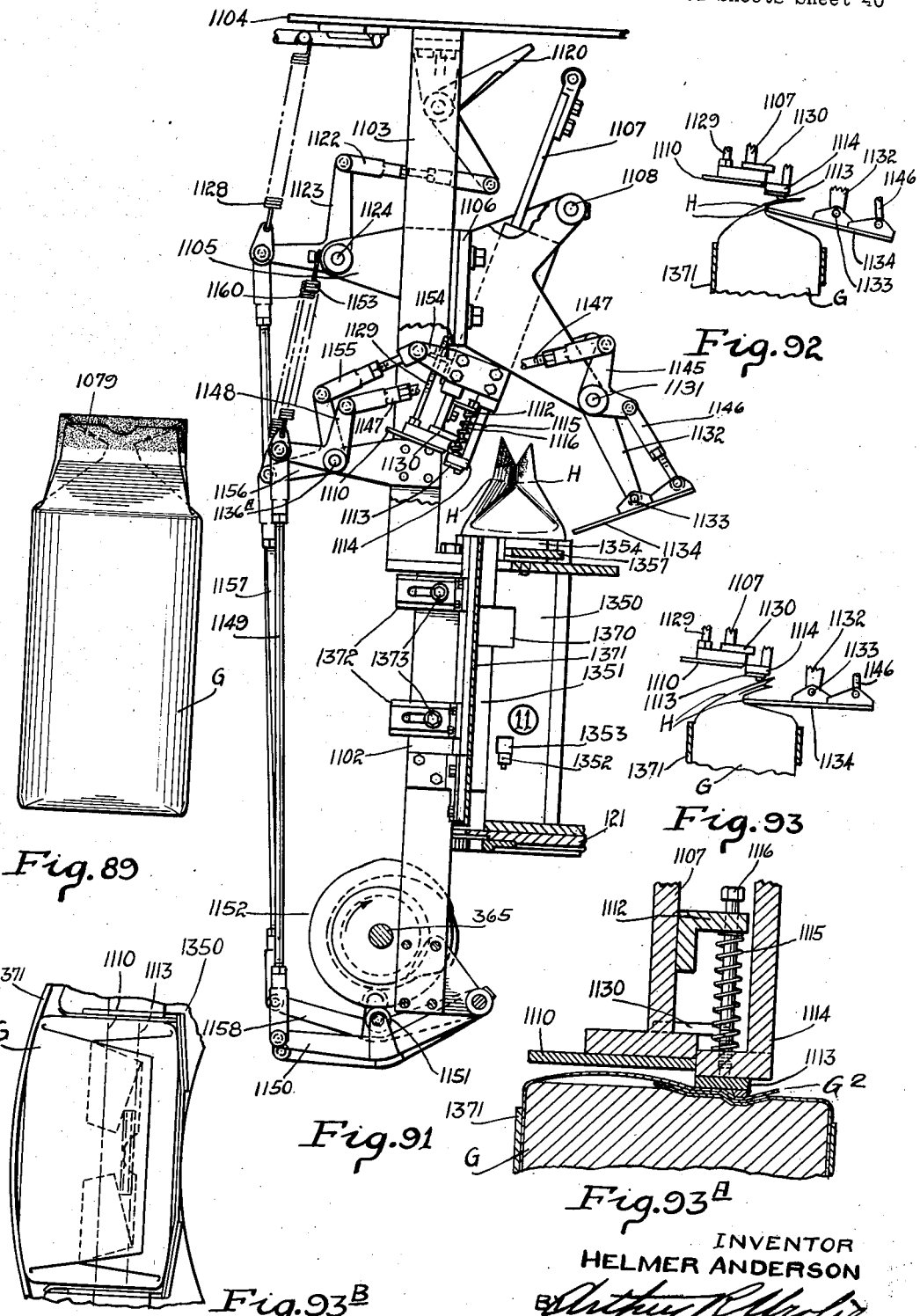
Oct. 7, 1941. H. ANDERSON 2,257,777
MACHINE FOR SHAPING AND SEALING FILLED PAPER BAGS
Filed Sept. 13, 1939 51 Sheets-Sheet 40
INVENTOR
HELMER ANDERSON
ATTORNEY Oct. 7, 1941.   H. ANDERSON   2,257,777
MACHINE FOR SHAPING AND SEALING FILLED PAPER BAGS
Filed Sept. 13, 1939   51 Sheets-Sheet 43
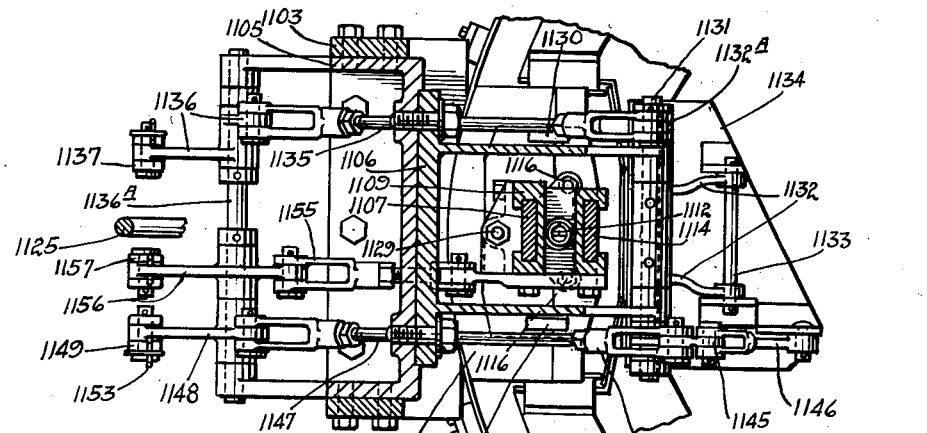
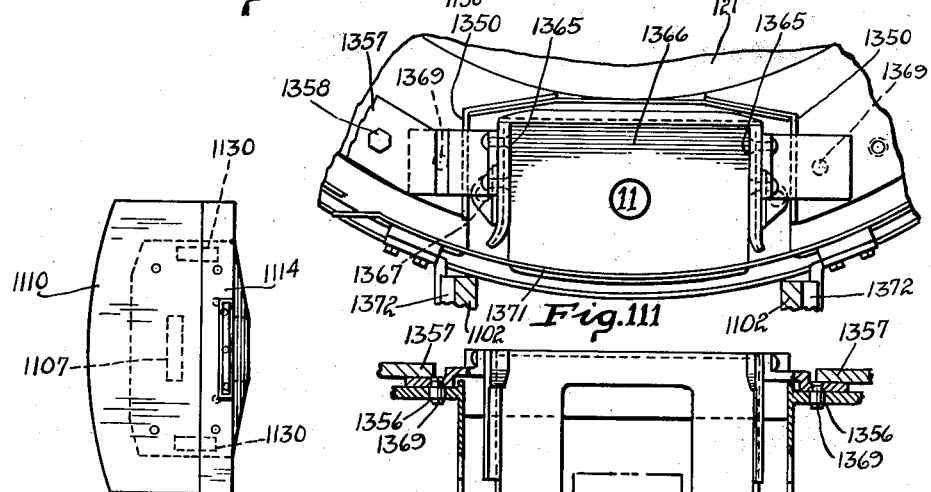
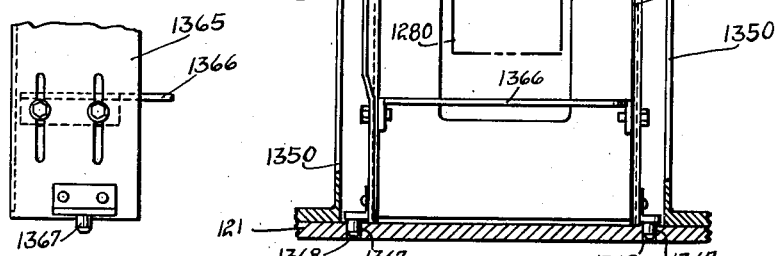
INVENTOR
HELMER ANDERSON
ATTORNEY

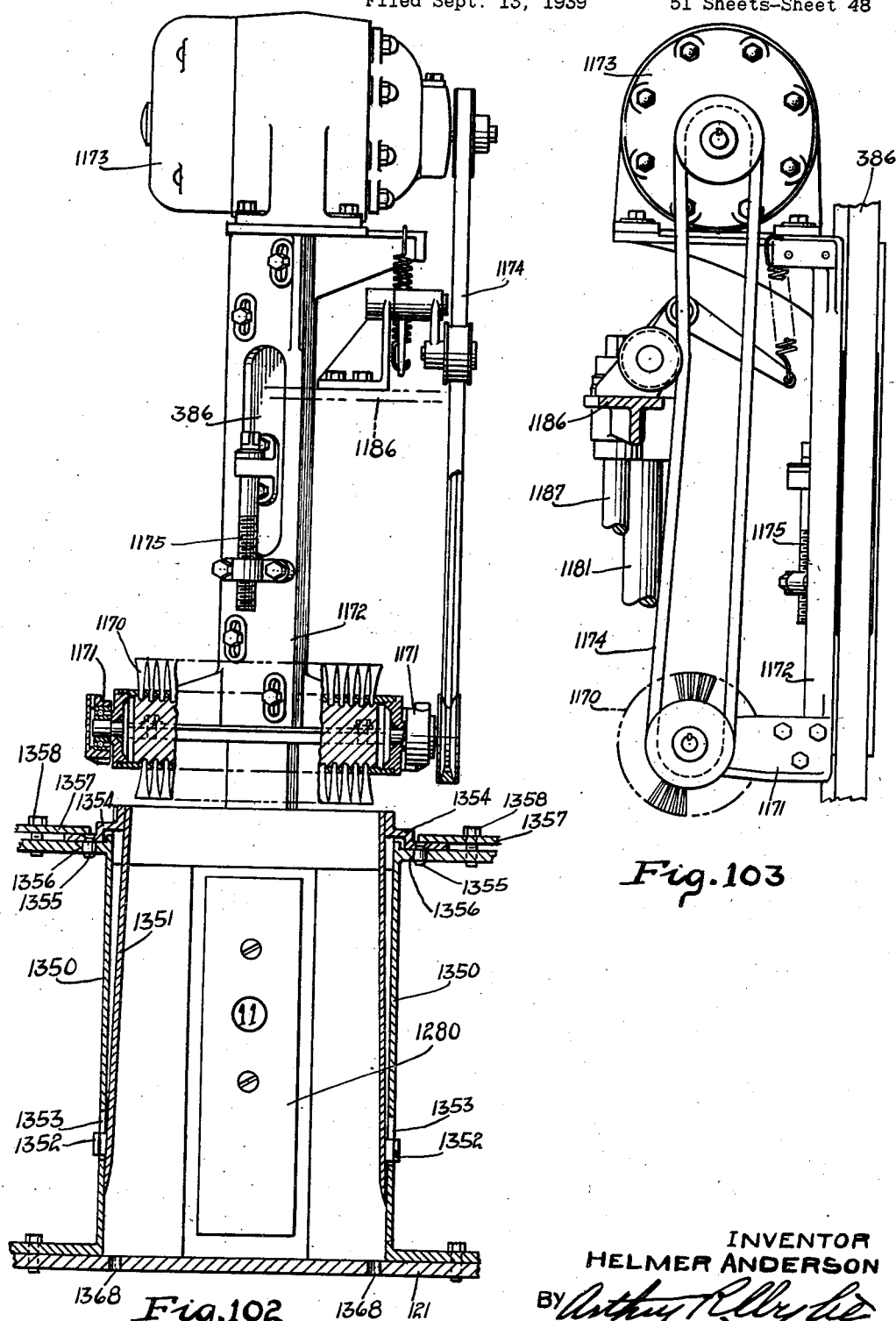

Oct. 7, 1941.  H. ANDERSON  2,257,777
MACHINE FOR SHAPING AND SEALING FILLED PAPER BAGS
Filed Sept. 13, 1939   51 Sheets-Sheet 49
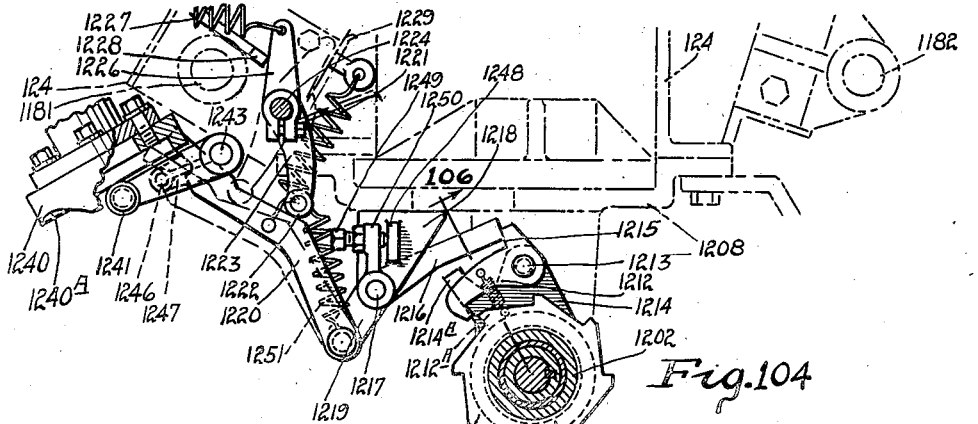
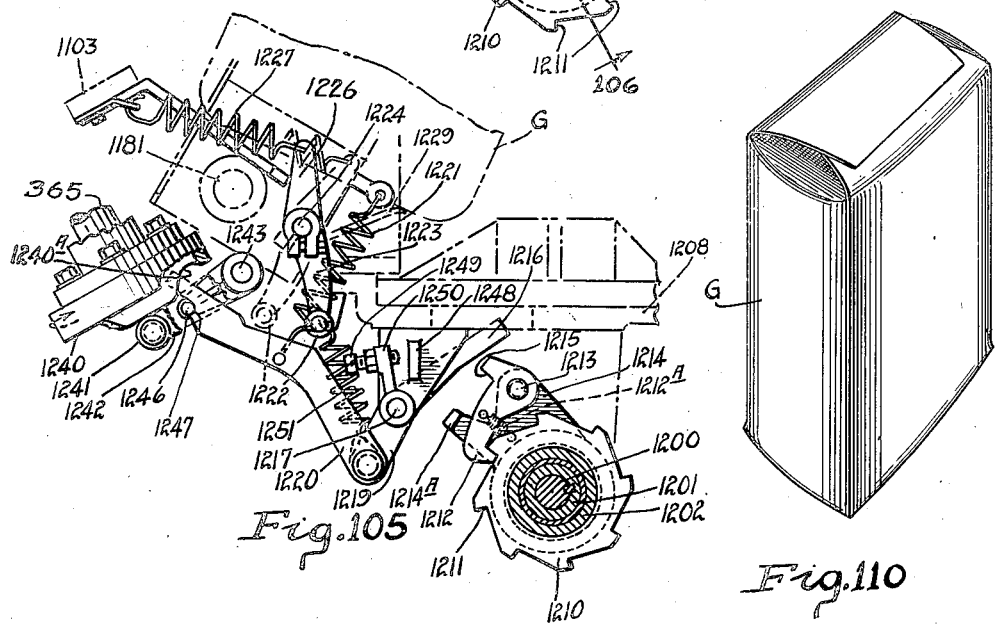
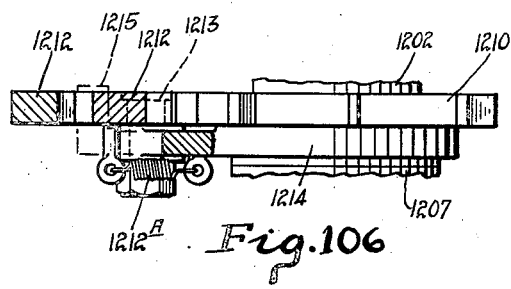
INVENTOR
HELMER ANDERSON
BY
ATTORNEY Oct. 7, 1941.  H. ANDERSON  2,257,777
MACHINE FOR SHAPING AND SEALING FILLED PAPER BAGS
Filed Sept. 13, 1939  51 Sheets-Sheet 50
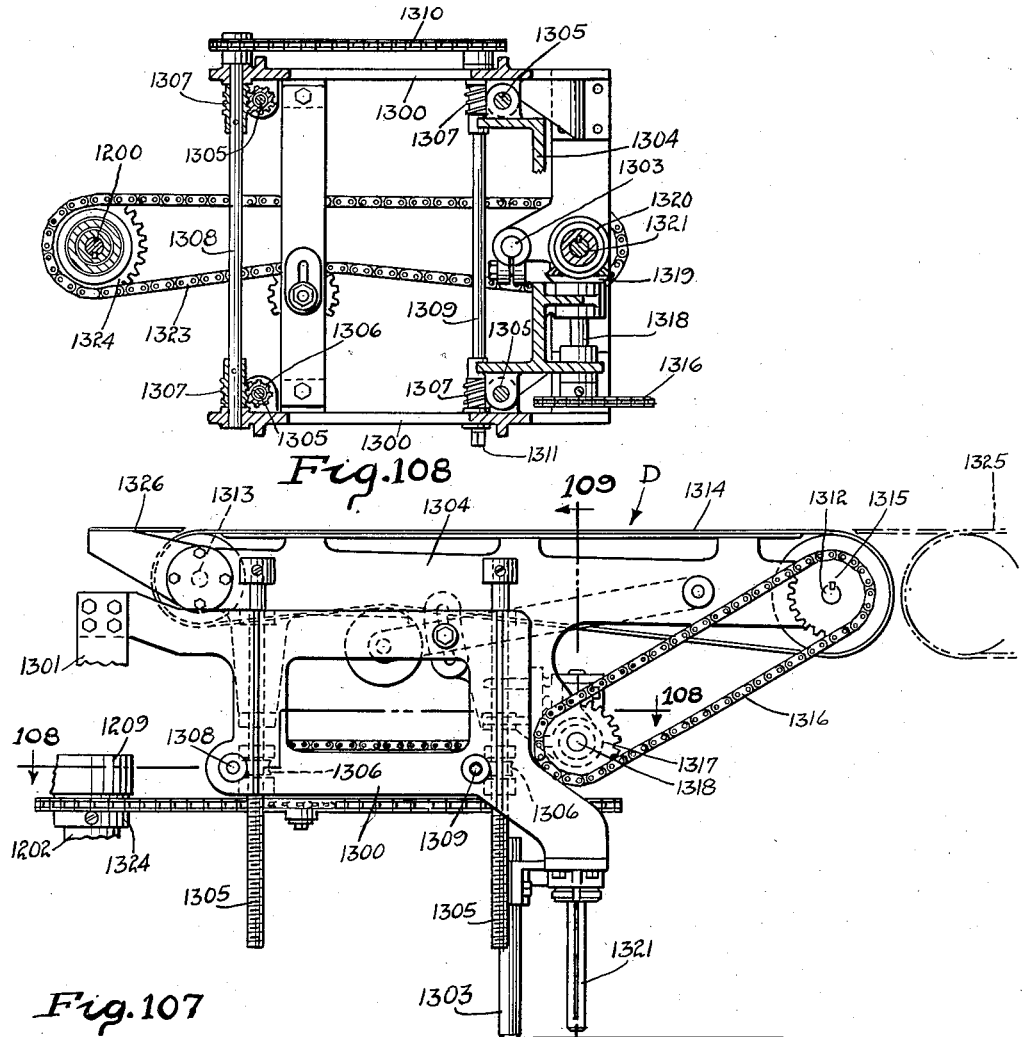
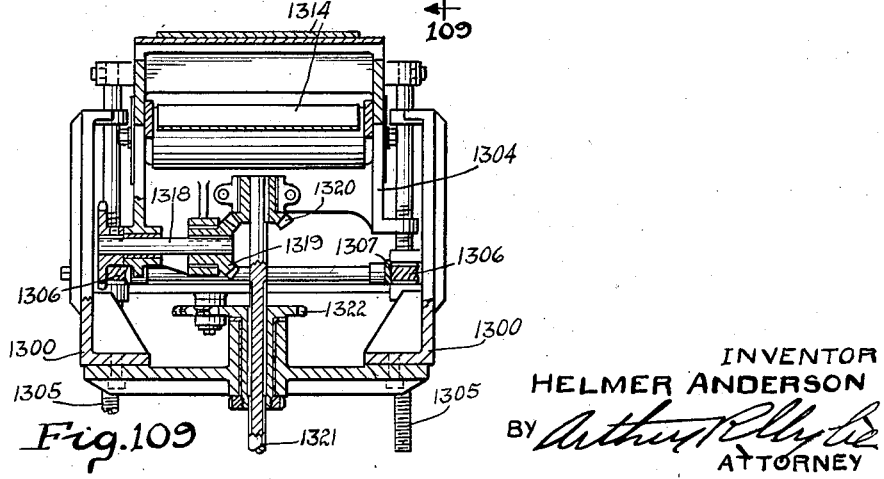
INVENTOR
HELMER ANDERSON
ATTORNEY Oct. 7, 1941.   H. ANDERSON   2,257,777
MACHINE FOR SHAPING AND SEALING FILLED PAPER BAGS
Filed Sept. 13, 1939    51 Sheets-Sheet 51

INVENTOR
HELMER ANDERSON
BY Arthur R. Lyle
ATTORNEY

Patented Oct. 7, 1941

2,257,777

UNITED STATES PATENT OFFICE 2,257,777

MACHINE FOR SHAPING AND SEALING FILLED PAPER BAGS

Helmer Anderson, Minneapolis, Minn., assignor to General Mills, Inc., a corporation of Delaware Application September 13, 1939, Serial No. 294,705

30 Claims. (Cl. 93—6)

An object of this invention is to provide improved means for automatically shaping and sealing paper bags containing flour, sugar, coffee and like granular materials, particularly bags of the satchel bottom type in which the top is merely flattened and has only single lateral fold lines.

Still another object is the provision of means for performing the various objects in a minimum of space. This I accomplish by using a turn table and I prefer to use two turn tables adjacent each other and running in opposite directions with means for transferring the bags from one to the other.

Another object is the provision of means operating in conjunction with a turn table for alternately squeezing the bag and vibrating it a number of times to form and compact it.

Another object is the provision of means for holding the top of the bag while transferring it from one conveyor or turn table to another to insure the bag remaining upright.

Another object is to provide adapters for the various members that enclose, support or contact the bag to enable the machine to satisfactorily handle bags of different sizes. Thus, the machine shown closes and seals 24½-pound flour bags. The adapters shown by proper proportioning enable it to operate on smaller sizes as 12 or 10-pound bags.

Another object is to provide means for lifting the bag from the first conveyor or turn table to the other when the latter is provided with adapters for smaller bags.

Another object is the provision of means for both longitudinally and transversely scoring the bag top and forming an accordian pleat therein preparatory to closing and sealing. To insure a proper scoring, particularly horizontally, I separately grip each side of the bag top while the sides are separated and then on bringing these gripped sides together, the bag is raised off the turn table, thereby further sharply horizontally creasing the bag top.

Another object is to provide means for opening the bag top while still so held preparatory to applying glue thereto as claimed in my copending patent application Serial No. 252,506 filed January 23, 1939.

A further object is the provision of means for efficiently spreading the glue so applied over the surfaces to be glued.

Another object is to provide means for gluing the outer surface of the bag top, said means also serving to pick up any excess glue from the previous gluing operation, said means also acting to press, close and flatten the mouth of the bag.

Another object is the provision of means for controlling the operation of the mechanism at any station, particularly the operation of both the gluing mechanism and the glue spreading mechanism by the bags themselves so that no glue can be delivered nor can either of these mechanisms operate unless there is a bag present at that station to receive it or to be otherwise operated on.

Another object is to provide means for controlling the operation of the mechanism at any particular station, said means being operated by a bag in that station.

Still another object is the provision of means for folding over the top of the bag which on being withdrawn slightly opens the mouth of the bag so as to permit air therein to escape slowly as the bag top is further folded into closing position.

Another object is the provision of means for making the final closure in such a way as to prevent flour or other pulverulent material being blown out of the bag as air in the bag is forced out.

These and other objects as hereinafter appear are accomplished by this invention which is fully described in the following specification as shown in the accompanying drawings in which Fig. 1 is a perspective view showing the machine as a whole with the conveyors at the right delivering the filled but unsealed bags to the machine and the conveyor to the left carrying filled and sealed bags from the machine;

Fig. 4 is a similar section on the line 4—4 of Fig. 75 and combines with Fig. 3 to make a horizontal section of the complete machine;

Figure 3:
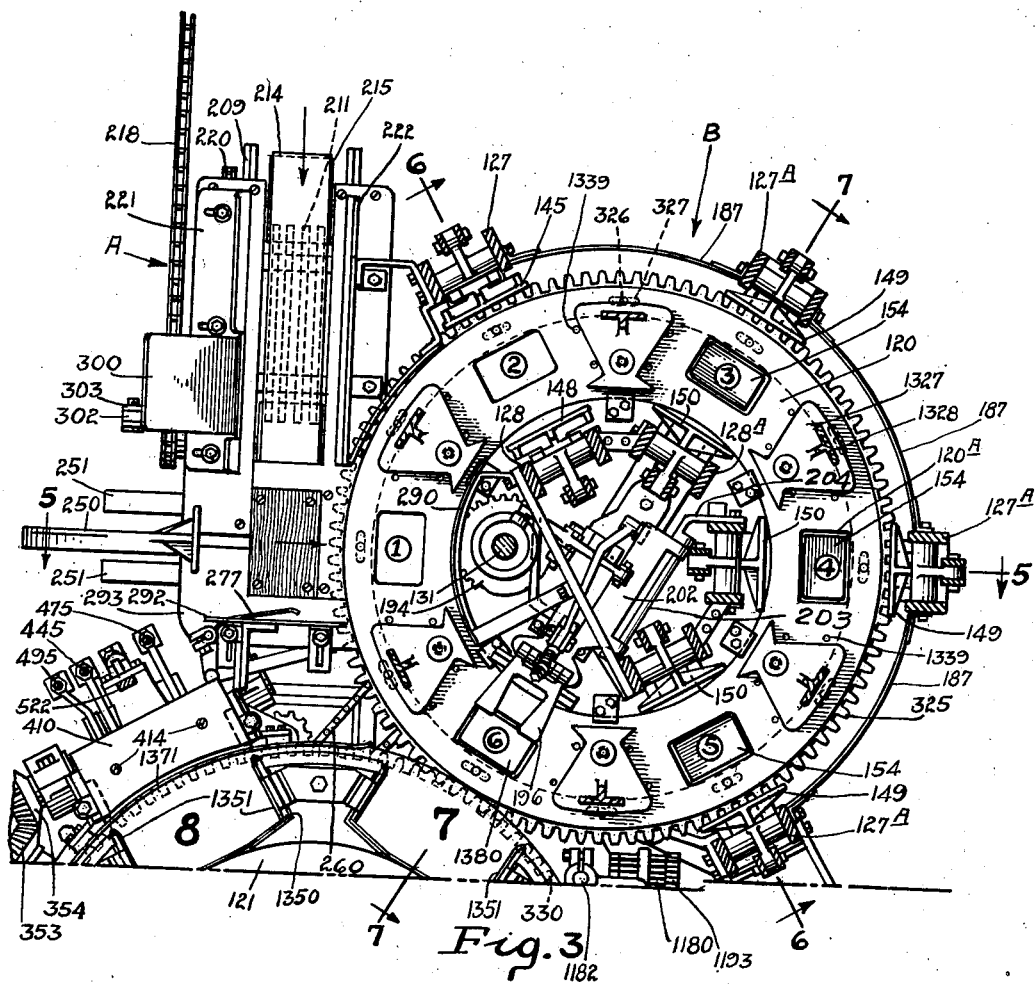
Fig. 3 is a partial horizontal section on the broken end line 3—3 of Fig. 32.
Figure 14:
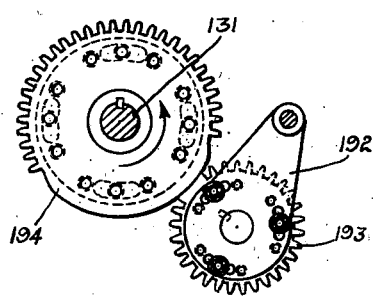
Figure 6:
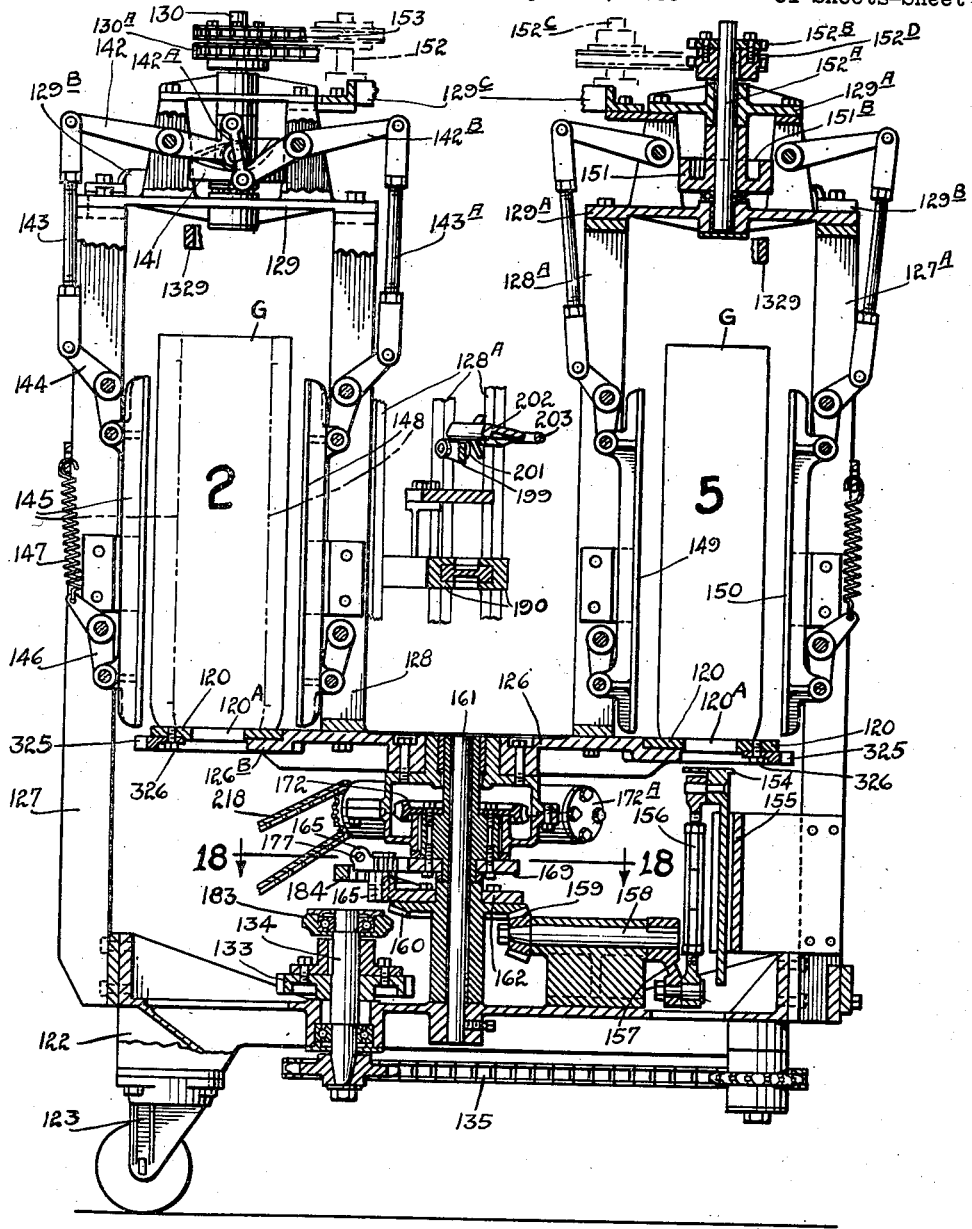
Fig. 6 is a vertical section on the line 6—6 of Fig. 3.
Figure 7:
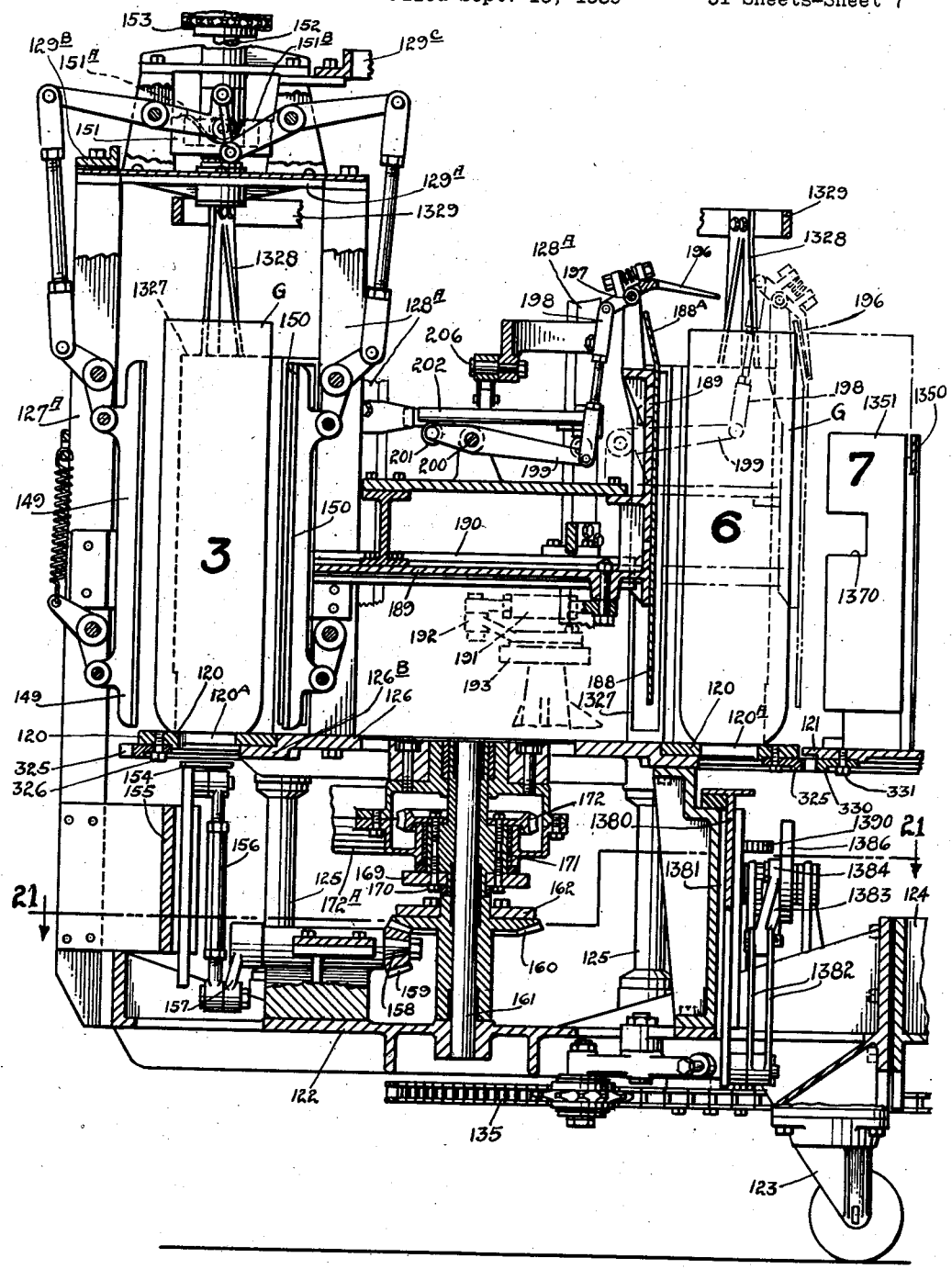
Fig. 7 is a similar view on the line 7—7 of Fig. 3.
Figure 8:
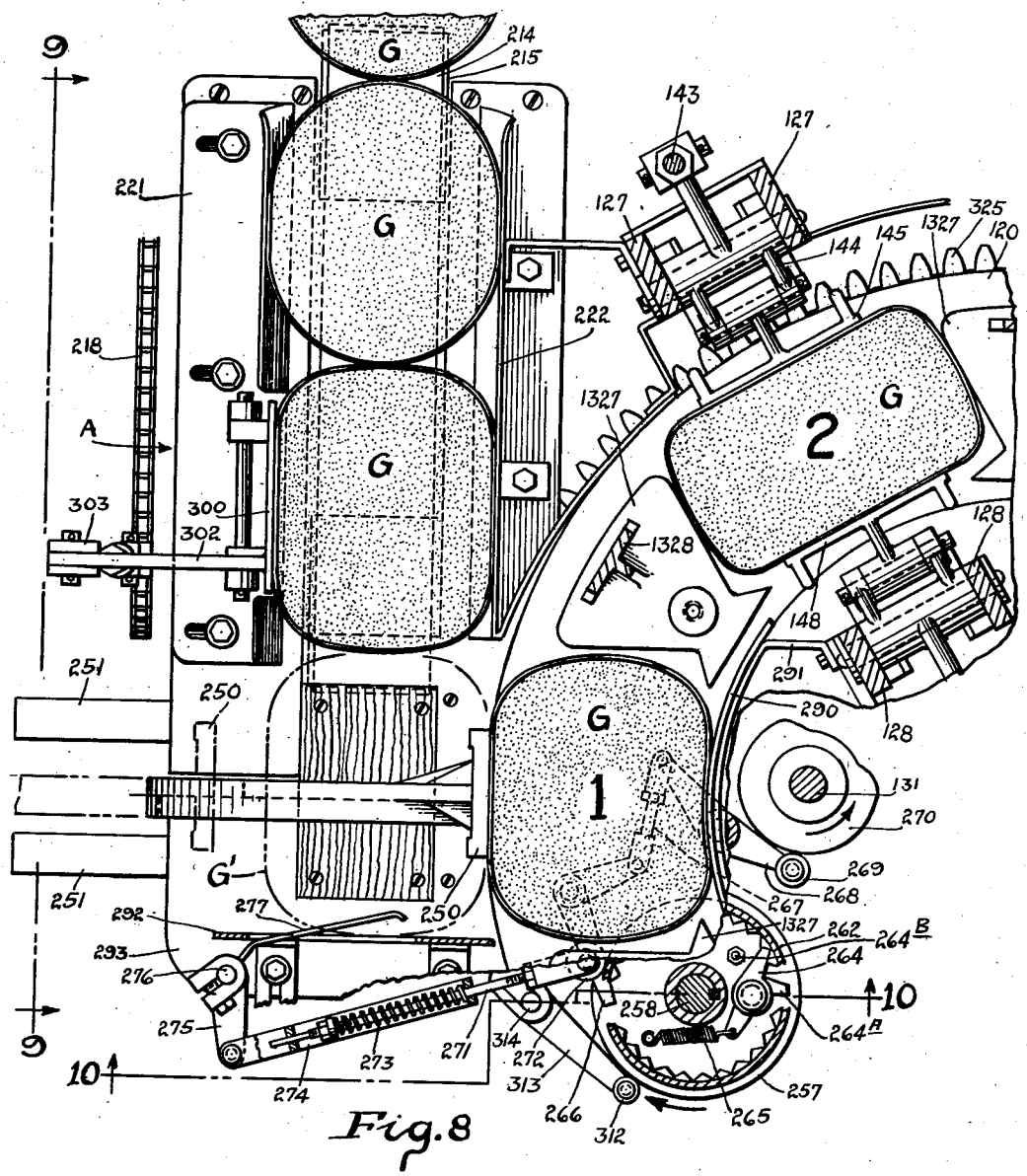
Fig. 8 is a partial enlarged horizontal section showing the bag delivered to Station 10 of the shaper mechanism.
Figure 9:
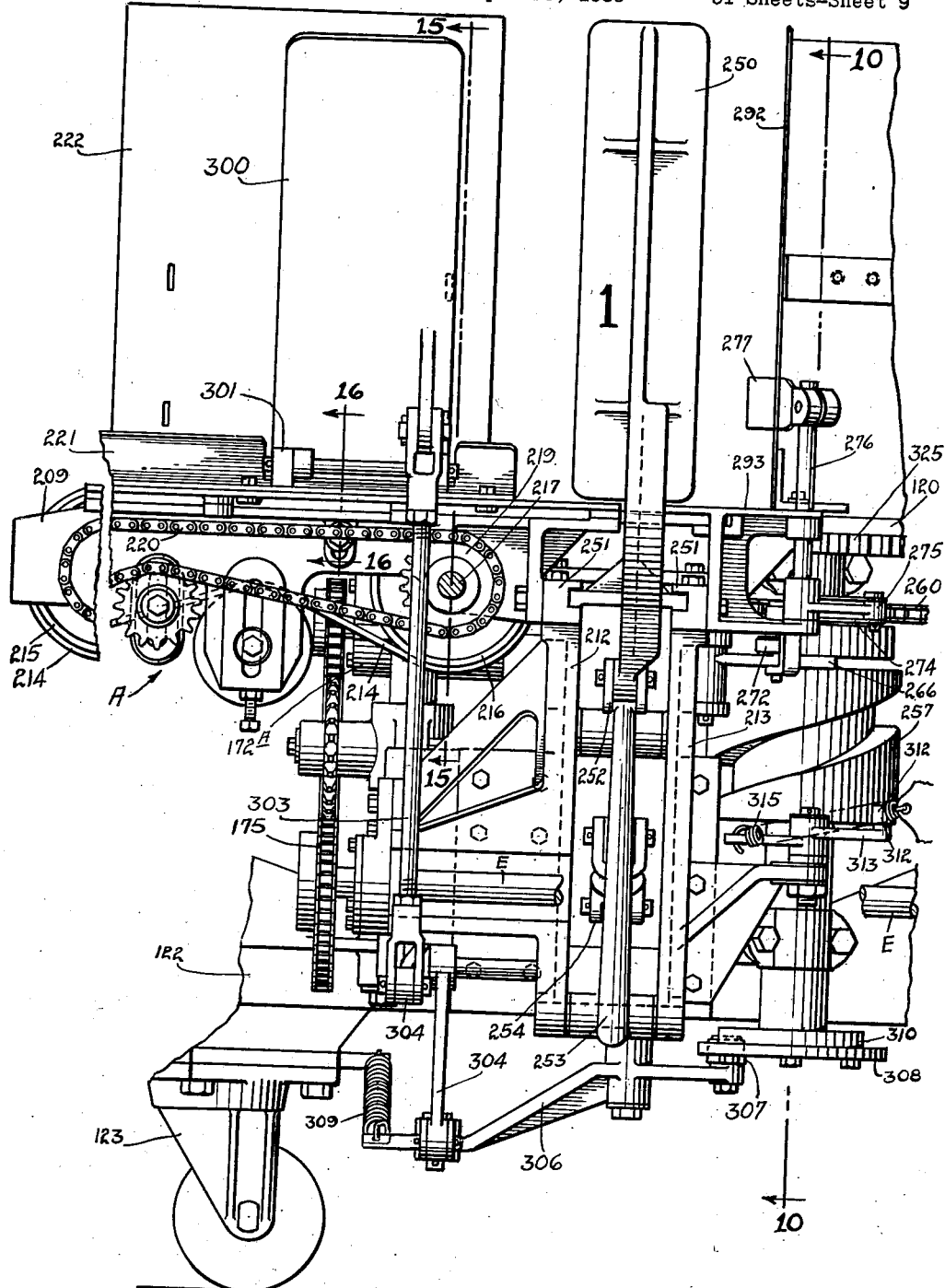
Fig. 9 is a partial elevation as viewed from the line 9—9 of Fig. 8.
Figure 10:
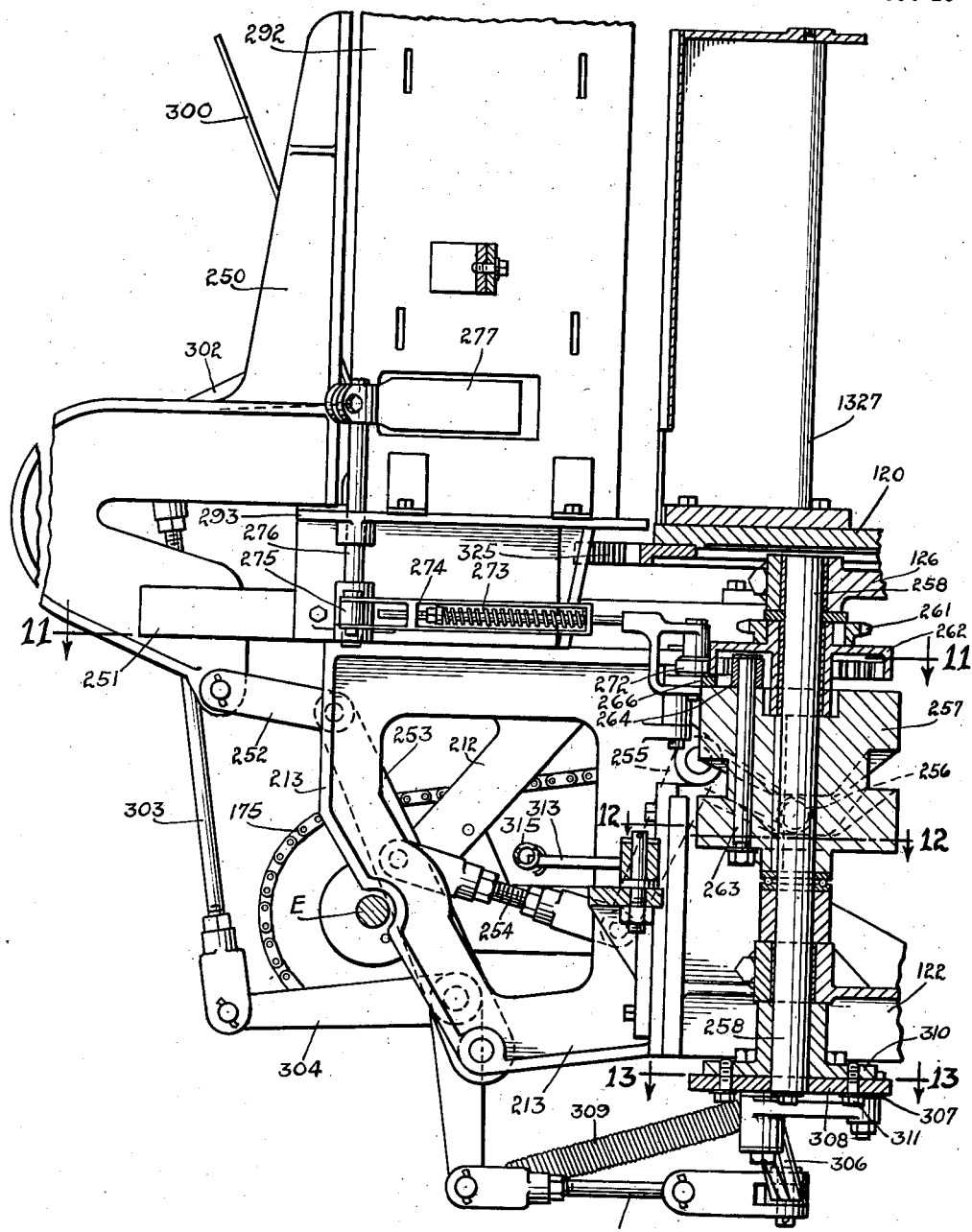
Fig. 10 is a partial vertical section of the broken line 10—10 of Fig. 8.
Figure 11:
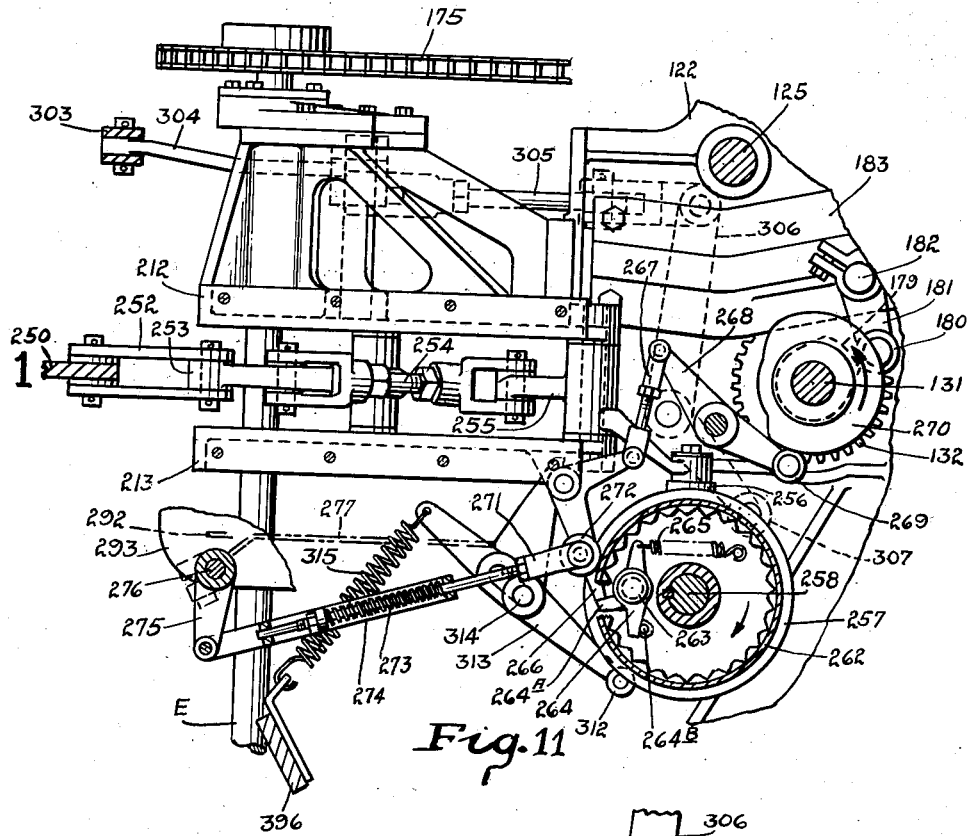
Figure 12:
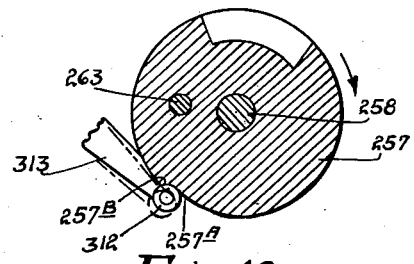
Figure 13:
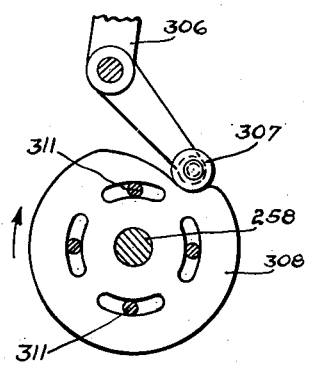
Figure 25:
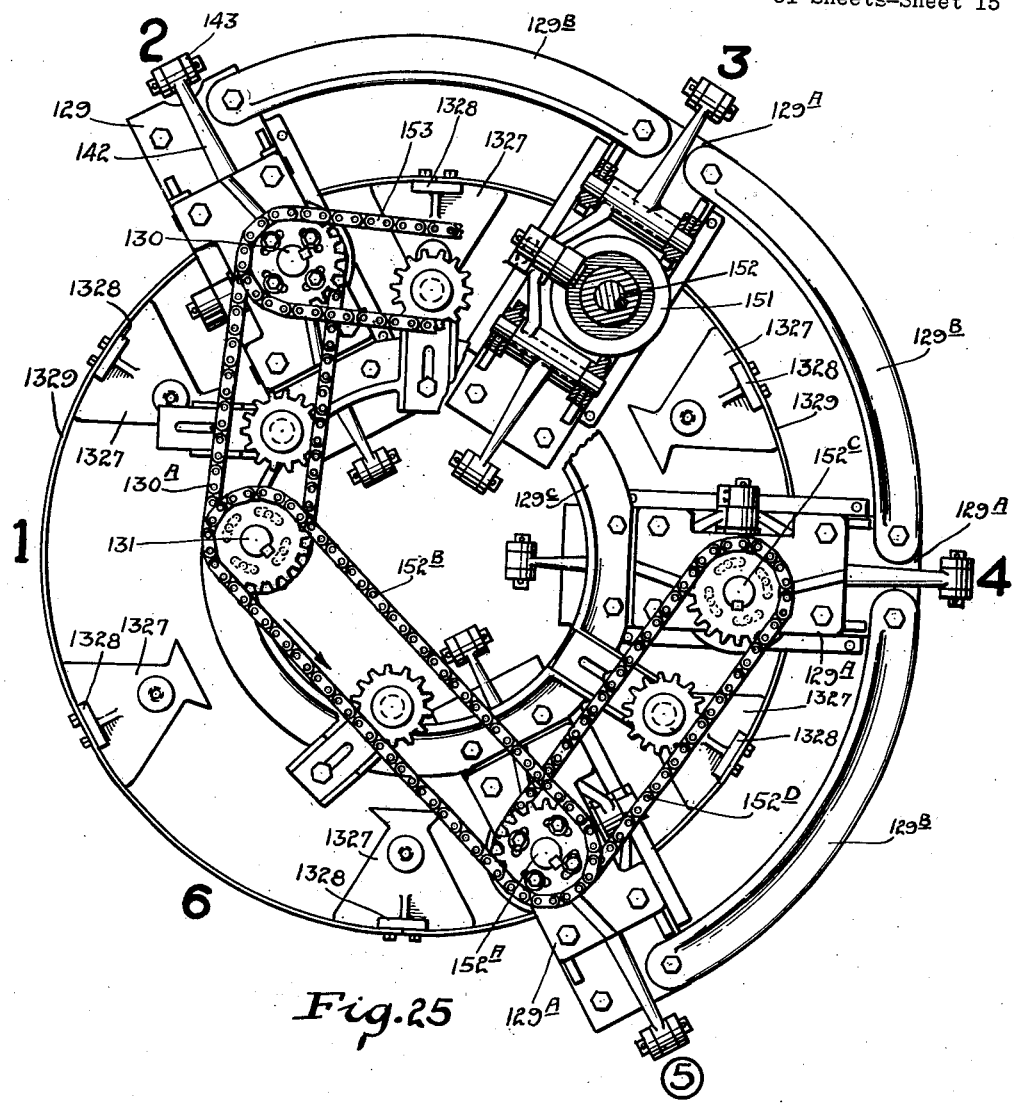
Figure 31:
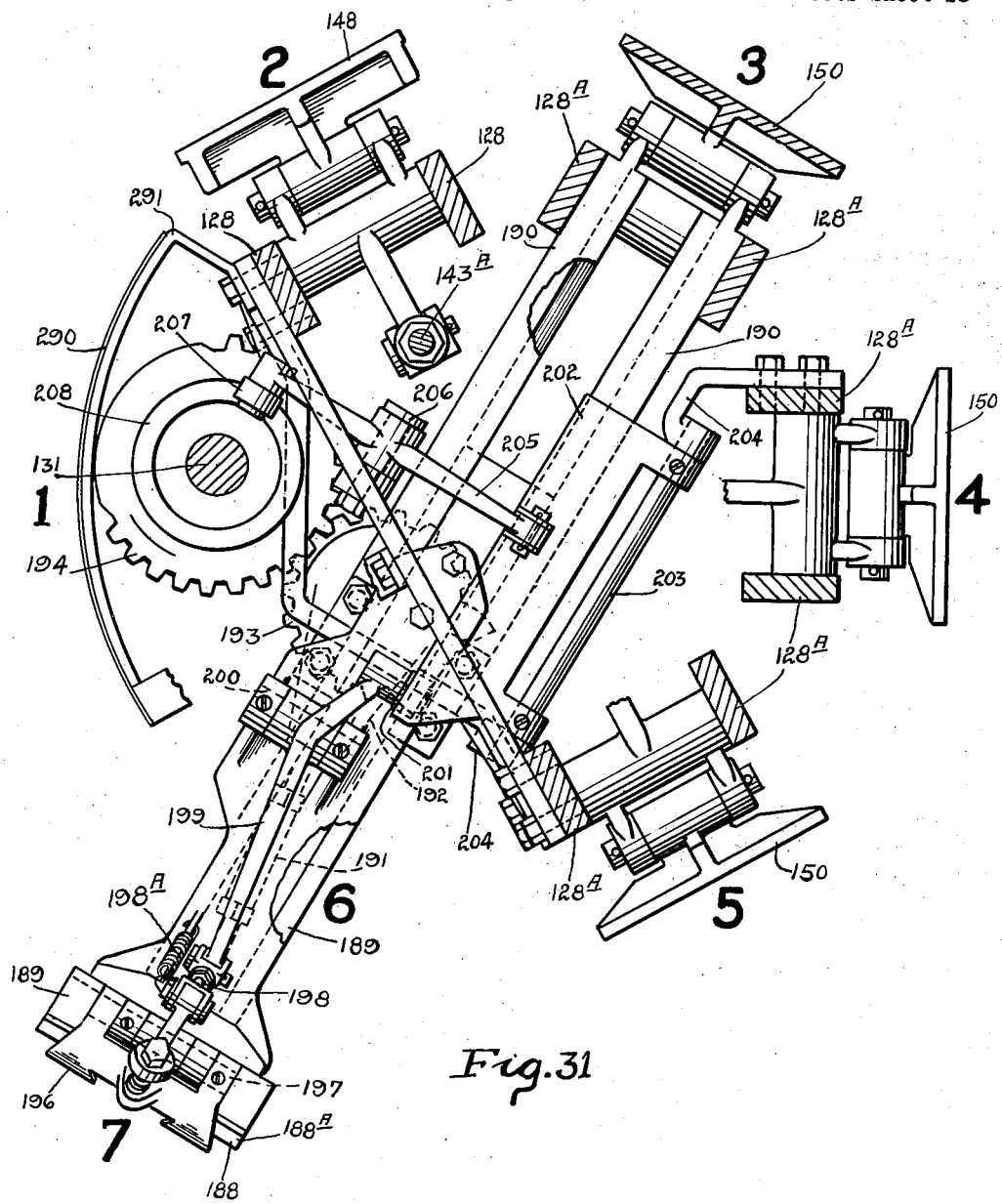
Figure 32:
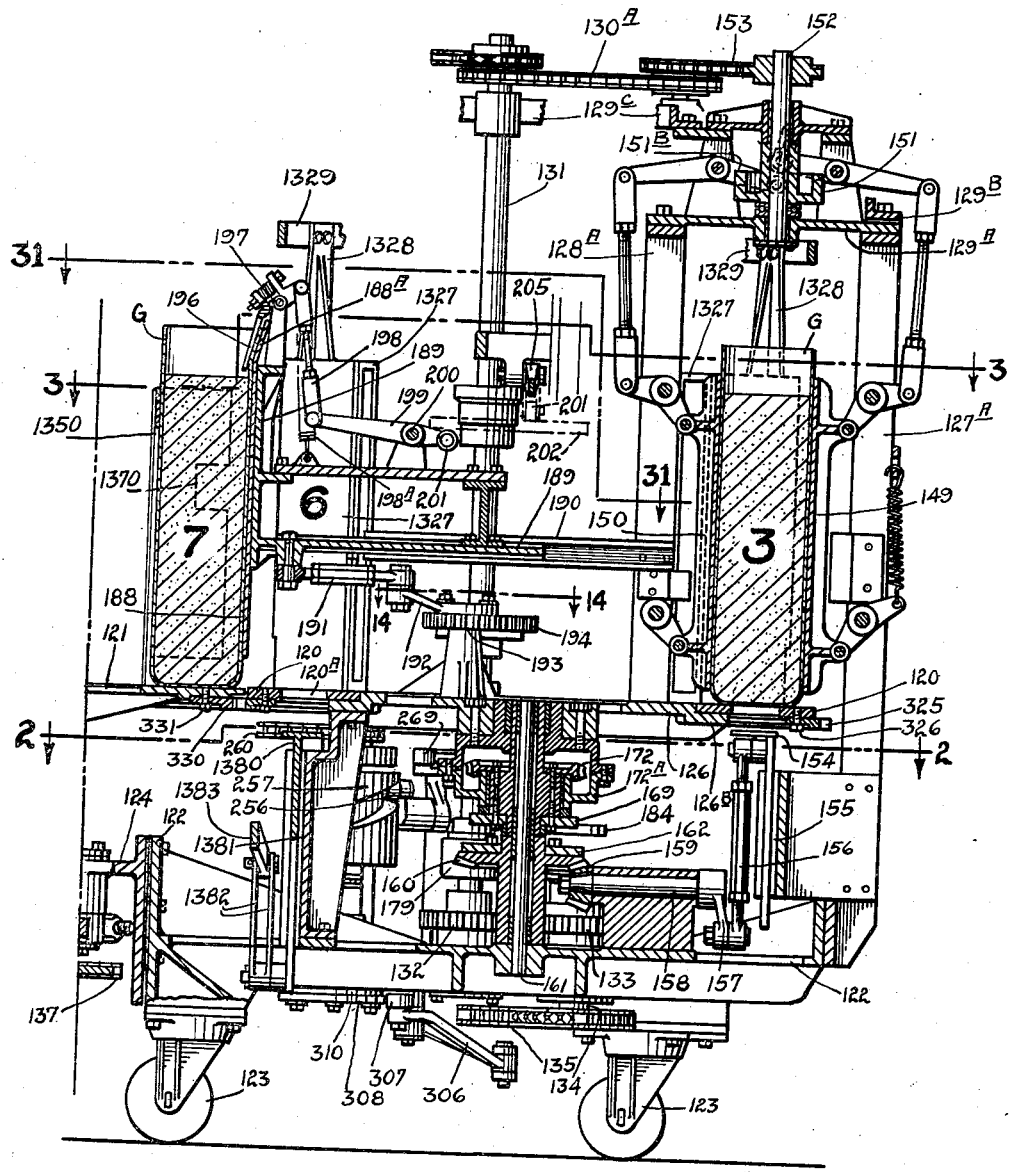
Figure 33:
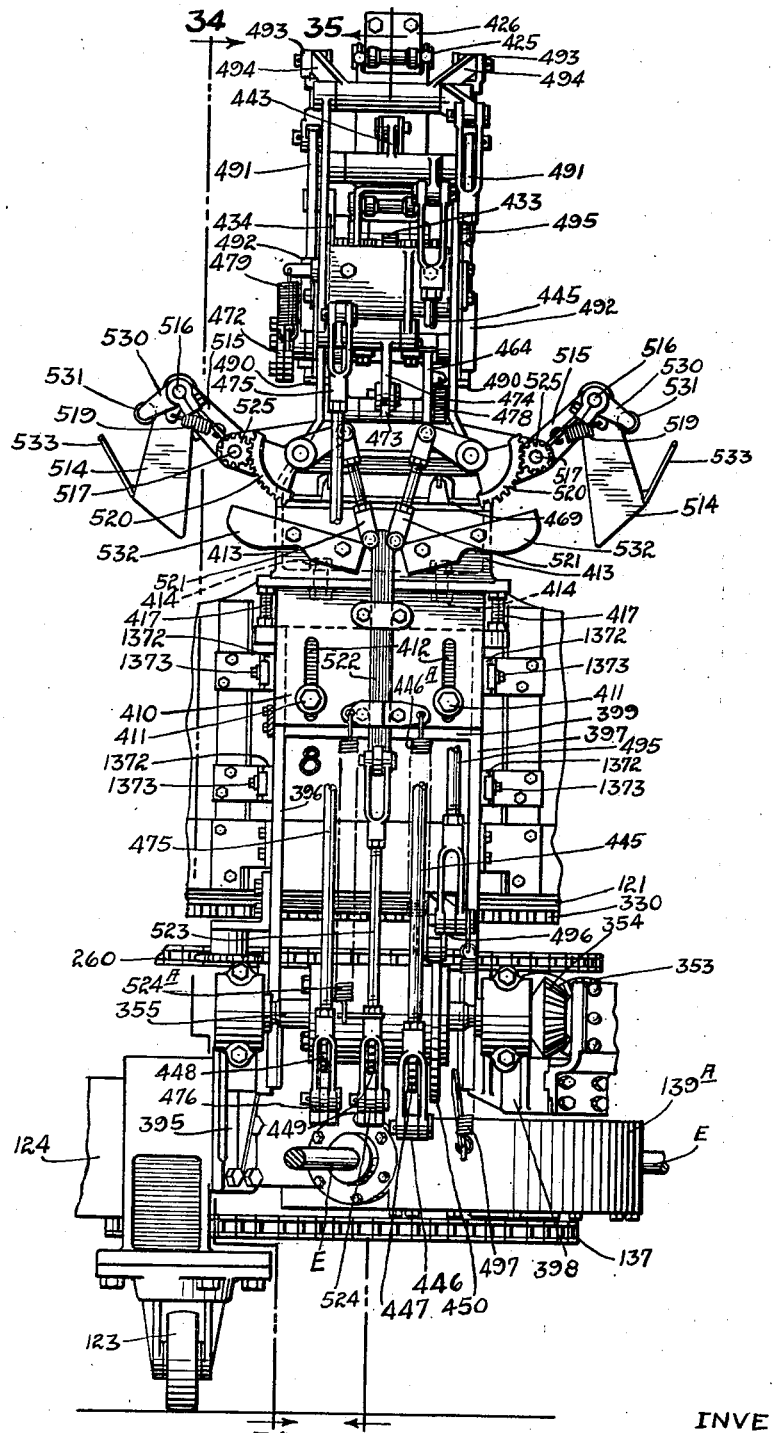
Figure 43:
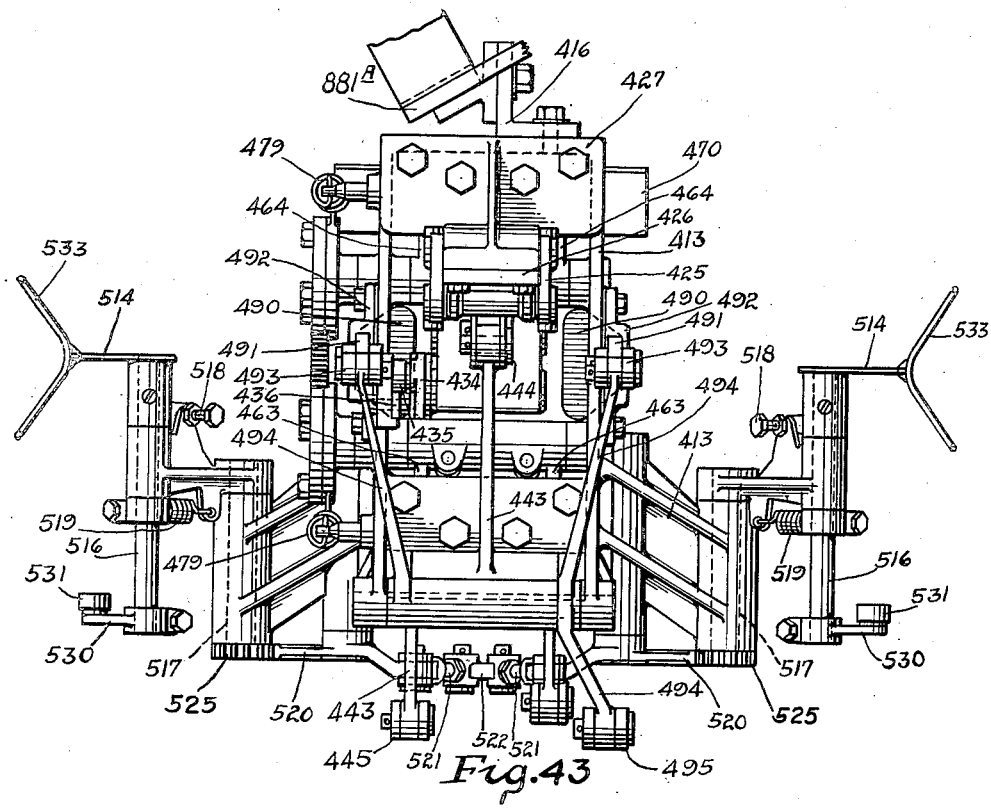
Figure 44:
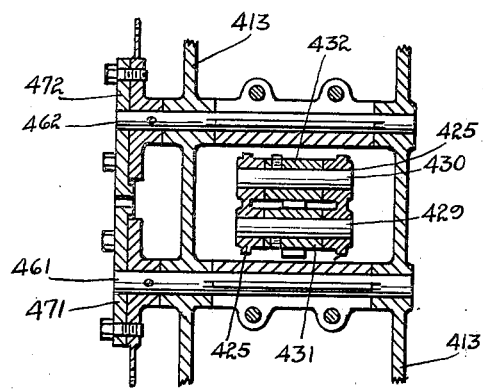
Figure 45:
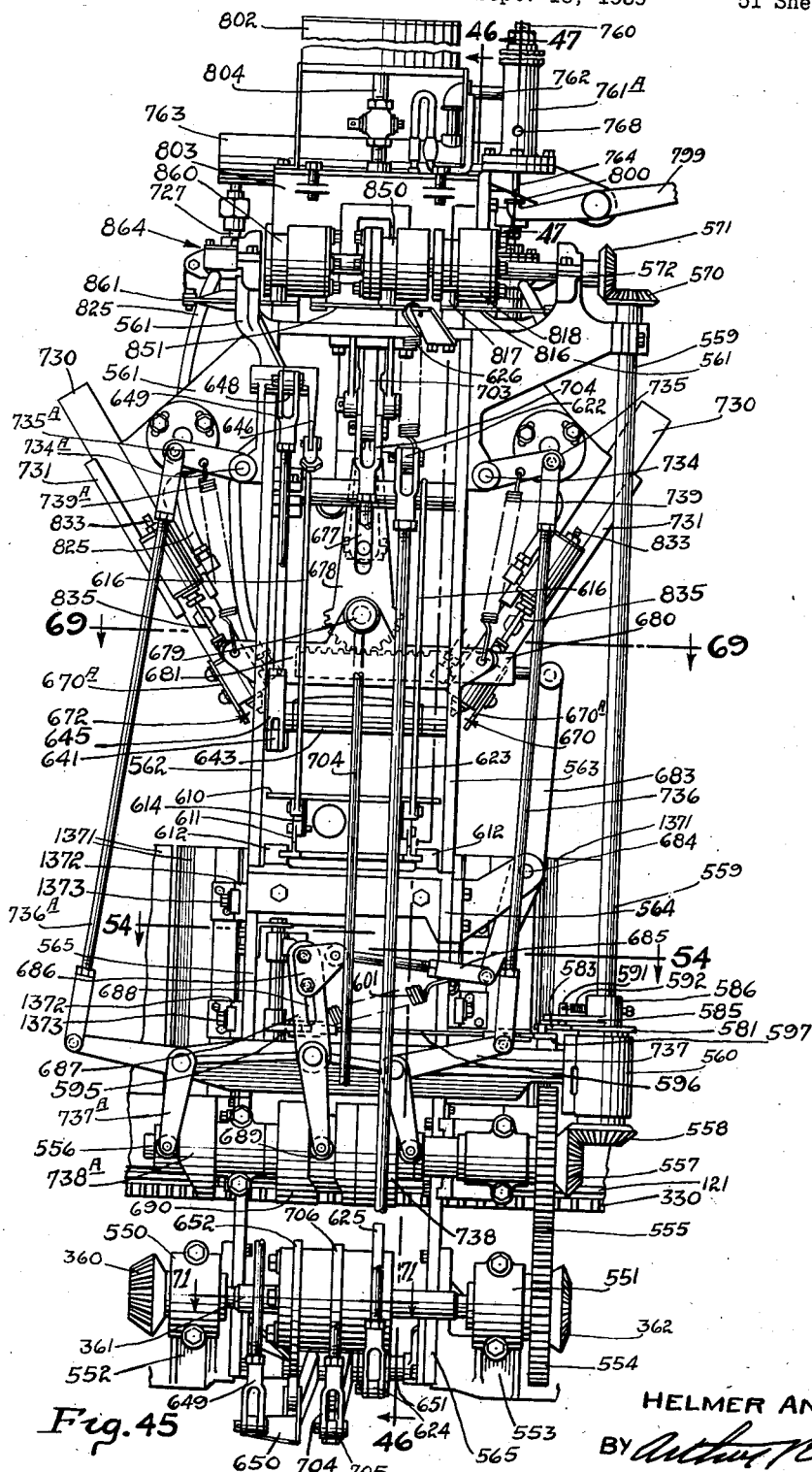
Figure 46:
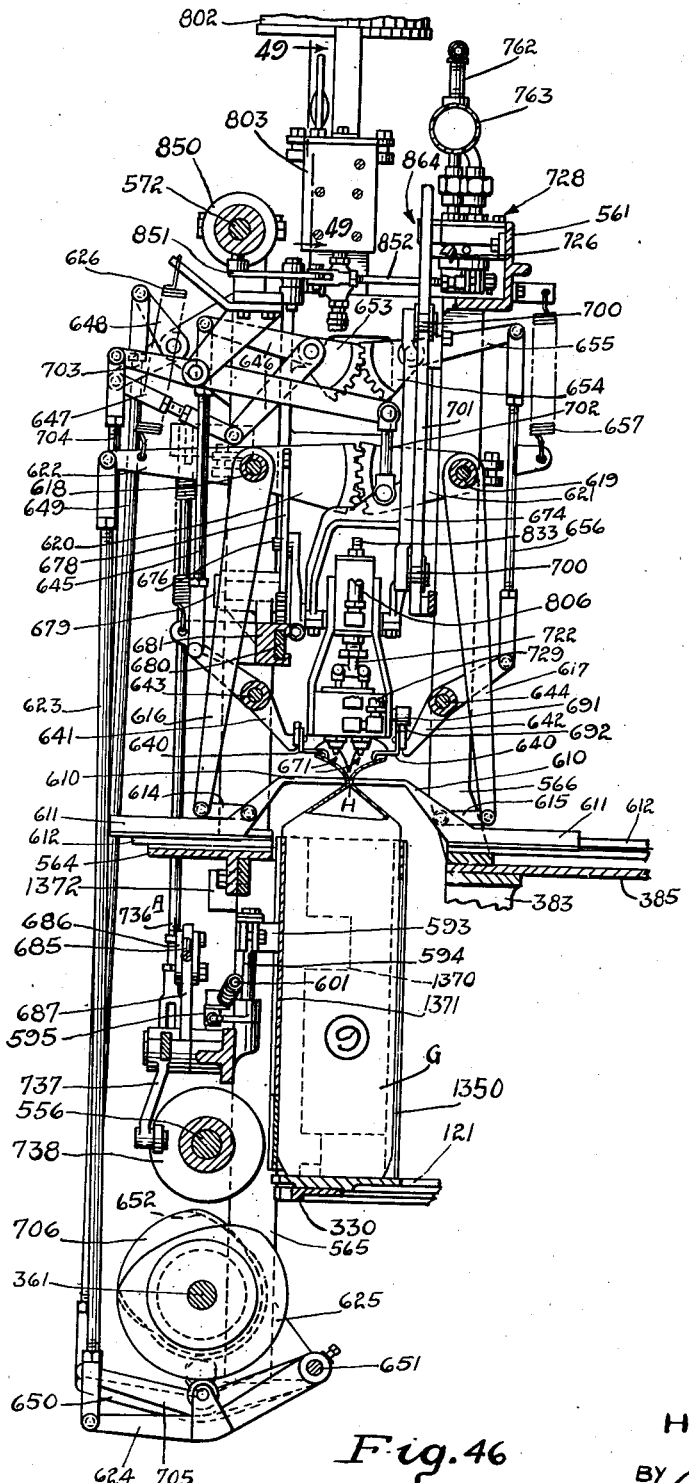
Figure 47:
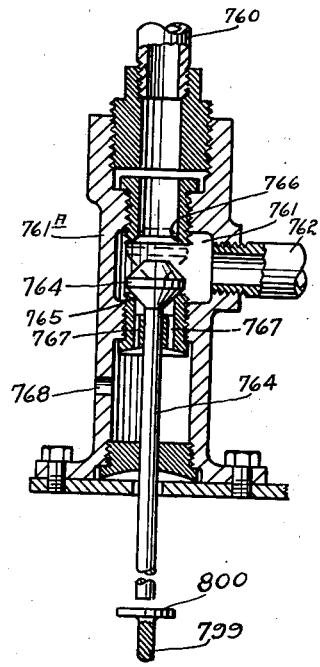
Figures 48, 49:
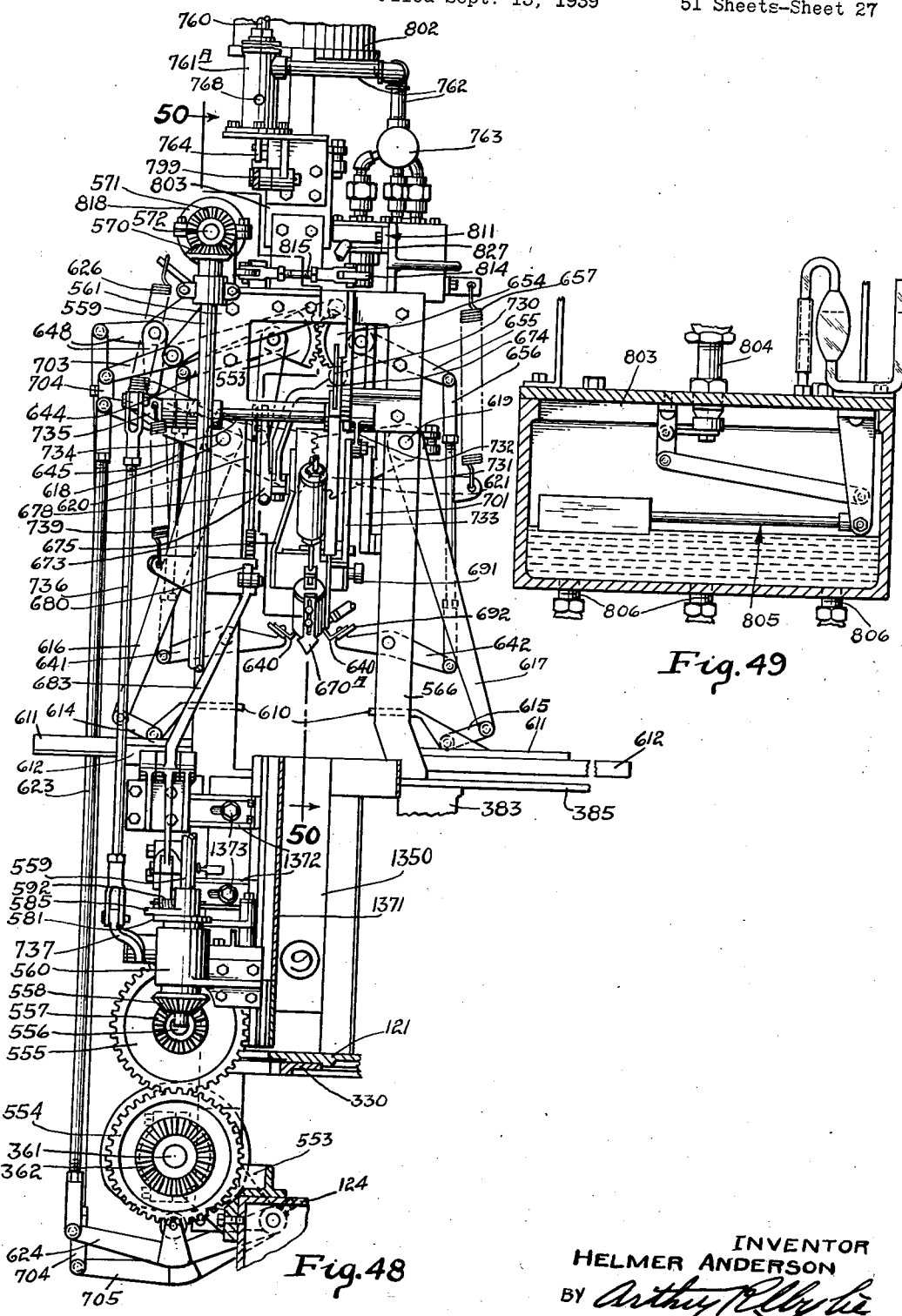
Figure 50:
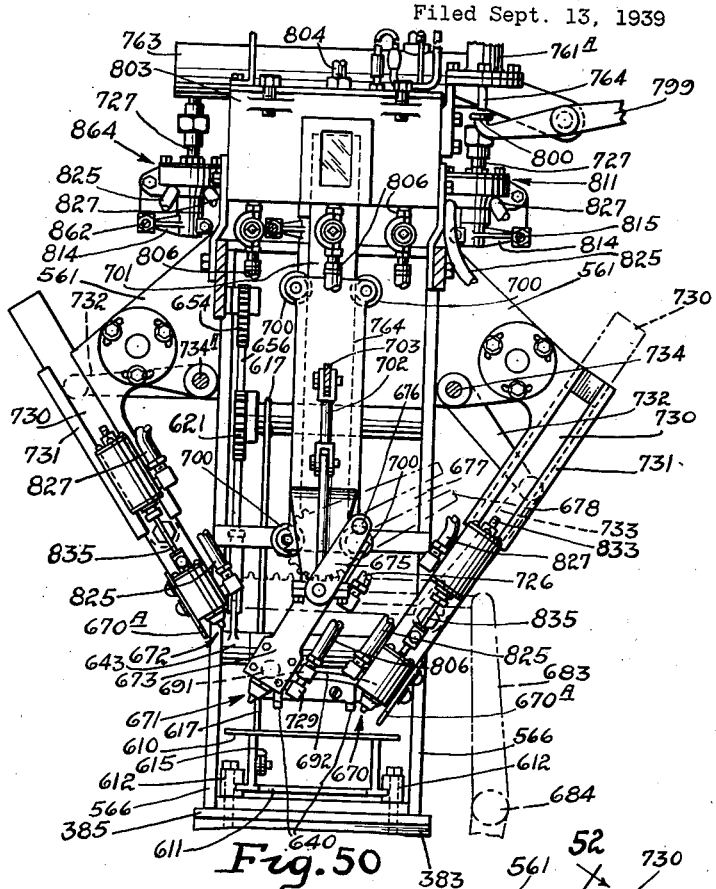
Figure 52:
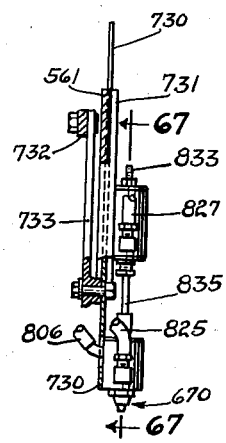
Figure 51:
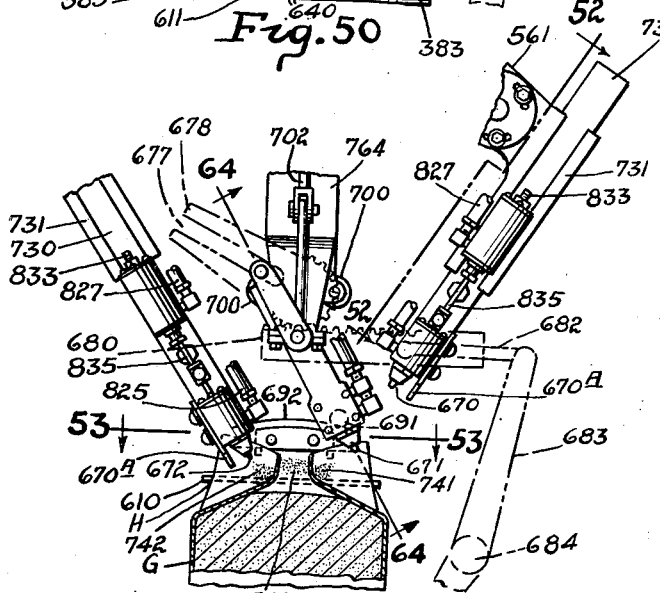
Figure 53:
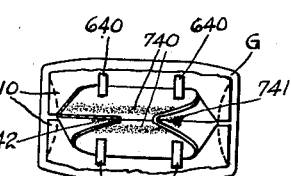
Figure 68:
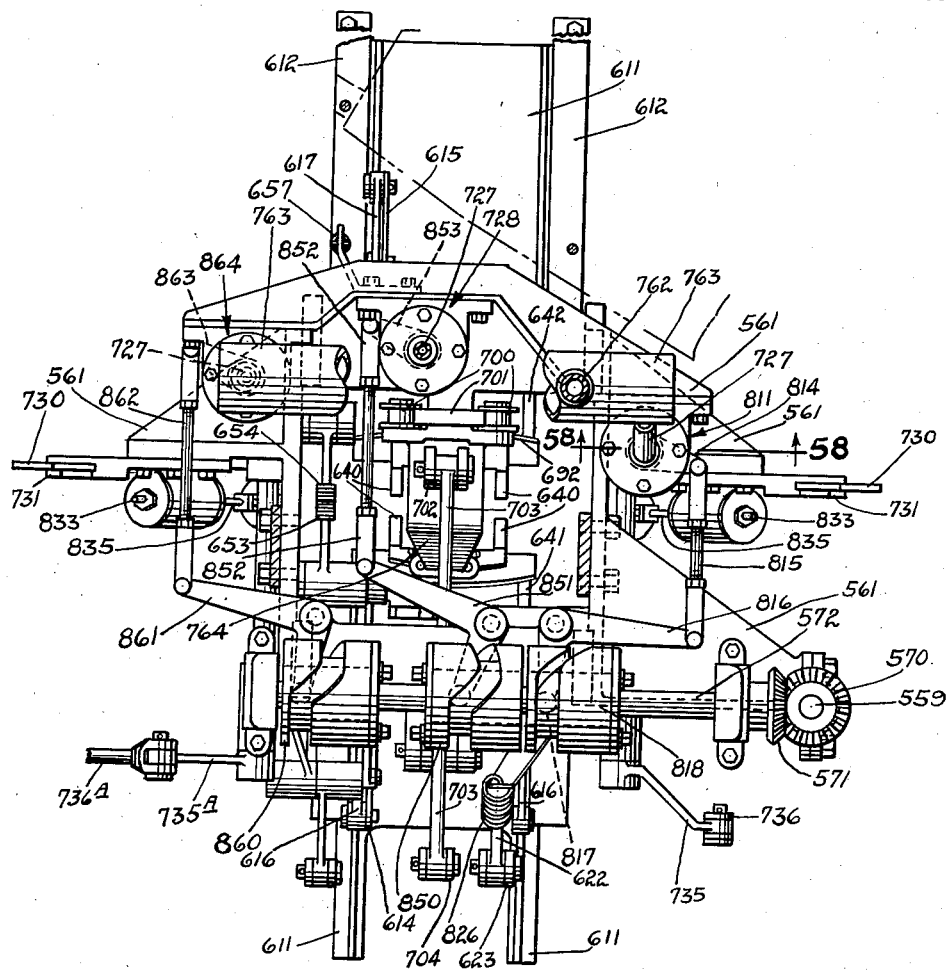
Figure 69:
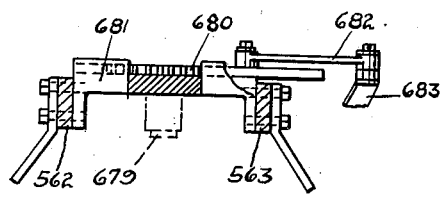
Figure 70:
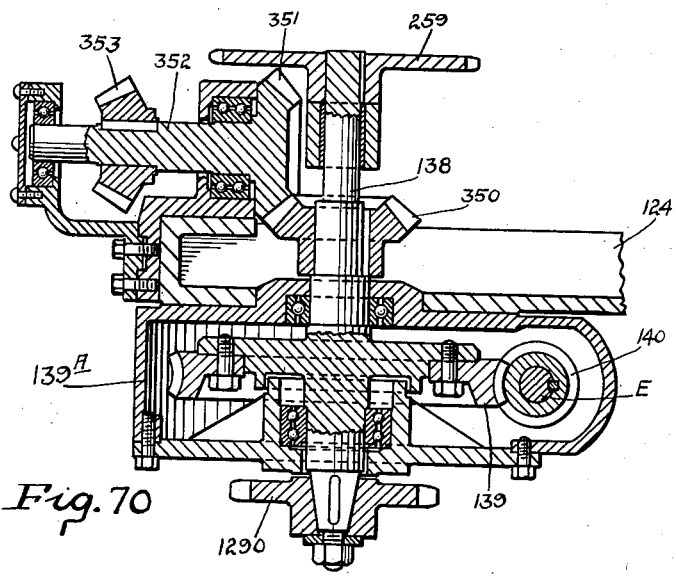
Figure 71:
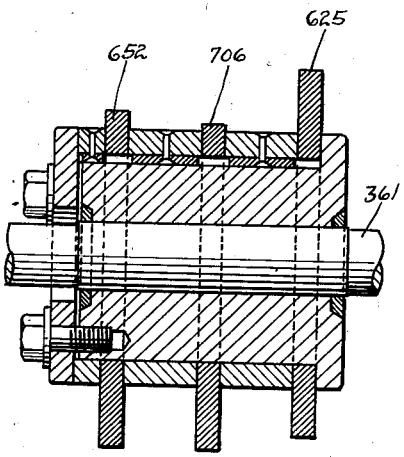
Figure 72:
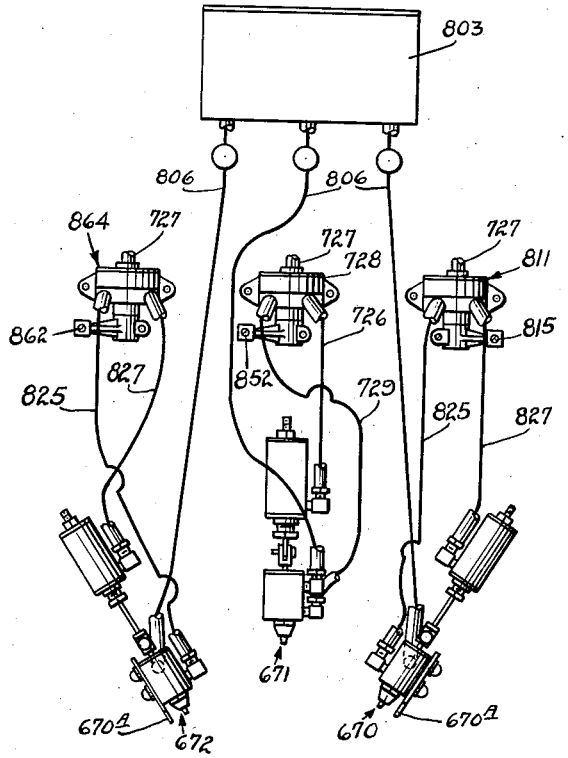
Figures 73, 73A:
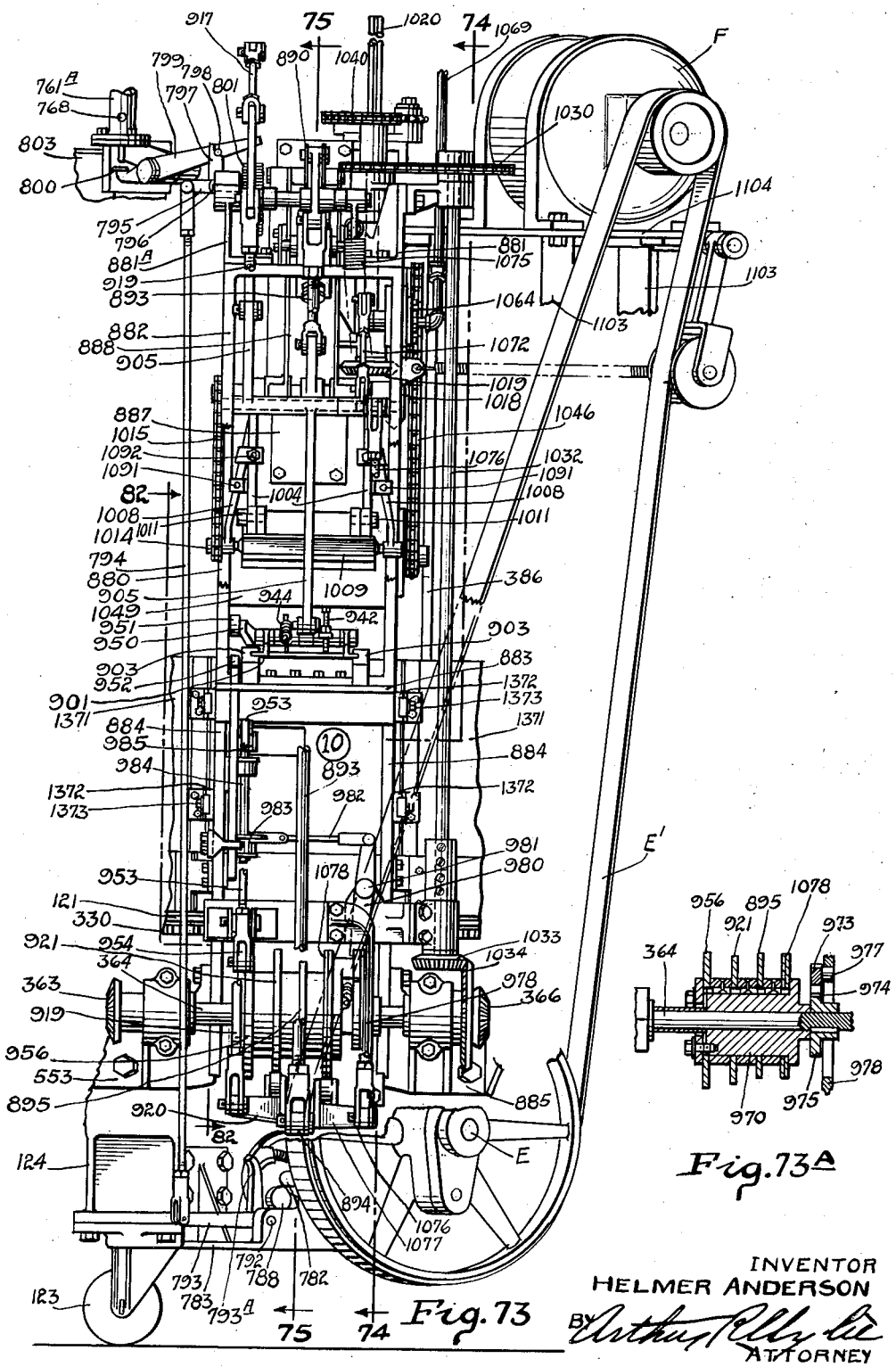
Figure 82:
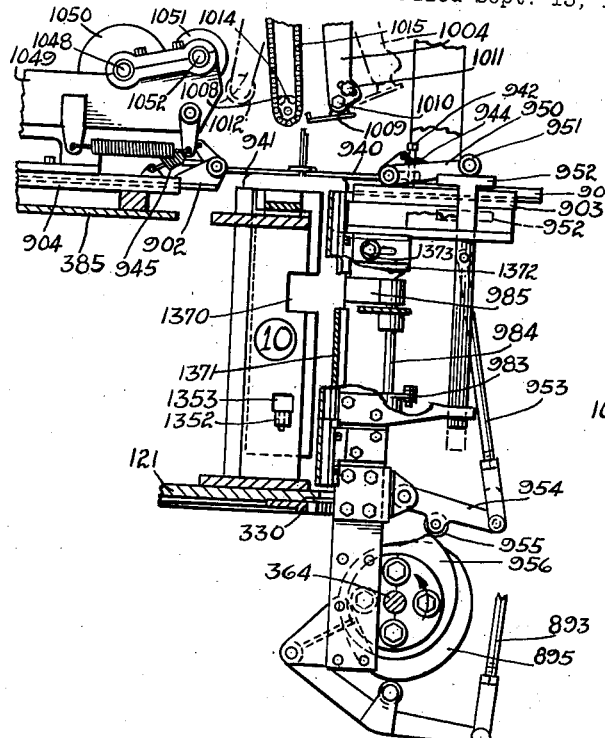
Figure 83:
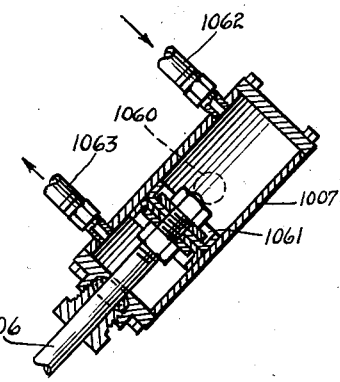
Figure 86:
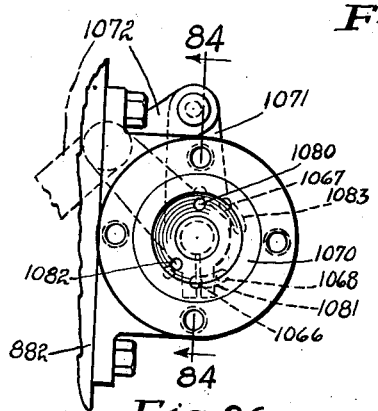
Figure 85:
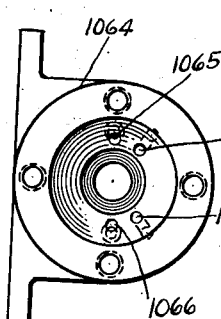
Figure 84:
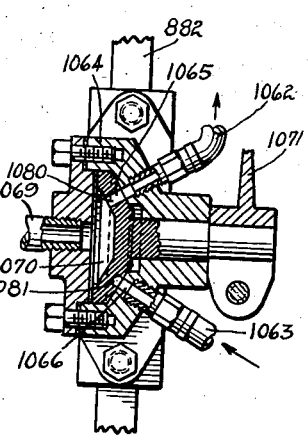
Figure 87:
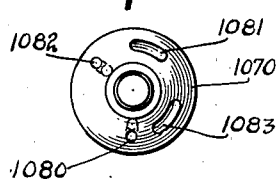
Figure 90:
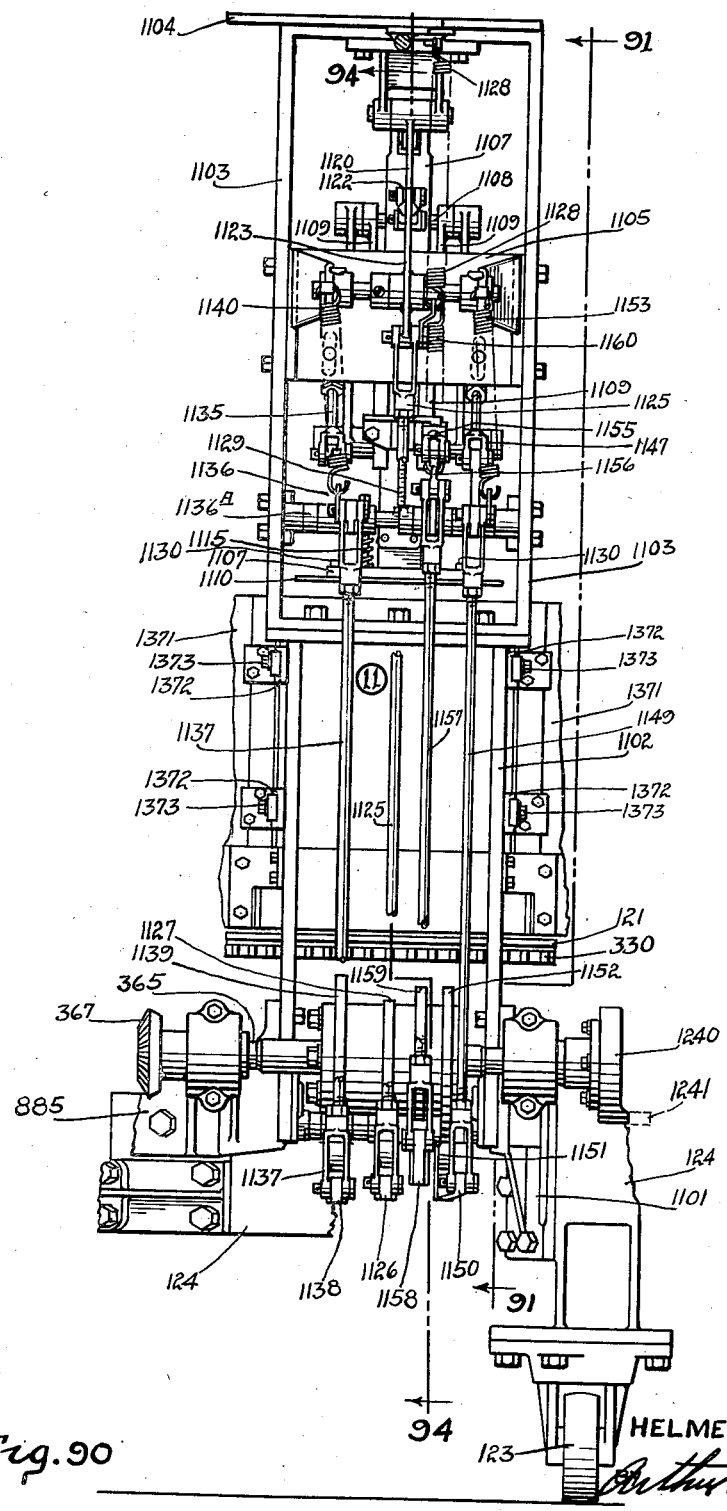
Figure 94:
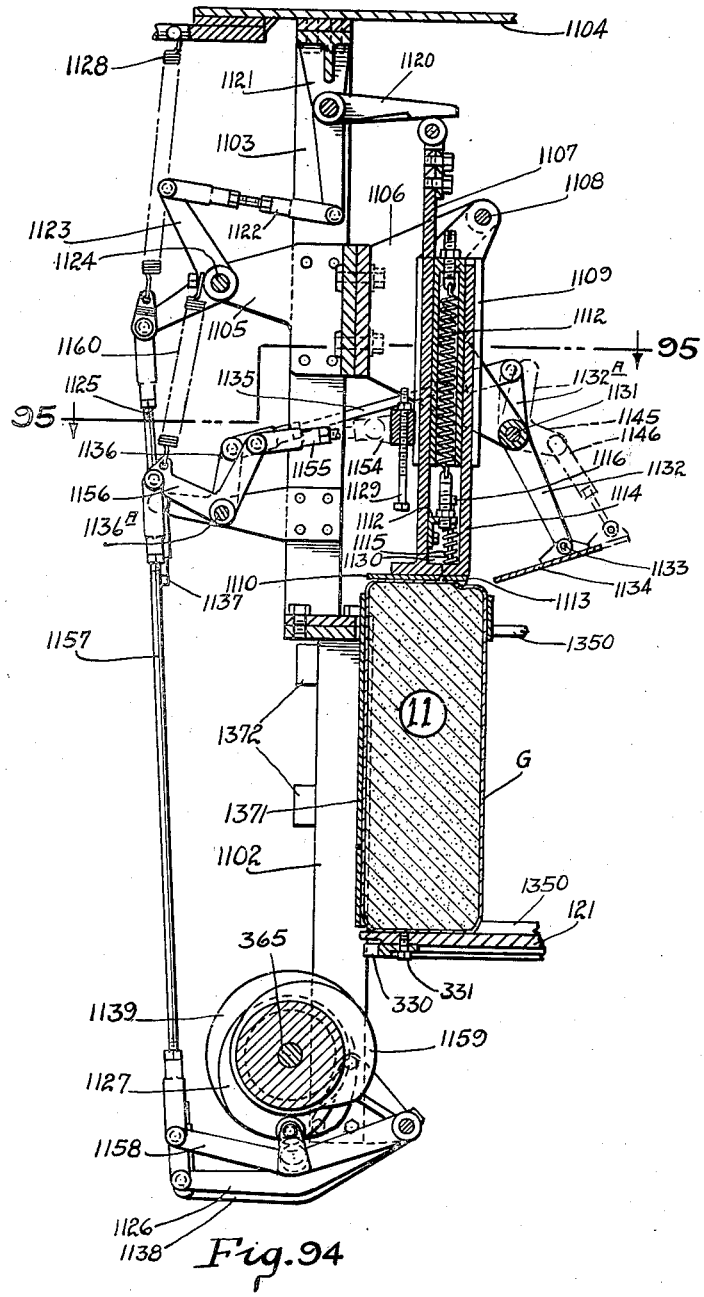
Figure 97:
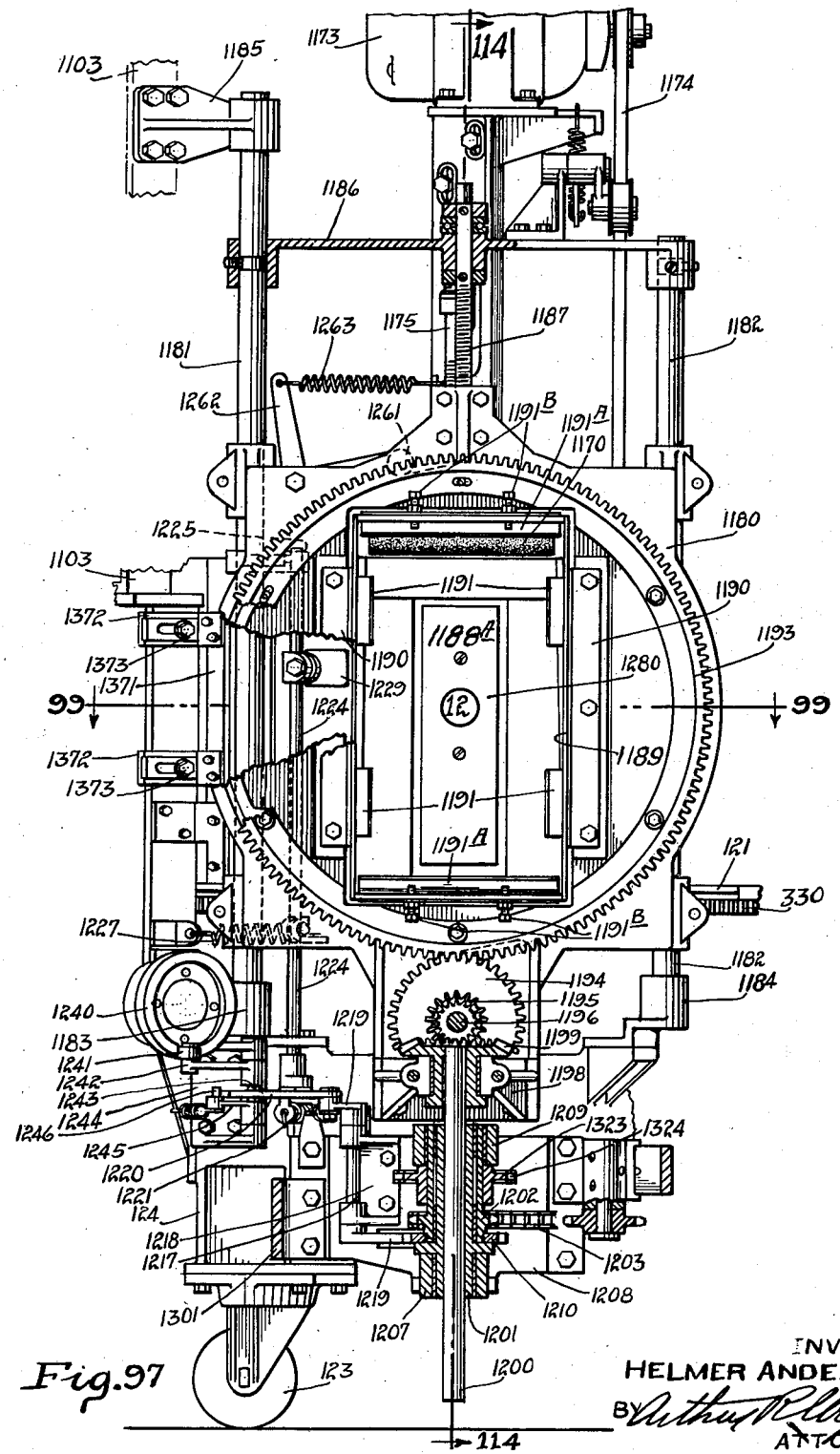
Figure 98:
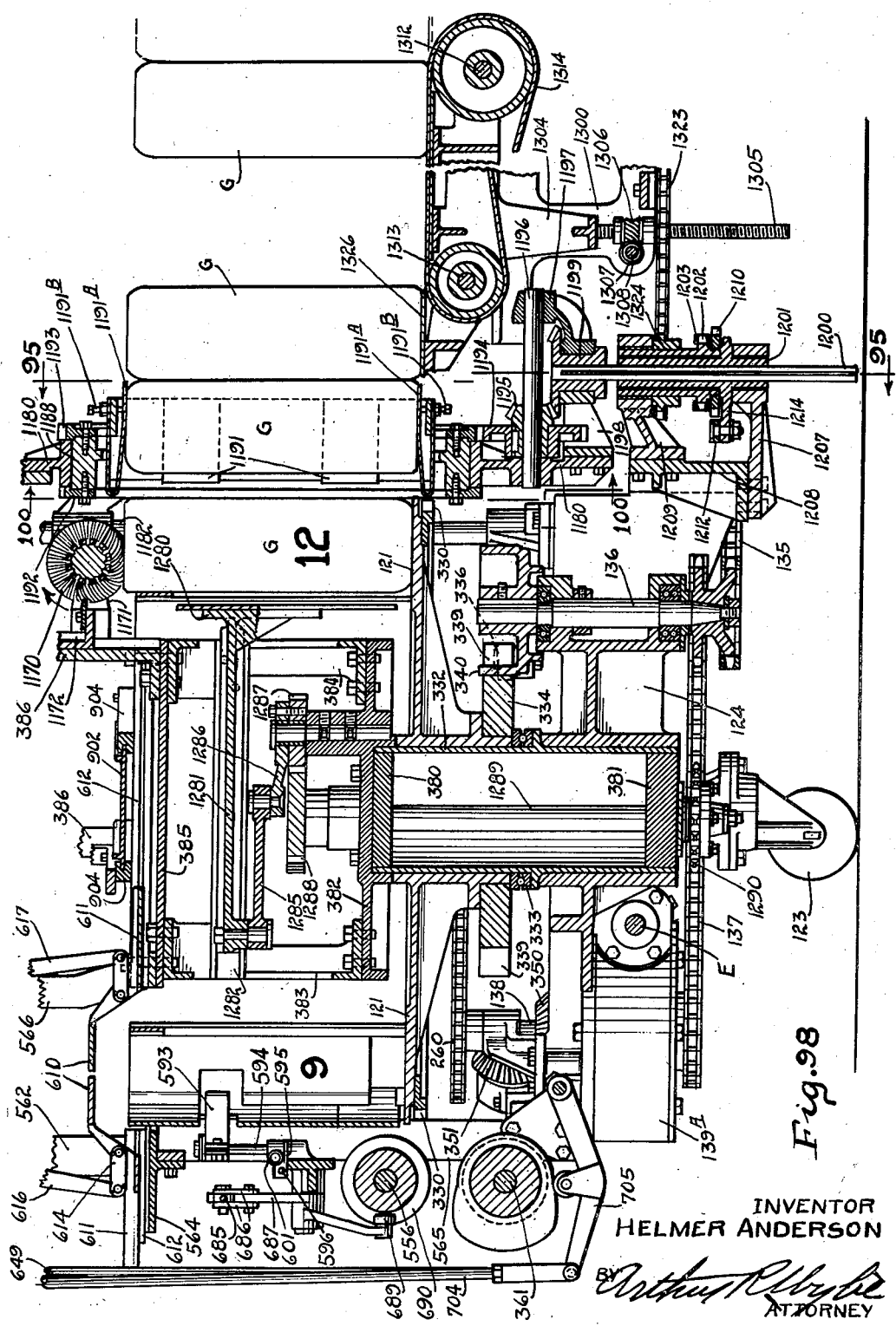
Figure 99:
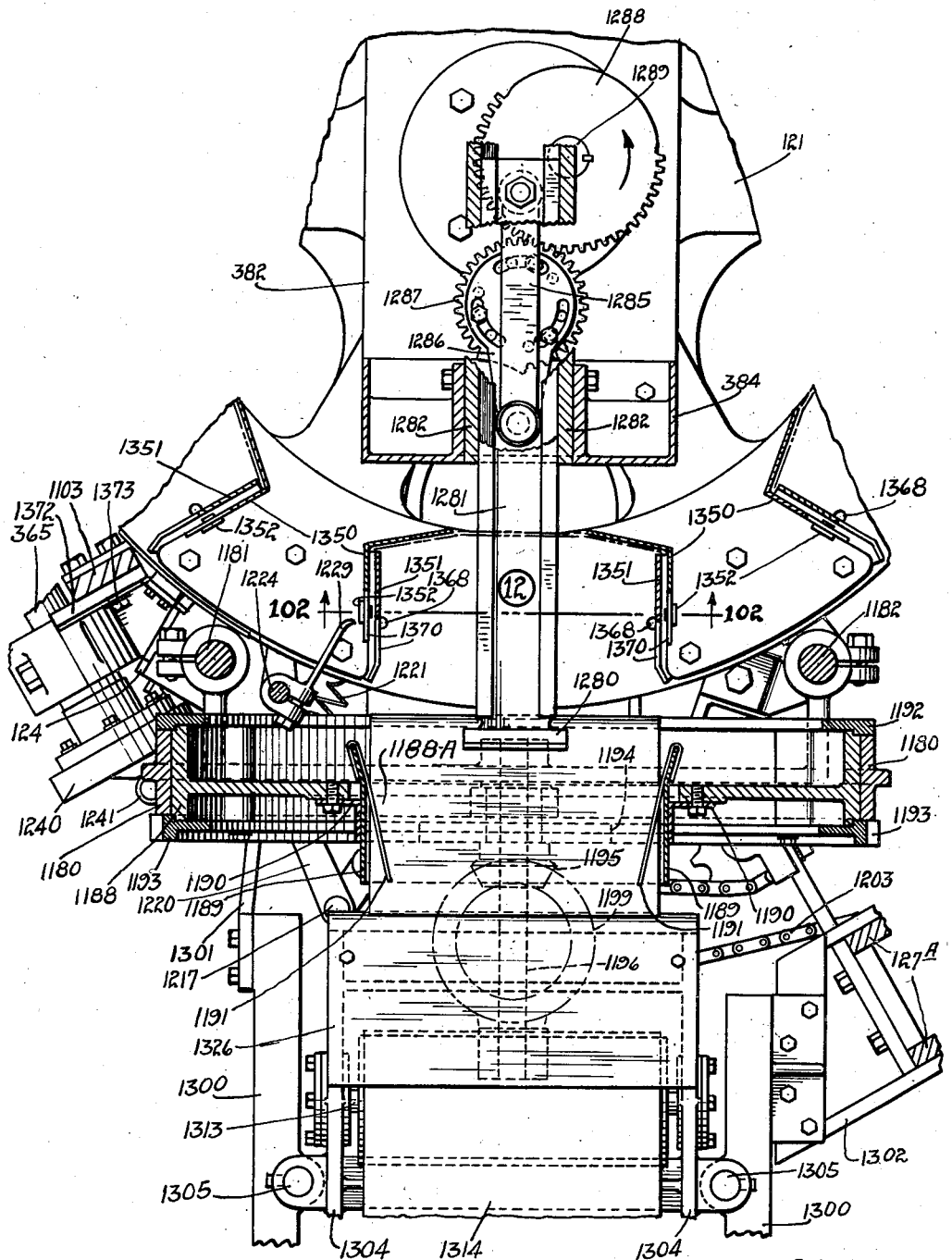
Figure 101:
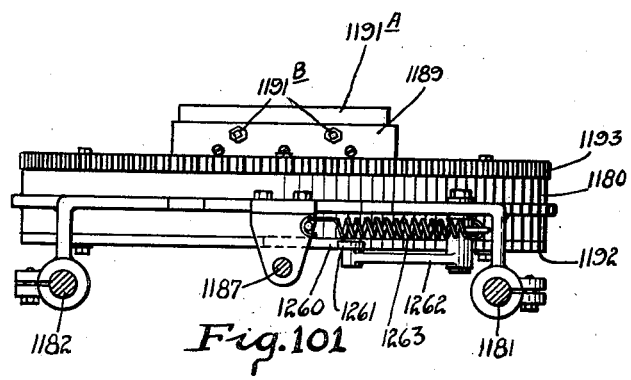
Figure 100:
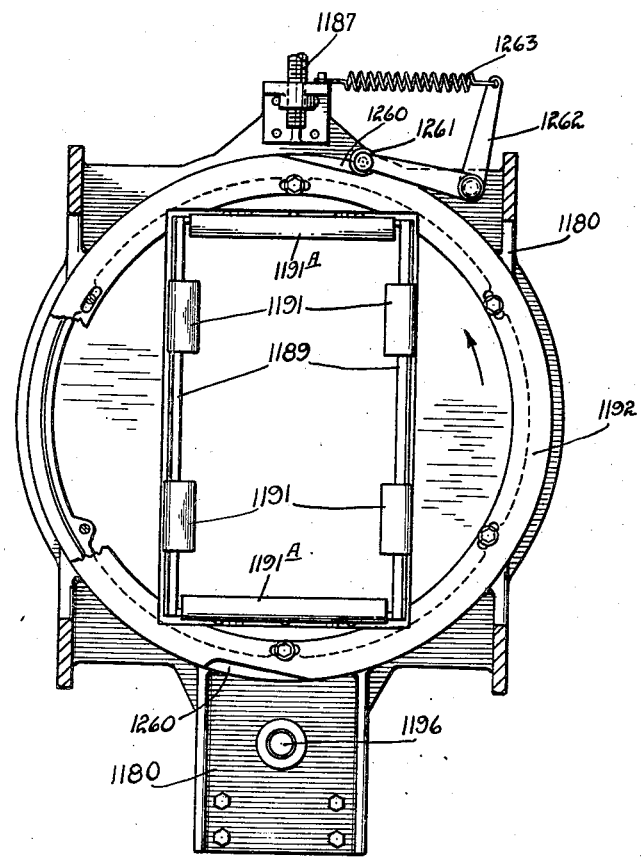
Figure 114:
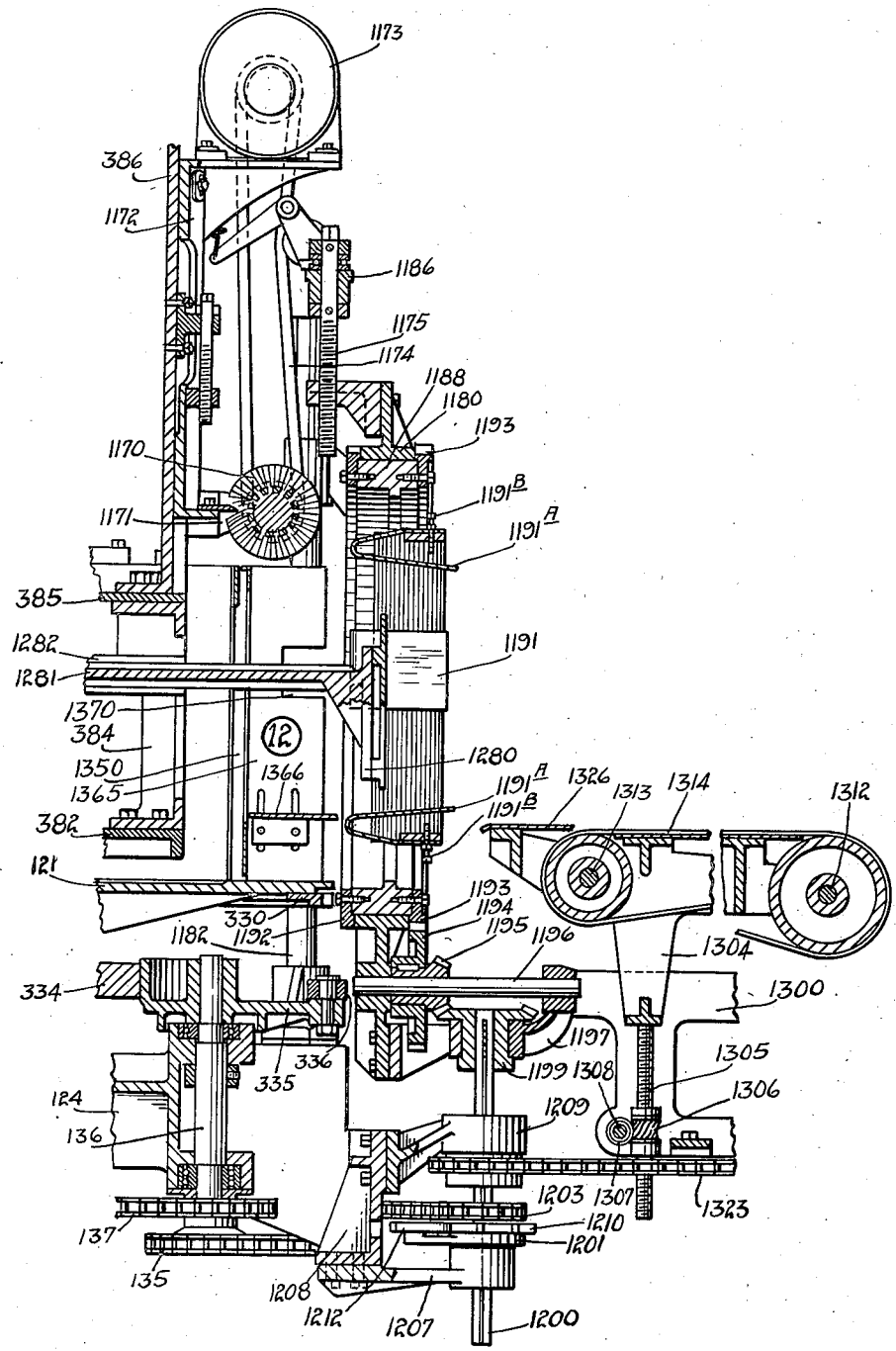

Figs. 11, 12, and 13 are horizontal sections on the lines 11—11, 12—12, and 13—13 on Fig. 10;

Fig. 14 is a partial enlarged section on the line 14—14 of Fig. 32;

Fig. 15 is a partial vertical section on the line 15—15 of Fig. 9;

Fig. 16 is a partial vertical section on the line 16—16 of Fig. 9;

Fig. 17 is a partial vertical section on the line 17—17 of the Fig. 21;

Fig. 18 is an enlarged partial horizontal section on the line 18—18 of Fig. 6;

Fig. 19 is a partial front elevation of the mechanism of Fig. 18;

Fig. 20 is a partial view similar to Fig. 18 showing the pawls held in an inoperative position;

Fig. 21 is a partial horizontal section on the broken line 21—21 of Fig. 7;

Fig. 22 is a partial section on line 22—22 of Fig. 21;

Figs. 23 and 24 are enlarged horizontal sections on lines 23—23 and 24—24 of Fig. 22;

Fig. 25 is a top plan view of the shaper mechanism showing some of the parts broken away;

Fig. 26 is a section on the broken line 26—26 of the line 27;

Fig. 27 is a partial vertical section on the line 7—7 of Fig. 3, but looking in the reverse direction; adapters shown at the right and left sides of the figure;

Fig. 28 is a partial top plan view partly in sections showing the shaper turn table with adapters applied thereto for smaller bags;

Fig. 29 is a partial top plan view similar to Fig. 3 showing Station 1 of the shaper with adapters applied to the several parts to accomodate them to smaller bags;

Fig. 30 is a partial section on the line 30—30 of Fig. 28;

Fig. 31 is a partial enlarged section on the broken line 31—31 of the Fig. 32 showing the squeeze-plates of Stations 2 to 5 inclusive and the ejector-ram at Station 6;

Fig. 32 is a vertical section on the line 7—7 of Fig. 3 but viewed in the opposite direction and combines with Fig. 75 to make a complete vertical section through the machine;

Fig. 33 is a partial front elevation of Station 8 of the sealer mechanism;

Figs. 34 and 35 are partial vertical sections on the lines 34—34 and 35—35 of Fig. 33;

Fig. 35A is a partial enlarged longitudinal section on the line 35A of Fig. 35;

Fig. 36 is a schematic view showing the tucker plates in entering and in full position;

Fig. 37 is a partial section on the line 37—37 of Fig. 38 showing the relative position of the tucker-plates, spreader plates, during the creasing operation;

Fig. 38 is a partial vertical section on the line 38—38 of Fig. 34;

Figs. 39, 40 and 41 are partial enlarged views similar to the upper portions of Fig. 35 showing the tucker and spreader-plates in various positions during the operation of increasing the upper part of the bag; gripping and drawing the bag with its contents upwardly and releasing and spreading the mouth of the bag while the lower intermediate portion is held tightly closed;

Fig. 42 is a perspective view of a bag as it leaves the mechanism of Fig. 41;

Fig. 43 is a partial plan view of the mechanism of Fig. 8 for scoring, closing, lifting and opening the bag top;

Fig. 44 is a partial reduced section of line 44—44 of Fig. 40;

Fig. 45 is a partial front elevation showing the mechanism for operating station for applying adhesive to the inner face of the mouth of the bag and to the facing outer-side portions;

Fig. 46 is a partial vertical section on line 46—46 of Fig. 45;

Fig. 47 is a partial enlarged section on line 47—47 of Fig. 45 showing the safety valve for preventing the flow of adhesive to the nozzles when no bag is in the position to receive it;

Fig. 48 is a partial side elevation of the mechanism of Fig. 45;

Fig. 49 is a partial enlarged section on the line 49—49 of Fig. 46 showing the glue tank;

Fig. 50 is a section on line 50—50 of Fig. 48;

Fig. 51 is a similar view showing a different position of the glue nozzles;

Fig. 52 is a section on the line 52—52 of Fig. 51;

Fig. 53 is a top plan view partly in section of a bag showing the fingers for holding the top of the bag open as viewed on the line 53—53 of Fig. 51;

Fig. 54 is a partial horizontal section on the line 54—54 of the Fig. 45;

Fig. 55 is a partial section on line 55—55 of Fig. 54;

Fig. 56 is an enlarged partial section on the broken line 56—56 of the Figure 54;

Fig. 57 is a view of some of the parts of Fig. 54 showing a locking-pawl in operative position;

Fig. 58 is a partial enlarged section on line 58—58 of Fig. 68 showing a cross section of the air valve;

Fig. 59 is a partial section on the line 59—59 of the Fig. 58;

Figs. 60, 61, and 62 are viewed similar to Fig. 59 showing the parts in different positions;

Fig. 61A is a section on the line 61A—61A of Fig. 61;

Fig. 63 is a bottom plan view of the air valve;

Fig. 64 is an enlarged partial section on the line 64—64 of Fig. 51 showing the glue nozzles;

Fig. 65 is an enlarged view of one glue nozzle;

Fig. 66 is a section on the line 66—66 of Fig. 65;

Fig. 67 is an enlarged partial section on the line 67—67 of Fig. 52;

Fig. 68 is a top plan view of the glue mechanism showing parts such as the glue tank omitted;

Fig. 69 is a partial section on the line 69—69 of Fig. 45;

Fig. 70 is a partial enlarged section on line 70 of Fig. 54;

Fig. 71 is a partial enlarged section on line 71—71 of Fig. 45;

Fig. 72 is a diagrammatic view of the glue nozzles and the glue lines leading thereto;

Fig. 73 is a front elevation of the mechanism for operating Station 10 which supplies glue to the outer over-lapping edges of the bag top, and which, at the same time spreads the glue previously applied at Station 9;

Fig. 73—A is a partial section on line 73A—73A of Fig. 74;

Fig. 74 is a partial section on the line 74—74 of Fig. 73;

Fig. 75 is a vertical section on the line 75—75 of the Fig. 73 and combines with Fig. 32 to make a complete section through the machine;

Fig. 76 is a partial section on the line 76—76 of Fig. 74;

Fig. 77 is a partial section on the line 77—77 of Fig. 74 showing the plates for closing and gripping the top of the bag to prevent glue from flowing in the same;

Fig. 78 is a detail view of the bearing-bracket of Fig. 77;

Fig. 79 is a top plan view showing the mechanism for operating the enclosure of Station 10;

Fig. 80 is a partial enlarged detail view of a portion of the mechanism of Fig. 73—A;

Fig. 81 is a partial enlarged vertical section on the line 81—81 of Fig. 74;

Fig. 82 is a partial enlarged vertical section on the line 82—82 of the Fig. 73;

Fig. 83 is a detail of a pneumatic piston for operating the gluing and gripping mechanism of Fig. 75;

Fig. 84 is a partial enlarged section on the line 84—84 of Fig. 74;

Fig. 85 is a view of the valve body of Fig. 84 showing the valve and cover removed;

Fig. 86 is a similar view showing the valve inserted but in a different relative position;

Fig. 87 is a bottom plan view of the valve of Fig. 84;

Fig. 88 is a partial enlarged section of the line 88—88 of Fig. 74;

Fig. 89 is a side elevation of a bag as it leaves Station 10;

Fig. 90 is a front elevation of the bag-closing mechanism of Station 11;

Fig. 91 is a partial vertical section on the line 91—91 of the Fig. 90;

Fig. 92 is a diagrammatic view showing final folding of the bag top preparatory to closing it;

Fig. 93 shows the same mechanism in the next step;

Fig. 93—A is a view showing the closure plate pressing the outer portion of the glued top of the bag, into contact with the bag top;

Fig. 93B is a partial plan view of the bag showing the bag top closed;

Fig. 94 is a similar view showing the pressure plate squeezing the air out of the bag top and applying further pressure to the closure plate to completely seal the bag;

Fig. 95 is a partial section on the line 95—95 of the Fig. 94;

Fig. 96 is an enlarged bottom plan view of the closure and pressure plates;

Fig. 97 is the front elevation, partly in sections showing the mechanism for ejecting the bag from the closure and for inserting the same;

Fig. 98 is a partial enlarged section on the line 98—98 of Fig. 4;

Fig. 99 is a partial enlarged section on line 99—99 of Fig. 97;

Fig. 100 is a view partly in sections, taken on the line 100—100 of Fig. 98;

Fig. 101 is a plan view of the same;

Fig. 102 is a vertical section on the line 102—102 of Fig. 99;

Fig. 103 is a side elevation of a portion of the same;

Fig. 104 is a detail of the clutch and trip mechanism for operating the inserter mechanism;

Fig. 105 another view of the same, showing the pawl disengaged from the trip mechanism;

Fig. 106 is an enlarged partial side elevation of the clutch mechanism;

Fig. 107 is a side elevation of the conveyor for moving the finished bags from the machine;

Fig. 108 is a partial section on the line 108—108 of Fig. 107;

Fig. 109 is a vertical section on the line 109—109 of Fig. 107;

Fig. 110 is a perspective view of a sealed bag as delivered from the machine;

Fig. 111 is a partial top plan view showing any of the stations of the sealer with an adapter therein to accommodate the same for smaller bags;

Fig. 112 is a front elevation of the same, partially in sections;

Fig. 113 is a partial side elevation of one of the adapters showing the cap screws and slots for permitting adjustment for various sizes of bags; and Fig. 114 is a vertical section on the line 114—114 of Fig. 97 showing the apparatus with adapters for a smaller sized bag.

Figure 1:
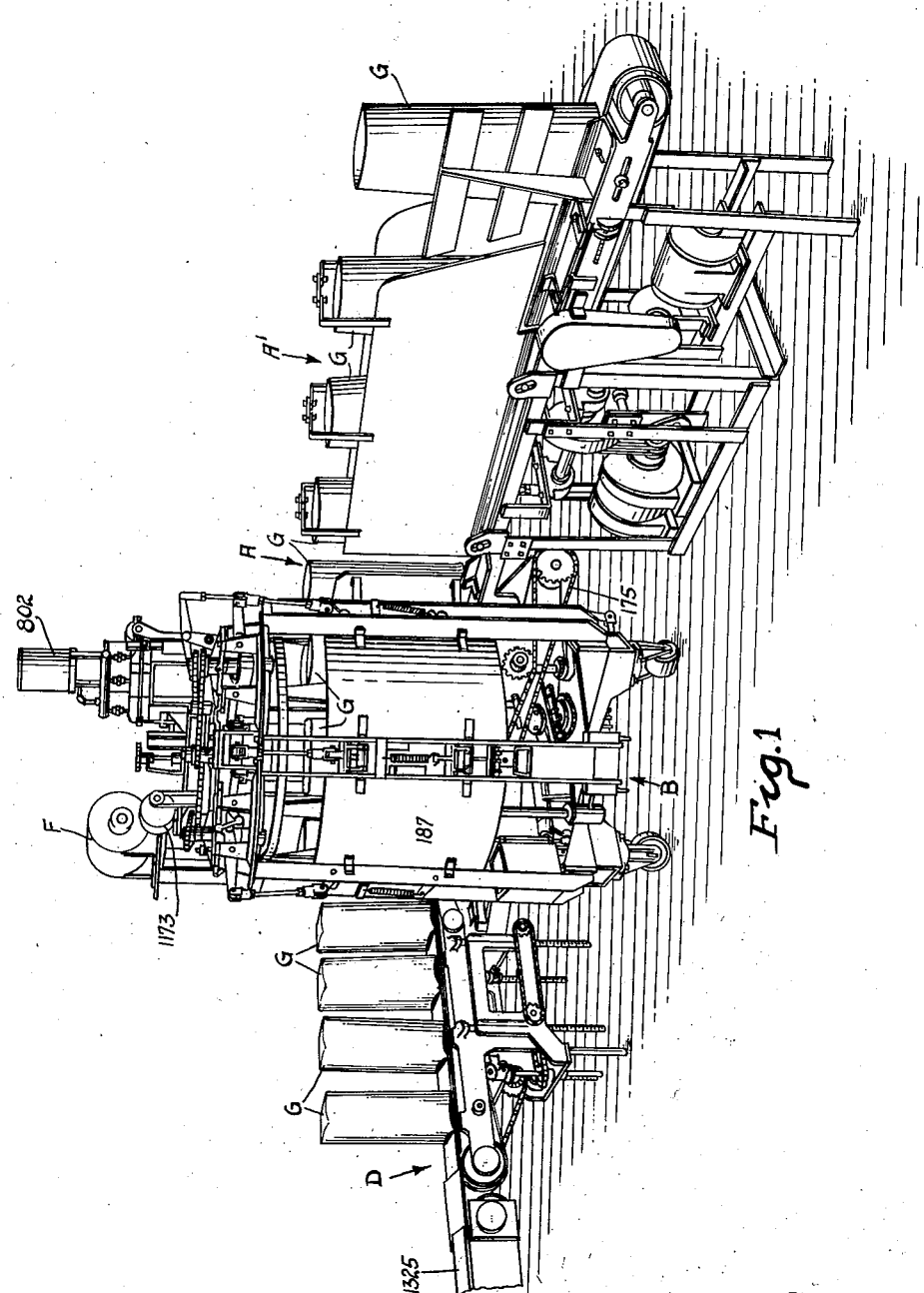

The embodiment illustrated comprises essentially a conveyor unit A which passes the paper bags filled with granular material such as flour, sugar, coffee, and the like. When they contain flour, it is necessary to properly pack the flour in the bag before it reaches the conveyor A by means of a vibrator unit A' as shown in Fig. 1. This latter unit is shown in my patent application Serial Number 284,423, filed July 14, 1939. The methods employed are in part improvements on those of my Patent No. 2,087,934, granted July 27, 1937.

The bags standing vertically on the conveyor A are brought up to the shaper from the right as indicated by the arrow in Fig. 3 and are then fed by means of a ram inwardly as indicated by the arrow to Station 1 of the shaper. From here, they pass through successive stages to Stations 2, 3, 4, 5, and 6 of the shaper in a clock-wise direction. The bag is then transferred to Station 7 of the sealer which has Station 7 to 12 inclusive where the top of the bag is formed, glued and sealed.

The bag stands upright throughout the various stations of the shaper and sealer. As it passes through the shaper, the bag is shaped to assume a nearly rectangular horizontal cross section and at the same time, it is acted upon by a series of shakers at Stations 2, 3, 4, and 5. The shaping of the bag is accomplished by a series of squeeze plates all of which will later be described in detail.

Upon reaching Station 6, the bag is transferred by means of a ram to Station 7 of the sealer; the bag then proceeding in a counter-clock-wise direction through the sealer through Stations 7 to 12, inclusive, after which the bag is inverted and passed on to the conveyor D (Fig. 1). In passing through the several stations of the sealer, the top of the bag is scored both longitudinally and transversely, after which the glue is applied on both the inside and outside so that on closing, the bag will be completely sealed. At adjacent stations the glue is spread, the top of the bag is closed and sealed and is later finally held while the glue or other adhesive sets. All these steps are automatic and the bag is then completely sealed and is provided at its upper end with two handholds whereby the bag may be lifted and carried from one position to another.

Stations 1 to 6 of the shaper and Stations 7 to 12 of the sealer are marked by each number being made prominent.

Figures 3 and 4, taken together, give a good idea of the general arrangement of the parts of the machine which are driven by means of a shaft E from any suitable source of power, such as the belt E driven by a motor F, as shown in Fig. 73.

The circular movement of the bags through the shaper is accomplished by means of a turn table 120 (Figs. 3 and 5) and the movement through the sealer is accomplished by means of a turn table 121 (Fig. 4). These two turn tables are geared to run in opposite directions, as will later be described.

The shaper has a main frame 122, preferably mounted on casters 123 and this frame is bolted to the main frame casting 124 of the sealer, as shown in Fig. 32. Columns 125 rise from the main frame casting 122 and serve to rigidly support a center casting 126.

Figure 5:
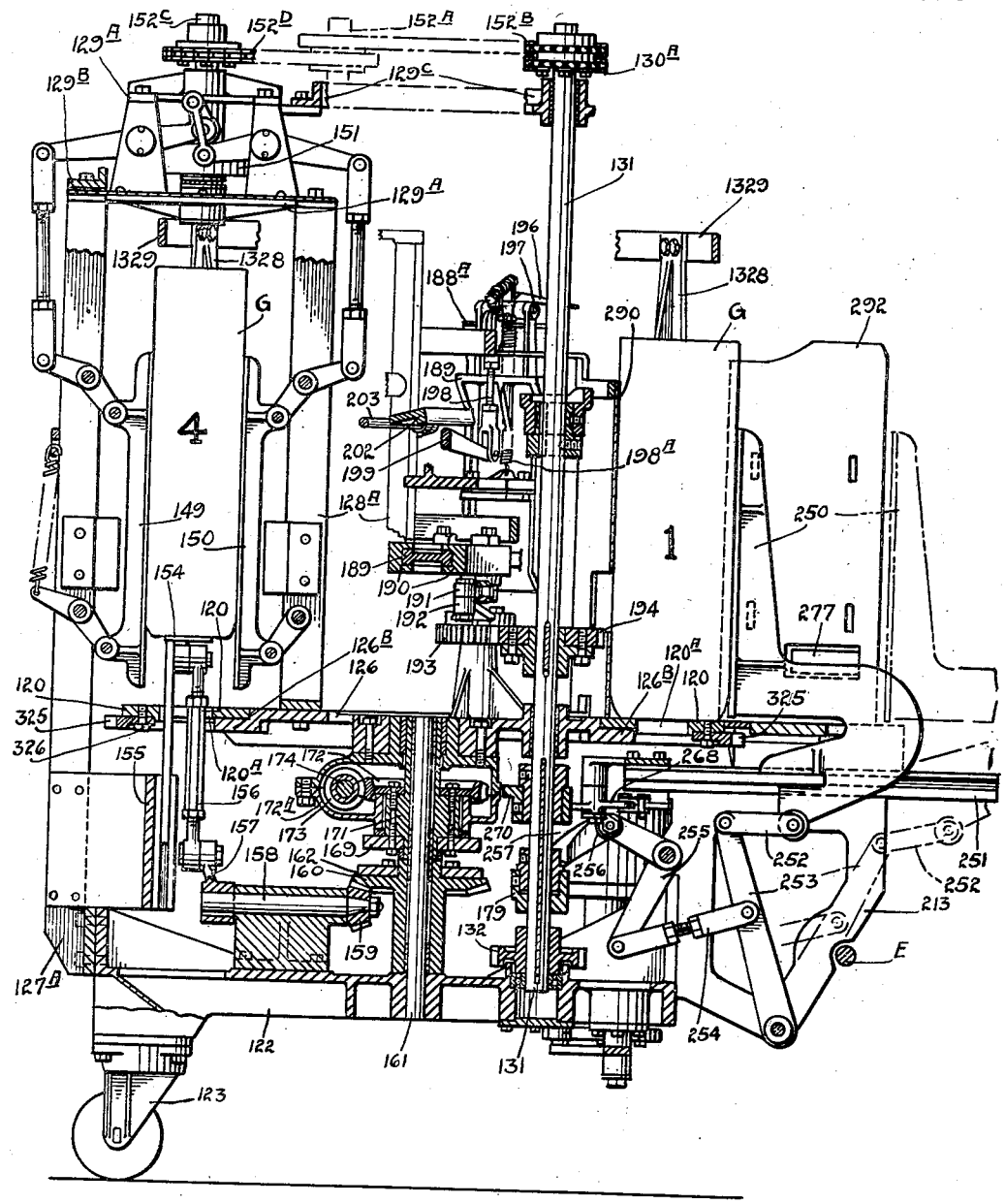
Fig. 5 is a vertical section on the line 5—5 of Fig. 3.

Beginning with Station 2 (Fig. 3) uprights 127 are secured to the main casting, while the uprights 128 are secured to the center casting 126 (Fig. 6). These serve to support a casting 129 in which is journaled a shaft 130 which has keyed thereto a sprocket by means of which it is driven by a chain 130—A from a vertical power shaft 131 (Figs. 5 and 25). This power shaft has an intermittent gear 132 keyed thereon and this meshes with and is driven by the interrupted gear 133 on a shaft 134 (Figs. 6, 18 and 19) which is driven by means of sprockets and a chain 135 (Fig. 2) from a shaft 136. The shaft 136 in turn is driven by means of sprockets and a chain 137 from a shaft 138. The shaft 138 is driven by means of a worm-wheel 139 within a housing 139—A and a worm 140 on the main shaft E (Fig. 70).

A pair of interrupted gears 132 and 133 (Fig. 2) cause the shaft 131 to be driven something less than half the time, while the shaft 134 is continuously driven. Thus the shaft 130 (Fig. 6) is likewise intermittently driven. The latter shaft carries a cam 141 on which operates a cam-follower-roller which is carried by the inner end of the rocker lever 142. The outer end of the lever carrying a link 143 which is connected at its opposite end with a bell-crank 144; the opposite end of the bell-crank being connected to the upper end of the squeeze plate 145. A similar bell-crank 146 mounted on the support 127, insures a parallel motion of the squeeze plate. A spring 147 tends to return the squeeze plate to its normal inoperative position as shown in Fig. 6. A squeeze plate 148 is similarly mounted on the support 128 and is likewise driven from the lever 142 by means of a link 142—A, a lever 142—B and a link 143—A. The similarity of the mounting and the motion of these parts will readily be seen from Fig. 6. As will later be seen, the squeeze plates and their operative parts of Stations 3, 4 and 5 are similar to those of Station 2 except for the shape of the operating cams. They will therefore not be described in detail.

Referring now to Fig. 7, it will be seen that squeeze plates 149 and 150 are located at Stations 3, 4 and 5 of the shaper and are mounted in a manner similar to that of the squeeze plates 145 and 148 of Fig. 6. These squeeze plates are similarly moved in and out by means of a cam 151 on a shaft 152, which is driven from the shaft 131 (Fig. 25) by means of sprockets and a chain 153. The shaft 152 is journalled at its lower end in a casting 129—A which is carried on uprights 127—A and 128—A from the main shaper frame. In this instance, the cam 151 has a high point 151—A which causes the plates to be moved in and then, as the follower passes this high point of the cam, it rides on the straight portion 151—B, which provides a period of dwell. This enables the bag to be first squeezed and then somewhat released and supported while it is being shaken as will now be described. The castings 129 and 129—A are connected by means of tie bars 129—B on the outside and by an inner ring 129—C.

Figure 2:
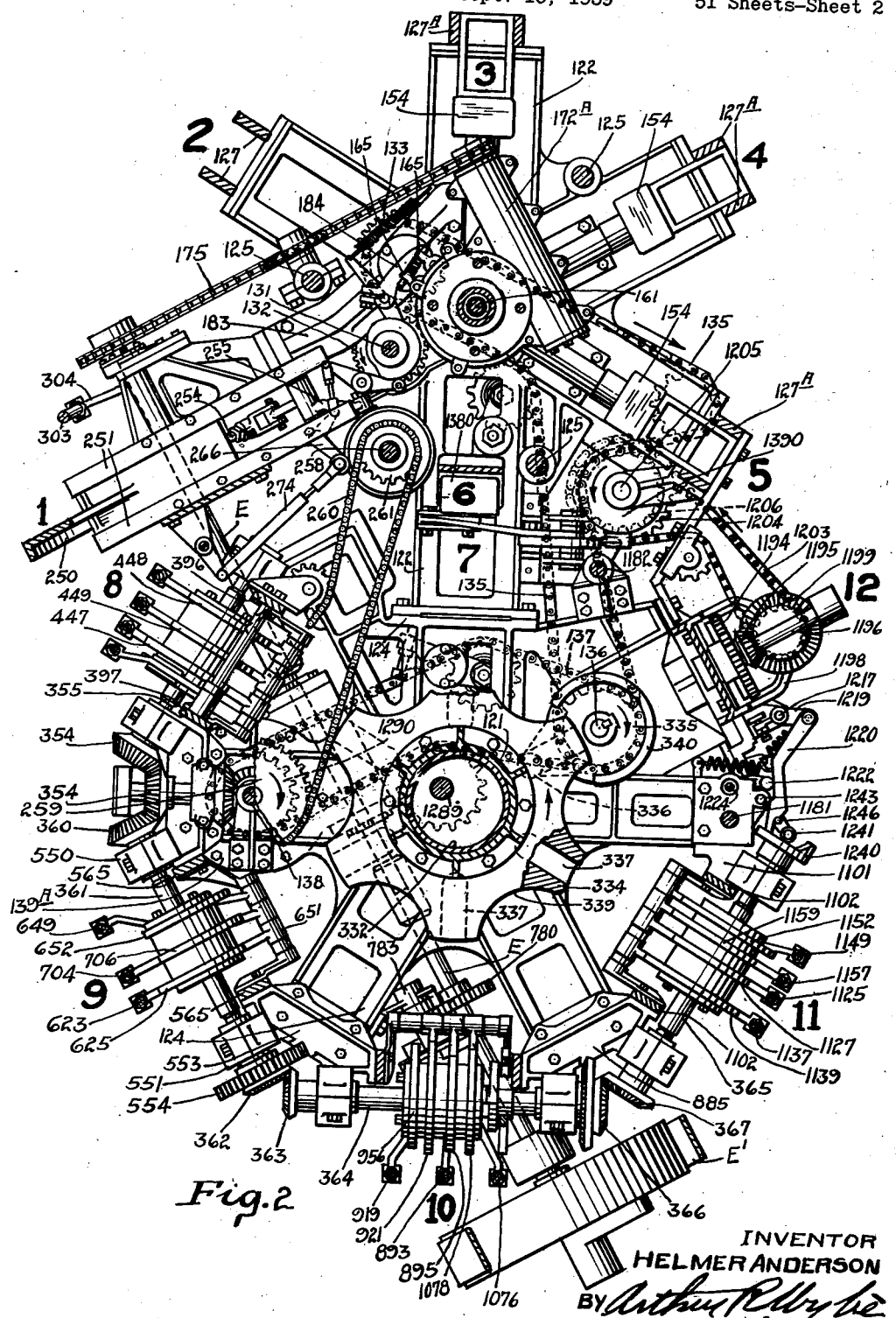
Fig. 2 is a partial horizontal section on the lines 2—2 of Figs. 75 and 32.

The turn table 120 is provided with a series of openings 120—A which are of a general rectangular form and are near the center of each of the stations. The means for turning and holding the turn tables of both the shaper and the sealer at definite, adjusted positions, as shown by Figs. 2 and 9, consists of a Geneva movement which will later be described.

The means for shaking each bag, as shown in Fig. 7, consists of a foot 154 which is slidably mounted in the vertical guide 155 and is moved up and down by means of a connecting rod 156 on a crank 157 on the shaft 158. This shaft has keyed thereon a bevel pinion 159 meshing with a bevel gear 160 journaled on an axle 161 which is secured in the castings 122 and 126.

The gear 160 is timed with the shaft 131 by means of the mechanism shown in Fig. 18, in which the gear 160 has bolted thereto a plate 162 which carries pins 163 and 164. Pawls 165 and 166 are journaled on these pins and are provided with meshing gear teeth so that they rock in opposite directions. The inner ends of these pawls are made square to engage surfaces 167 and 168 on a locking plate 169 which is secured by means of bolts 170 to a sleeve 171 (Fig. 7). This sleeve in turn is bolted to a worm-wheel 172 in a worm-wheel housing 172—A and which meshes with a worm 173 on the shaft 174 which is continuously driven by means of a sprocket and chain 175 from the shaft E (Figs. 2 and 5).

Referring again to Fig. 18, the outer ends of the pawls 165 and 166 are pressed apart by means of a spring 176 which is guided on a bar 177 which carries small pins 178 at its ends to serve to retain the bar in the pawls. When the pawls are in the position shown in Fig. 20, the plate 169 is not operatively connected to the gear 160 and the latter is prevented from rotating. The plate 169 rotates continuously with the worm-wheel while the plate 162 and its associated gear 160 rotate with the plate 169 only when the pawls 165 and 166 are in the position as shown in Fig. 18. To release the pawls, the shaft 131 is provided with a cam 179, against which bears a cam follower 180 on a lever-arm 181, the lever being carried by a shaft 182 and this cam-follower-roller being held against the cam, by means of a spring 181—A. The shaft 182 is suitably journaled in a bridge 183 which is carried by the main frame 122. The shaft 182 has secured thereto a pawl 184 which is adapted to lie in the path of, and to engage a shoulder 185 on the lower portion of the outer end of the pawl 165 (Fig. 19).

Thus it will be seen that as the plate 162 rotates in a clockwise direction in Fig. 18, the shoulder 185 engages the outer end of the pawl 184, thereby compressing the spring 176 until the pawl 165 engages a stop 186 thereby releasing the pawls from the plate 169 and preventing rotation of the plate 162 and its gear 160, as shown in Fig. 20.

The gear 133 drives the gear 132 rotating the shaft 131, the cam 179 causing the pawl 184 to release the pawls 165 and 166. By the action of the springs 176 these pawls ride the periphery of the plate 169 to engage the surfaces 167 and 168 and make one full revolution before again being released. The gear 160 revolves with the plate 169 only on each alternate revolution. The shaft 131 acting through the cam 179 controls the operations of the pawls. These pawls act positively to stop the rotation of the gear 160 and its associated parts.

The gear 160 meshes with a series of three bevel-pinions 159; each pinion driving a shaker. These shakers and their associated parts are all alike, so that the description of one of these units, which has heretofore been made, will answer for all three shaker units.

When locked in an inoperative position, as shown in Fig. 20, the shaker parts, as shown in Fig. 6, are at their lower-most position with the shaker foot 154 beneath the turn table 120 and immediately beneath the opening 120—A therein. After the cam 179 withdraws the pawl 184 and the worm-wheel makes one revolution, the gear 159 rotates, thereby driving the shakers 154 up and down a number of times, thereby lifting the bag G as shown in Fig. 5, causing a further settling of its contents. The shakers lift the bag and drop them on the turn table on each revolution of the bevel pinions 159. During this shaking operation, it will be observed that the side of the bag is guided by the squeeze plates 149 and 150. Then when the bag passes to the next station where the squeeze plates are used, the first operation in moving the plates in, is to squeeze the sides of the bag into the desired dimension by means of the cam 151—A. After this, the cam follower backs up off somewhat to the period of dwell 151—B, after which the squeeze plates serve merely as guides for the sides of the bag. Stations 3, 4 and 5 are substantially identical in every respect and each need not be described in detail. A cam shaft 152—A at Station 5 (Fig. 25) similar to the cam shaft 152 is driven by sprockets and a chain 152—B while a cam shaft 152—C at Station 4 is driven by sprockets and a chain 152—D from the shaft 152—A. Arcuate guard plates 187 are secured to the uprights 127 and 127—A.

*Mechanism for transferring bags from the shaper to the sealer*

At Station 6 no operation is performed on the bag. This station, however, is immediately opposite Station 7 of the sealer and it is necessary to transfer the bag from Station 6 to Station 7. The apparatus for performing this function will now be described and is shown in Figs. 7 and 32. A ram plate 188 is secured to a casting 189 which is slidably held in suitable guides 190 for reciprocation from the position of Fig. 7 to that of Fig. 32. The plate 188 is made removable for purposes later described. This movement is accomplished by means of an adjustable connecting rod, 191, pivotably mounted on one end by a crank 192, which is carried by a gear 193. This gear has only intermittent action and is driven by an interrupted gear 194 (Fig. 14) on the shaft 131. The crank 192 makes one complete revolution and then returns to its normal inoperative position as shown in Fig. 7. During that time, it has moved the bag from Station 6 on the shaper to Station 7 on the sealer as clearly shown in Fig. 32.

During this transferring operation, it is necessary to hold the top of the bag to prevent any possibility of it being over-turned in the operation of being transferred. To accomplish this, I have provided an inclined portion 188—A in the upper portion of the face of the plate 188, and cooperating with this is a pair of gripping fingers 196 which are carried on an arm which is pivotably mounted at 197 (Figs. 7 and 32), the arm being operated by means of a link 198 which is connected to a bell-crank 199, fulcrumed at 200 and having a roller 201 which runs back and forth on a guide 202 which is carried at the side of the shaft 203 which is mounted on suitable brackets 204 (Fig. 3) which are secured to the standards 128—A. The guide 202 is movable up and down by means of a bell-crank 205 (Fig. 31) which is pivotably mounted at 206 and operated by means of a roller 207 on a cam 208 on the shaft 131.

Thus as the guide 202 is forced down by the action of the cam 208, as the shaft 131 revolves, the fingers 196 are moved into engagement with the portion 188—A of the plate, thereby gripping the top of the bag, as shown in Figs. 27 and 32. A spring 198—A raises the fingers as shown in Figs. 31 and 32. This mechanism is all carried by the ram and these fingers retain their grip on the bag until the bag has reached the position of Station 7 at which time the bag top is released and the ram and its associated parts are returned to the position of Fig. 7.

It will be observed that Fig. 27 differs from Fig. 32 in having an adapter for use on smaller bags. This adapter feature will later be described.

Before proceeding with the description of the sealer, I will describe the mechanism for feeding the bags to Station 1 of the shaper. The apparatus for doing this comprises of short conveyor A of Figs. 3, 5, 8, 9, and 10 having frame members 209 (Figs. 15 and 16) adjusted and tied together by means of channel-shaped members 210 with slat members 211 on top for the conveyor belt to slide on. This frame is bolted to a bracket 212 (Fig. 9) and this together with a spaced bracket member 213 is bolted to the main shaper frame casting 122. A conveyor has a belt 214 running over suitable pulleys 215, 216, on shafts which are journaled in the frame members 209. The head pulley 216 is carried on a head-pulley-shaft 217 and carries a sprocket which is driven by means of a chain 218 from a suitable source of power (not shown). The shaft 217 also carries a sprocket 219 which drives the shaft at the opposite end of the conveyor through a chain 220. This conveyor A is continuously driven.

An adjustable guide 221 and a stationary guide 222 (Fig. 8) are secured to the top of the conveyor and serve to guide the incoming bags G. It can be observed that these bags are of a generally oval form when they are received by the conveyor A and must later be shaped into a nearly rectangular form, as shown at Station 2 in Fig. 8.

Each bag travels up to the position G', shown in dotted lines in Fig. 8 from which position it is pushed into Station 1. The apparatus for performing this function will now be described. It consists essentially of a ram 250 which is shown in side elevation in Fig. 5 and is mounted for parallel movement in guide-ways in the members 251 which are bolted to the tops of the castings 212 and 213. The ram 250 is connected by means of a link 252, to the end of a lever arm 253, the bottom of which is pivotably mounted. An adjustable link 254 connects the center of this arm with a bell-crank 255, this bell-crank carrying on its other arm, a cam follower 256 which rides in a cam-groove in a cam 257. This cam is keyed on a shaft 258 which is suitably journaled in the castings 122 and 126 of the main frame of the shaper. This shaft is driven from the shaft 138 (Fig. 2) by means of a sprocket 259, and a chain 260, which drives a sprocket 261 (Fig. 10) which is keyed to a clutch plate 262 which is journaled to the shaft 258. A bolt 263 passes through the cam 257 and carries a pawl 264 which is normally urged into engagement with the serrated inner face of the clutch plate by means of a spring 265.

There is a space between the clutch plate 262 (Fig. 8) and the upper end of the cam 257, and in this space a pawl 266 is movable and adapted to engage a lug 264—A on the pawl 264 to force the latter out of engagement with the clutch serration. This pawl forms one end of a bell-crank, the opposite end of which is connected through a link 267 to a bell-crank 268, the latter having at its end a cam-follower-roller 269 which rides on the face of a cam 270; the cam being mounted on the shaft 131.

A link 271 is pivotably connected to the pawl 266 and also carries a roller 272 which rolls on the cylindrical surface of the clutch plate 262. The link 271 passes through an adjustable compression spring 273, the latter being held by a link 274, the end of which is connected to a crank-arm 275 on a shaft 276. A trip lever 277 is adjustably connected to the upper end of the shaft 276, and this lever lies in the path of the bag which is delivered to the machine.

When, therefore, a bag reaches the dotted line position G' of Fig. 8, the trip lever 277 is depressed, thereby compressing the spring 273. This bag serves to stop the succeeding bags in the line. The trip lever 277 remains depressed and when the cam 270 (Fig. 11) is again turned so that its low point falls beneath the cam follower 269, the system of linkages causes the pawl 266 to be withdrawn from the pawl 264, and the spring 265 instantly urges it into contact with the nearest serration on the inside of the clutch plate as shown in Fig. 8. When that occurs, the pawl causes the cam 257 (Fig. 10) to rotate with the clutch plate 262. The cam 257, in turn, operating through the system of linkages, as shown in Fig. 5, causes the ram 250 to move from the dotted line position of Fig. 5 to the full line position, thereby moving the bag from the position G' of Fig. 8 to Station 1 of the turn table of the shaper, as shown in Fig. 8, in which position the bag is pressed against a plate 290 which is supported by means of brackets 291. A stop plate 292 lies in the path of bags from conveyor A, and is adjustably secured to a plate 293 on which the bag rests.

During the time the ram 250 is advanced from the dotted line position to the full line position of Fig. 8, it is essential that no bag shall be fed by the conveyor A to the position of G' during the movement of the ram 250. To prevent this, I have provided a retaining plate 300, which acts to retain the next succeeding bag, before the bag in the position G' is advanced by the ram. This retaining plate is shown in Figs. 8 and 15 and is pivotably mounted at 301, and has a lever-arm 302 which connects through to a link 303 with a bell-crank 304 (Fig. 10), the opposite end of the bell-crank being connected through an adjustable link 305 with a bell-crank 306, the opposite end of the bell-crank carrying a cam-follower-roller 307 which is held against the face of a cam 308 by means of a spring 309. The cam 308 (Fig. 13) is adjustably secured to a flange-plate 310 by means of a capscrew 311; the flange-plate being secured to the lower end of the shaft 258. The cam 257 is provided with a depression 257-A (Fig. 12) in its outer surface which is otherwise circular. This depression terminates in a rounded end 257-B adapted to fit the surface of a roller 312 on the end of an arm 313, which is adjustably mounted at 314 and pressed by means of a spring 315. By properly adjusting the position of the roller 312 to the stopping point of the cam, the roller will continue the rotation of the cam for an instant at a slightly accelerated rate so as to cause the pawl 264 to be thrown suddenly out of engagement with the serrated teeth of the clutch-plate, thereby preventing chatter. The pawl moves outwardly until it engages the stop 264-B.

*The turn tables*

The turn table 120 of the shaper is mounted on a ledge 126-B, as shown in Fig. 5, and has a ring gear 325 secured thereto by means of a series of cap-screws 326. The ring gear is provided with angular slots 327 (Fig. 3) which enable it to be adjustably positioned with respect to the turn table. This ring-gear, in turn, meshes with a ring-gear 330 which is similarly secured to the lower-outer edge of the turn table 121 of the sealer by means of bolts 331 as shown in Fig. 7.

The mechanism for driving these two turn tables will now be described. The turn table 121 has a hub which is rotatably mounted on a vertical tube 332 (Fig. 9B) which is fixably secured in the main sealer frame 124. The turn table rests upon a thrust bearing 333 and has bolted thereon a six-point Geneva wheel 334, each point corresponding to a station of the sealer and to a corresponding station of the shaper. The Geneva wheel 334 is intermittently driven by means of a Geneva arm 335 (Figs. 2 and 114) which has a roller 336 adapted to engage a series of slots 337 in the Geneva wheel. These slots are all radial, and in the present instance, are six in number, uniformly spaced about the wheel. Between these is a series of circular depressions 339 adapted to be engaged, one at a time, with a circular locking portion 340 on the driver. In Fig. 2 the Geneva wheel is in a mid-position and is being driven by means of the roller 336 on the Geneva arm which is keyed on the shaft 136 which is continuously driven. Thus it will be seen that for each revolution of the shaft 136, the Geneva gear will be rotated through ⅙ of a revolution, thereby advancing both turn table 120 and 121 a like amount. The remainder of the time, the Geneva wheel, together with the two turn tables which it drives, are held stationary to permit the various operations to be performed on the bag.

*Mechanism for forming the bag top (Station 8)*

The mechanism for forming the bag top, as shown at Station 8, will now be described. This is shown principally in Figs. 33 to 44, inclusive. It is desired that the top of the bag shall assume the form shown in Fig. 42 in order that glue or other adhesive may later be applied thereto and the top sealed. Referring particularly to Figs. 2 and 70, the shaft 138 has keyed thereon a bevel gear 350 which meshes with a gear 351 on a shaft 352 which in turn is suitably journaled on the main frame 124 of the sealer as shown in Fig. 70 and carries a bevel gear 353 which meshes with a gear 354 (Fig. 2) on a shaft 355 which is likewise suitably journaled on the main frame 124 of the sealer. The shaft 355 carries a series of cams for operating the bag top forming mechanism of Station 8, and these will be described hereafter in detail.

Likewise, the bevel gear 353 meshes with the bevel gear 360 on a shaft 361 which is journaled similarly to the shaft 355 and operates the mechanism for applying glue to the bag top. The shaft 361 carries a bevel gear 362 which meshes with a bevel gear 363 on a shaft 364 and this shaft similarly drives a shaft 365 by means of bevel gears 366 and 367. The shafts 364 and 365 are journaled on the main frame in a manner similar to that of the shafts 355 and 361. The shafts 355, 361, 364 and 365 operate respectively the bag top forming mechanism of Station 8, the mechanism for gluing the inside of the bag top of Station 9, the mechanism for spreading the glue within the bag top and for applying glue to the outside of the bag top at Station 10 with final sealing at Station 11, and the mechanism for effecting the final closing of the bag top.

Referring now more particularly to Figs. 33 to 44, inclusive, the mechanism for forming the bag top as shown in Fig. 42 will now be described. Fig. 33 shows the normal inoperative position of the bag-top-forming mechanism as viewed from the side of the machine. This mechanism is also shown partly in side elevation in Fig. 34. The vertical tube 332 (Fig. 98) has discs 380 and 381 welded therein to form bearings which will presently be described. The casting 382 is fitted over the top of the vertical tube and is bolted to the disc 380 as shown in Figs. 35 and 98. Frame castings 383 and 384 are bolted to the casting 382 and rise therefrom and are tied together at the top by means of a plate 385 which is bolted thereto. A standard 386 rises from the plate 385 to which it is bolted and serves to help support some of the operating mechanism as shown in Figs. 34, 35, and 98. Referring to Fig. 35, a bracket 395 is bolted to the main frame 124. A bracket provides a bearing for one end of the shaft 355 and also has bolted to it a vertical standard 396. A vertical standard 397 is similarly bolted to a bracket 398 (Fig. 33) which provides a bearing for the other end of the shaft 355, and is secured to the main frame 124. A cross bar 399 is secured to the upper ends of the vertical standards 396 and 397 (Fig. 33).

A casting 410 is secured to the front face of the member 399 by means of bolts 411 which pass through slots 412 in the casting, so that the casting can be adjusted vertically. This casting has secured to it an upper frame casting 413 which is secured thereto by means of cap-screws 414 passing through slots, so that the upper frame casting can be adjusted forward and backward as desired. The upper end of this casting is adjustably secured to a bracket 416, which is bolted to the vertical standard 386. An adjusting screw 417 serves to raise and lower the upper frame casting with respect to the rest of the machine and with respect to the bag G which is to be operated upon.

A movable carriage 425 is guided for motion in a vertical plane on a vertical guide 426 which is secured at its two ends on a bracket 427 which is bolted to the upper frame casting 413. This carriage has journaled therein three shafts 428, 429, and 430 (Fig. 40). On the latter two shafts are mounted gear arms 431 and 432 which have oscillatory movements in opposite directions. The gear on the arm 431 meshes with a gear segment 433 on the shaft 428. This gear is operatively connected to a lever 434 on the upper end of which is a cam-follower-roller 435 adapted to roll on a vertical cam 436. An angular adjustment is provided between the gear 433 and the lever 434. Thus, as the carriage 425 is raised above the position shown in Fig. 40, the shafts 428 and 430 are rotated somewhat in a clock-wise direction while the shaft 429 is rotated in a counter-clock-wise direction, thereby causing the gear arms to approach each other. Likewise as the carriage is lowered, the gear arms have a tendency to separate, particularly under the action of a tension spring which will later be described. Each gear arm 431, 432 is secured to spreader plates 437 and 438 respectively by means of cap-screws 439 and 440. One of these plates 438 has secured thereto a spring 441 which tends to hold the plates separated. The cam roller 435, under the action of the cam 436, keeps the plates closed when the roller is on the upper portion of the cam.

These spreader plates are also held closed during a portion of the operation, as will now be described. The carriage is raised and lowered by means of a bell-crank 443 which is connected thereto by means of a link 444. The outer end of the bell-crank being connected through a link 445 with a lever 446 (Fig. 33) which has a cam-follower-roller operating on a cam 447 on the shaft 355, as shown in Fig. 35—A. The roller is held against the cam by means of a spring 446—A. Cams 448, 449, and 450 are also required to operate the mechanism at Station 8. These cams are adjustably mounted on a cylindrical block 451 which is welded to the shaft 355 and has a shoulder 452. The various cams are not keyed to the block 451 but the spacers are keyed thereto so as to prevent them from rotating. A plate 453 is pressed against the last cam and squeezes all the cam and spacers tightly together so as to provide sufficient friction to cause the cam to be driven by the shaft 355. Thus as the shaft 355 rotates, the carriage together with the parts carried thereby is lowered from the normal position as shown in Fig. 34 to the position shown in Fig. 35 and then as the cam continues to rotate, is returned again to the position in Fig. 34. During this series of operations, the bag top is formed and creased vertically and horizontally as will presently be described.

Shafts 461, 462 are suitably journaled in the upper frame casting 413 and have secured thereon operating arms 463 and 464 which carry at their lower ends blocks 465, 466 in which are slidably mounted pairs of pins 467, 468. The pins 467 have secured at their lower ends a gripper and closure plate 469, while the pins 468 (Fig. 37) have similarly secured at their lower ends a gripper and closure plate 470.

Referring to Fig. 34, it will be noted that the shafts 461 and 462 are geared to operate in opposite directions by fragmentary gears 471 and 472. The arm 463 is oscillated by means of a link 474 (Fig. 35) which connects to a bell-crank 474, the opposite end of the bell-crank being connected to a link 475 with a lever 476 which has a cam-follower-roller operating on the cam 448 of Fig. 35—A. The gripper plates are normally held up against blocks 465, 466, by means of springs 477, 478. The cam follower is held against the face of the cam by a pair of springs 479 (Fig. 34).

I have provided a pair of feet 490 for moving the gripper plates down, as shown in Fig. 41, and these are carried on the lower end of bars 491 which are slidably mounted in suitable guides 492 (Fig. 34) and connect through links 493 with a lever 494, the opposite end of the lever being connected to a link 495, the opposite end of which connects to a lever 496 which has a cam-follower-roller operating on the cam 450 of Fig. 35—A. The lever 496 is held against the cam by means of a spring 497. Thus when the feet 490 are lowered against the springs 477 and 478 through the pins 467 and 468, due to the action of the cam 450, the closure plates 469 and 470 are likewise lowered with respect to the other members, particularly with respect to the spreader plates 437 and 438. This gives rise to a combination of movements of these plates for forming and spreading the mouth of the bag which will later be described.

The spreader plates 437, 438 are provided on their outside faces with lugs 510 which are undercut on their lower surfaces to form grooves 511. The upper surfaces of the gripper and closure plates 469, 470 are milled out at 512 leaving marginal tongues 513 on their inner edges which in the position shown in Fig. 40 are adapted to move into the grooves 511 of the lugs to firmly grip the bag tops.

A tucker plate 514 (Fig. 33) is mounted at each side of the spreader plates and in a plane between the spreader plates. It is yieldably carried on the outer end of a lever 515 and is mounted on a shaft 516 which is journaled on the outer end of the lever 515 while the latter is keyed on a shaft 517, the latter being journaled in an arm of the casting 413 (Fig. 43). The tucker plate is adjustably positioned with respect to the lever 515 by means of an adjusting screw 518 and the tucker plate is held in this position by means of a spring 519.

The shaft 517 carries a pinion 525 which meshes with a fragmentary gear 520 which is oscillated by means of 2 links 521, pivotally connected to a bar 522 which is slidably mounted on the casting 410 (Fig. 35). This bar in turn connects through a link 523 with a cam-follower-lever 524 having a roller operating on the cam 449 (Fig. 35-A) and is pressed by a spring 524-A.

On one end of the shaft 516 is secured a lever 530 having a cam-follower-roller 531 rotatably mounted on its lower end. As the lever 530 is oscillated by the shaft 516 the roller engages the lower curved face of a cam 532 (Fig. 36). The face of this cam is so formed as to cause the plate 514 to move inwardly from the dotted line position of Fig. 36 to the full line position. The tucker plate is provided on its trailing side with diverging rods 533 which assist in shaping the upper end of the bag into an accordion pleat as the folds are made by the tucker plates 514 passing between the spreader plates as shown in Fig. 37. As the tucker plates move in, as shown in Fig. 37, the spreader plates also approach each other with the result that the paper bag is drawn tightly about the spreader plates by the action of the tucker plates forming gussets in the end walls of the top of the bag as shown in Figs. 37 and 42. The latter are then immediately withdrawn and the gripper plates continue to move inwardly firmly gripping the upper side portion of the bag.

The bag top is first lightly gripped between the gripper plates 469, 470 and the spreader plates 437, 438 as shown in Fig. 39 and then as the closure plates progressively approach each other, the bag top is firmly gripped between the tongues 513 and the grooves 511 while the spreader plates are still separated about as shown in Fig. 40. Thus, as these plates approach each other as in Fig. 40, the diagonal line made by the bag top is much longer than that of Fig. 39 with the result that to make up this difference, the bag is drawn up and is momentarily suspended by the gripper plates. The effect of this is to put a sharp pull on the paper bag over the inner edges of the gripper plates thereby further effecting a transverse or horizontal scoring of the bag top, at the points H of Fig. 42 where these points later meet in forming the final closure.

With the parts in the position shown in Fig. 40, the foot 490 is caused to descend, forcing the pins 467 and the gripper plates 469, 470 downward as shown in Fig. 41 thereby flattening the top of the bag and its contents and giving a further sharp bend to the bag top along the lines H of Fig. 42. It will also be noted (Fig. 41) that the gripper plates have also released their grip on the spreader plates and that the spreader plates have separated so as to open the top of the bag to receive spreader fingers, as will later be explained, for the application of glue at the next succeeding station. Pressure is then released from the foot 490 and the parts returned to the normal inoperative position of Fig. 34. The turn table then moves the bag to Station 9.

*Glue applicator*
(Station 9)

This glue applicator was made the subject of my pending application, Serial Number 252,506, filed January 23, 1939. The apparatus of the glue applicator will be briefly described, however, for the purpose of the present specification. This glue applicator is illustrated principally in Figs. 45 through 72, and 98 and is located at Station 9 of the sealer.

The shaft 361 (Fig. 45) for operating much of the glue applicator is suitably journaled in bearings 550 and 551 on castings 552 and 553 bolted on the main sealer frame 124. The shaft 361 carries a gear 554 which meshes with a gear 555 on a shaft 556 suitably journaled on the main frame of the sealer. This shaft carries a bevel gear 557 which meshes with a bevel gear 558 which is operatively connected to a shaft 559 through a bag-operated clutch mechanism which causes the shaft 559 to be operated automatically only when there is a bag at Station 9. It will later be seen that no glue can be sprayed from the nozzles unless the bag is in this position. The shaft 559 is suitably journaled at the lower end at 560 and at its upper end in a bearing on a bracket 561 secured to a frame consisting of members 562, 563 welded together having a bottom cross member 564 supported upon a frame 565 which is secured to the main frame of the sealer. The bracket 561 is also supported on a pair of frame members 566, which are secured to the plate 385 and to the frame member 383. The upper end of the shaft 559 has keyed thereon a bevel gear 570 which meshes with the gear 571 on a shaft 572 which is suitably journaled as shown in Figs. 45 and 68.

Referring to Figs. 54 to 57, the gear 558 is carried on a sleeve 580 which is journaled within the member 560 and itself serves as a journal for the lower end of the shaft 559. The upper end of the sleeve 580 has secured thereon a disc 581 which has a notch 582 adapted to receive a pawl 583 which is pivotably mounted at 584 on an arm 585 (Fig. 56) which has a hub 586. The pawl 583 has a pin 591 which has a spring 592 the opposite end of which is secured to the hub 586. This spring tends to urge the pawl normally into the notch 582.

The action of the pawl 583 is controlled by a trip finger 593 (Fig. 54) which, as will be seen, lies in the path of the bag and when the bag is present at Station 9, the trip finger will be moved to the dotted line position. This trip finger is carried on a shaft 594 which has secured thereon a lever 595 which connects through a link 596 to the lever 597 which is pivotably mounted at 598 (Fig. 57). The outer end of this lever carries a pin 599 which is adapted to pass under an ear 600 on the pawl 583 and when it does so, it holds the pawl out of operative engagement with the notch 582 so long as the trip lever 593 is in the full line position of Fig. 54. The trip lever is returned to the full line position shown in Fig. 54 by the spring 601.

As shown, however, when a bag depresses the trip lever to the dotted line position, the pin 599 is withdrawn, a spring 592 causes the pawl to be urged toward the disc 581 with the result that the next time this disc revolves, the notch 582 will catch the pawl 583 and cause the arm 585 and the shaft 559 to be rotated. The notch 582 is so timed with respect to the position of a bag at Station 9, that the presence of the bag will cause the pin 599 to be withdrawn just in time to permit the pawl to enter the notch 582. The apparatus is thereby set for the application of the glue as will presently be described.

When the bag arrives at Station 9, the top of the bag is firmly pinched in along the horizontal lines H, the top of the bag is caught and held open and glue is applied to the open mouth of the bag and to the overlapping edges which are formed with a sort of accordion pleat. The form of the mouth of the bag and the way the glue is applied are shown in Fig. 53.

Gripping plates 610 normally stand apart as shown in Fig. 48 and these are mounted upon reciprocating members 611 which are journaled in guideways 612 which are carried by the frame members 383 and 384, and the member 564. These plates are simultaneously moved from or toward each other by means of links 614, 615 (Fig. 48) which connect to the lower ends of levers 616, 617 on shafts 618, 619, which are operatively connected to the levers 616, 617 through fragmentary gears 620, 621 respectively so that the plates 610 move toward or from a median line simultaneously and in equal amounts. The lever 616 is made up of two spaced elements as shown in Fig. 45, while but one lever 617 is used as shown in Fig. 68. The lever 616 forms a bell-crank with an arm 622 which connects through a link 623 with a rocker-lever 624 which carries a roller which runs on the face of a cam 625 on the shaft 361. This rocker-lever is caused to follow the cam by a spring 626. Thus as the shaft 361 revolves, the plates 610 move inwardly to grip the bag as shown in Fig. 46 along the lines H, H of Fig. 42 which were scored at Station 8. The plates 610 remain in this gripping position during the operation of applying glue to the surfaces as will later be described.

As the plates 610 approach each other, the partially opened mouth of the bag is caught by spreader fingers 640. These operate in pairs, one pair at each side of the bag as shown in Fig. 53. Each pair is carried by a bell-crank 641, 642 which are pivotably mounted at 643 and 644. The bell-crank 641 is operated by means of a link 645 which connects to a bell-crank 646. The opposite end of this bell-crank connects through a link 647 with a bell-crank 648 which connects through a link 649 with a rocker-lever 650 which is pivotably mounted at 651 and has a cam-follower-roller adapted to bear on a cam 652. The bell crank 646 has a fragmentary gear 653 which meshes with a similar gear 654 on a lever 655 having a link 656 returned by a spring 657 to operate the bell-crank 642 simultaneously and oppositely to that of bell-crank 641.

Thus it will be seen that as the gripping plate 610 moves inwardly from the position shown in Fig. 48 to that of Fig. 46, the fingers 640 also move from the positions of Fig. 48 to those of Fig. 46. In the latter position they serve to spread the mouth of the bag and to hold it open during the gluing operation.

Glue applicators

The mechanism for applying glue is shown particularly in Figs. 50 through 53, 58 through 66, and Fig. 72. In Figs. 45 and 48 the glue applicator is shown in the normal inoperative position which it assumes during the time the bag is being moved to Station 9.

Three glue nozzles 670, 671, and 672 serve to apply the glue to the top of the bag at different times as will now be described. In Fig. 50, the nozzles 670 and 671 have already been moved toward the bag and into operative position while the nozzle 672 still remains retracted. The nozzles 670 and 672 are similar and are shown in Fig. 67 so that a description of one will serve for both. The nozzle 671 is a double nozzle as shown in Figs. 64 to 66. It is mounted on levers 673 which have trunnions by means of which it is pivotably mounted on brackets 674 on a carriage (Fig. 46). One of the levers 673 carries a lever arm 675 which has a pin 676 adapted to operate in a slot 677 in a rocker-lever 678 (Figs. 45 and 51). This rocker-lever is pivotably mounted at 679 and has a fragmentary gear which meshes with a rack 680 which is slidably mounted in a guide-way 681 (Fig. 69) which is mounted on the uprights 562, 563.

The rack 680 connects through a link 682 with a lever 683 which is fulcrumed at 684, the opposite end of the lever being connected through a link 685 with a plate 686 which is adjustably connected to a lever 687 by means of bolts through a slot 688 in the latter lever. This permits an adjustment of the throw of the rack 680 and consequently of the amount of oscillation of the rocker-lever 678. This lever carries at the small end a cam-follower-roller 689 (Figs. 45 and 46) which operates in a slot in the cam 690 on the shaft 556.

Thus as the rocker lever 678 moves from the position shown in Fig. 50 in a counter-clockwise direction, the nozzles 671 will be moved in a substantially horizontal line from left to right so as to enable glue to be fed across the length of the meeting edges of the paper bag and along the two parallel dotted lines shown in Fig. 53. To obtain this parallel action, the lever 673 (Fig. 64) is provided at one side with a roller 691 which is adapted to roll on an arcuate cam 692 which is carried on the lever 642. This cam is so formed as to insure a parallel horizontal movement of the nozzles 671 as they travel across the open mouth of the bag.

The carriage 674 which carries the nozzles 671 has a series of rollers 700 by means of which it can roll upon a vertical bar 701 (Fig. 50). The carriage connects through a link 702 (Fig. 46) with a lever 703 which connects through a link 704 with a rocker-lever 705 which has a cam-follower-roller which bears upon a cam 706. Thus the carriage 674 and its nozzles 671 are lowered by the action of the cam 706 until the roller 691 rests upon the face of the cam 692.

The glue nozzles 671 (Fig. 64) and their associated parts will now be described. The lever 673 carries a block 710 which has formed therein an air passage 711 and a passage 712 for glue. It is essential that the glue nozzles shall not leak glue at any time and that they shall be completely cleaned after each gluing operation. To insure this, I have provided a hollow conical nipple 713 and within this, and spaced therefrom, is a conical glue nozzle 714 (Fig. 65) which has a conical inner surface 715 terminating in a cylindrical portion 716 above which is a short conical seal 717 adapted to receive a glue valve 718 with a cylindrical extension 719 which has a close fit with the cylindrical portion 716. The valve 718 forms the lower end of a valve stem 720 which is much smaller than the opening through the glue nozzle so that when the rod is raised as shown in Fig. 65, the glue can be fed through the nozzle.

Air is applied to the passage 711 as will later be described before, during and after the time the valve stem 720 is in the raised position. Thus, air which applied before the valve stem is raised and which remains on after the valve stem has been again lowered, rushes through the restricted space 721 between the inner surface of the nipple 713 and the outer surface of the nozzle 714 with the result that a flow of glue is induced through the nozzle while the pin 719 is raised. The rod 720, as will later be seen, is then lowered shutting off the supply of glue but the air continues for an appreciable time thereafter so as to completely clean the end of the glue nozzle of any glue that may be left thereon. This insures against the possibility of any glue later dripping from the nozzle; also against glue setting on the nozzle and preventing its operation.

The valve stems 720 are connected at their upper ends (Fig. 64) with a piston rod 722 which carries at its upper end a piston 723 which is normally depressed by a spring 724 to the position shown. The space below the piston communicates through a passage 725, and a flexible hose 726 (Fig. 72) with a source of air supply 727 through a valve 728. This valve will later be described in detail. A flexible tube 729 similarly connects the distributor valve with the air passage 711.

The nozzle 670 is similar to the nozzle 671 and is secured to a bar 730 which is slidably mounted in a guide way 731 (Fig. 50), the bar being movable up and down by means of a lever 732 and a link 733. The guide way 731 is adjustably mounted on the casting 561 to permit the nozzle 670 to be moved in and out to accommodate different sized bags. The lever 732 is keyed on a shaft 734 and this has keyed thereon an operating lever 735 (Figs. 45 and 48) which has a link 736 which connects to a bell-crank 737 which carries a cam-follower-roller which bears upon the face of a cam 738 on the shaft 556. A spring 739 holds the roller in contact with the face of the cam.

Thus with the bag top held open as shown in Fig. 46, the nozzles 670 and 671 are lowered into the position shown in Fig. 50 where two lines of glue 740 are sprayed longitudinally throughout the inner portions of the bag mouth as shown in Fig. 53 by means of the two nozzles 671. At substantially the same time, the nozzle 670 sprays a spot of glue 741 at the end of the bag upon its meeting outer surfaces and causes them to adhere when this glue has later been spread. Likewise, the lines of glue 740 must be spread as will later be described, in connection with Station 10. Also a spot of glue 742 is subsequently applied by the nozzle 672, the construction and operation of which is substantially the same as that of nozzle 670. Thus, the nozzle 672 is operated, but with later timing, by means of a cam 738-A, a cam follower on a bell-crank 737-A, a link 736-A, a lever 735-A, a shaft 734-A and a spring 739-A.

The nozzle 670 is moved down from the position of Fig. 50 to that of Fig. 51. To insure the fold of the bag opening to receive the nozzle 670, I have added thereto a spear point 670-A to spread the bag top and hold it away from the nozzle.

Air for supplying pressure to the nozzles is brought in from any suitable source through a pipe 760 (Figs. 47 and 48) which leads to a valve chamber 761 in a valve casing 761-A and thence through a pipe 762 to a header 763 (Fig. 46). Within the chamber 761 is a valve 764 which has upper and lower valve faces; the lower one of which is shown in Fig. 47 as closing a valve seat 765. Above the valve is a valve seat 766 which is closed by the valve when in the raised position. This valve is normally down in the position shown in Fig. 47 so long as the machine is in operation. As soon, however, as the main shaft E falls below a predetermined speed, an automatic mechanism which will now be described, causes the valve 764 to be raised to the dotted line position of Fig. 47 thereby shutting off the supply of air from the pipe 760 to the pipe 762. At the same time pressure in the pipe 762 and in the chamber 761 are bled to atmosphere through a bleeder 767 and a vent 768.

Referring now to Figs. 54 and 55, the main shaft E has a spur gear 780 keyed thereon and this meshes with a gear 781 on a governor-shaft 782 which is suitably journaled in a casting 783 secured to the main frame 124. The shaft 782 carries a plate 784 which has two stops 785 and 786 near its periphery. This plate also carries a pin 787 upon which is pivotably mounted a governor arm 788 in the form of a bell-crank having a fly-ball at one end and an extension 789 at the other. The other end also has a link 790 on which is mounted a compression spring 791 which tends to keep the governor in the position shown in Fig. 55. During the operation of the machine, the governor arm moves out to the dotted line position. The casting 783 carries a pin 792 upon which is mounted a bell-crank 793, one end of which connects through a link 794.

Referring to Figs. 73 and 79, the link 794 connects to one arm of a bell-crank 795 which is pivotably mounted at 796 (Fig. 73). A trip arm 797 of the bell-crank is notched to receive a pin 798 on a trip lever 799, the opposite end of the lever having a finger 800 which as shown in Fig. 47, lies immediately below the stem of the valve 764. The tension spring 801 pulls down on the trip lever 799.

The method of operation of this governor mechanism is as follows: With the main shaft E in normal operation, the operator lifts the arm 799 (Fig. 73) and places the trip arm 797 under the pin 798. The finger 800 (Fig. 47) will then remain in the lower position as shown, so long as the machine remains in normal operation. Should power be cut off, however, for any reason, it is essential that the apparatus for feeding glue to the gluing mechanism be instantly shut off.

This is accomplished by the governor mechanism of Fig. 55. As soon as the speed of the governor falls off, the spring 791 returns the parts to the position shown in full lines and on the next revolution the pin 789 will strike the bell-crank arm 793—A thereby lowering the rod 794 and withdrawing the trip arm 797 whereupon the spring 801 will cause the finger 800 to be lifted thereby lifting the valve 764 to the dotted line position and shutting off air pressure from the pipe 760 to the pipe 762 thus preventing any further feed of glue as will presently be explained.

Referring to Figs. 48, 49 and 72, a glue tank 802 is supported on a glue box 803 which in turn is supported above the sealer. A pipe 804 leads to the glue box and is closed by a float valve mechanism 805 in a well-known manner so as to maintain the glue at a desired level in the glue box. Glue is fed by gravity through pipes 806 to the glue passages 712, 712—A in the nozzles (Figs. 64, 67).

The method of supplying air to the several glue nozzles will now be described. Air from the header 763 (Fig. 68) is carried through a pipe 727 to an air control valve represented generally as 811. This valve has a body 812 (Figs. 58 to 61) secured to the casting 561 and serving as a housing for a control valve 812 which is oscillated by means of a crank 814 which connects through a link 815 with a bell-crank 816 (Fig. 68); the other arm of the bell-crank having a cam-follower-roller 817 operating in the groove of a cam 818.

The valve 813 is provided with a slot 821 and a circular opening 822 and on its lower side has a partial annular groove 823. An opening 824 in the valve body connects with an air pipe 825 which in turn connects with the chamber 711—A of the glue nozzle 670 of Fig. 67. The valve body also has an opening 826 which communicates through a pipe 827 with a space 828 beneath a piston 829 in a cylinder 830. The valve body also has an exhaust port 831 (Fig. 58).

Thus it will be seen that with the valve in the position shown in Fig. 61, air pressure is applied to the lower face of the piston 829, lifting the same against the action of a spring 832 until the nuts on the upper side of the piston strike an adjusting screw 833 which limits the travel of the piston and hence of the valve stem 834 which connects through a rod 835 with the piston. The valve stem 834 is similar to the valve stem 720 of Fig. 65. Similar parts of the nozzles 670, 671, and 672 are interchangeable. By adjusting the screw 833 the feed of glue to the nozzle may be adjusted. The nozzles 671 and 672 are similarly controlled.

So long, therefore, as the valve 813 remains in the position as shown in Fig. 61, glue will be fed to the nozzle 670 and it will be sprayed by compressed air passing through this nozzle. As soon, however, as the valve 813 is rotated to the position shown in Fig. 62, air is shut off from the pipe 827 and instead this pipe connection through the groove 823 with the exhaust port 831 with the result that the pressure beneath the piston 829 is exhausted to atmosphere through the pipe 827 and the spring 832 rapidly forces the piston to its lower-most position in which the valve 718 of the nozzle shown in Fig. 65 rests upon the valve seat 717 and glue no longer is permitted to flow. In the position shown in Fig. 62, however, air pressure is still applied to the pipe 825 and to the chamber 711—A with the result that air is still rushing past the nozzle in order to remove any glue which may remain thereon. As the valve 813 continues to rotate to the position shown in Fig. 59, the passage 824 becomes covered and air pressure is no longer supplied to the pipe 825.

Referring to Fig. 68, a cam 850 on the shaft 572 operates a bell-crank 851 which acting through a link 852 operates a valve arm 853 similar to the valve arm 814 of Fig. 59. This valve arm rotates a valve in a valve housing 728 (Fig. 72) which operates to control the feed of air to the nozzles 671 in the same way that the feed of glue to the nozzle 670 has just been described. Similarly a cam 860 on the shaft 572 controls a bell-crank 861 which acting through links 862 controls a valve lever 863 on a valve 864 whose construction is the same as that of the valve 728. It will be observed that the valves 728 and 864 are similar to the valve 811 except for the fact that they are operated from different sides.

*Glue spreading mechanism*
(Station 10)

Assuming now, that the operation of applying glue to the top of the bag along the lines 740 and at the points 741 and 742 has been completed, that the gluing mechanism has been raised, and the plates 610 are separated, the bag is released and is ready to travel from Station 9 to Station 10. At this station, the glue applied at Station 9 is spread over the meeting surfaces of the bag and a coating of glue is applied to the outside of the bag top for the final sealing. The apparatus for accomplishing these results will now be described. Referring particularly to Figs. 74 and 75, an inverted U-shaped frame 386 is secured to the plate 385 and carries one end of a pair of castings 881 and 881—A (Fig. 79), the opposite ends of which are secured upon O-shaped or rectangular frames 882 which in turn are supported upon a casting 883 which is secured to vertical standards 884 which are secured to the bearing castings or brackets 553 and 885 as shown in Fig. 2. A casting 886 shown particularly in Figs. 74 and 75 is bolted to the undersides of the castings 881 and 881—A and serves to support a vertical guide bar 887 upon which is mounted a reciprocating carriage 888 by means of rollers 889. The carriage is carried through a link 890 on a rocker lever 891 which is pivotably mounted at 892 and is operated through a link 893. A rocker lever 894 has a cam-follower-roller which operates on a cam 895 on the shaft 364.

Opposed slides 901 and 902 are mounted in suitable horizontal guide ways 903 and 904 (Figs. 75 and 77). The slide 901 is moved by means of a lever 905 through a link 906. The lever 905 is pivotably mounted at 907, the upper end of the lever being connected to a link 908 with a bell-crank 909 which is pivotably mounted at 910 on the casting 881—A. The other arm of the bell-crank 909 is provided with a gear segment meshing with a similar segment on a bell-crank 911 which is pivotably mounted at 912. The lower end of the bell-crank is connected to a link 913 at the upper end of a lever 914 which is pivotably connected at 915 on the frame 386. The lower end of the lever 914 connects through a link 916 to the slide 902. The bell-crank 911 has a third arm which connects through a link 917 to a bell-crank 918 which is pivotably mounted at 892 and has at its other end a link 919 which connects to a cam-follower-lever 920 which has a cam-follower-roller rolling on the face of a cam 921 on the shaft 364. Opposed squeeze plates 940, 941 are mounted on pins on slides 901 and 902. These plates are normally slightly elevated, their elevation being adjustable by means of screws 942, 943. Springs 944, 945 tend to maintain these plates in raised position. The lever 914 is urged by a spring 914—A so as to hold the cam-follower-roller in contact with the cam 921.

It will be seen from the foregoing, that the cam moves the squeeze plates from the open position of Fig. 74 to the closed position of Fig. 75 so as to cause them to grip a bag along the fold lines H, H of Fig. 42. Each of these plates at opposite outer edges is provided with a small lug at 940—A and 941—A which overlaps the opposite plate so that as one plate is depressed, it causes the other plate to be similarly depressed for further flattening the bag top as shown in Fig. 82 and which will now be described. A lever 950 is mounted on the pin carrying the plate 940 so that the two rock together. The lever 950 carries at its outer end a roller 951 which passes over a lift-rod 952 when the latter is in the dotted line position of Fig. 82 during the inward movement of the slide 901. This lift-rod connects through the link 953 with a cam-follower-lever 954 which carries a roller 955 which rolls upon the face of a cam 956 on the shaft 364.

After the plates 940, 941 have been moved into their inner-most position as shown in Fig. 75, the cam 956 through the lift-rod 952 raises the outer end of the lever 950, thereby depressing the plate 940. This plate in turn, through the action of the lug, 940—A forces down the plate 941 so that the two assume the substantially horizontal position shown in Fig. 82, thereby flattening the top of the bag and compressing its contents.

The shaft 364 operates continuously and has journaled thereon a hub 970 (Fig. 73-A) which carries a series of cams for driving some of the parts of station 10. This cam has a boss 971 (Fig. 80) which carries a pin 972 upon which is pivotably mounted a pawl 973 which at its outer end is adapted to engage a notch 974 in a disc 975 which is keyed on the shaft 364, the disc and shaft rotating continuously.

A spring 976 urges the pawl toward the notch 974 and the pawl carries a roller 977 which rolls within a stationary arcuate track 978 (Fig. 74), which is secured to the main frame. When the pawl is so engaged, this track and roller assures against the possibility of the pawl becoming disengaged from the notch. The pawl 973 however, has an ear 979 which lies in the path of a stop-lever 980 which is pivotably mounted at 981 and connects through a link 982 with a lever 983 (Fig. 73) on a shaft 984 (Fig. 75) which is mounted in suitable bearings on the member 884. This shaft carries a trip-lever 985. This lever lies in the path of the bag as shown in Fig. 77 so that when a bag is moved to Station 10, this lever is moved outwardly thereby moving the stop-lever 980 out of the path of the ear 979. So long as bags continue to be fed in regular order to Station 10, the trip-lever 985 will be depressed and the cam-hub 970 will continue to rotate with the shaft 364 thereby carrying with it its various cams which are frictionally secured thereon.

The carriage 888 (Fig. 75) has journaled in its lower end, hollow shafts 1000 and 1001. These shafts have keyed thereon segmentary gears 1002, 1003 by which they oscillate in opposite directions. On the shaft 1000 are keyed two spaced rocker-levers 1004 (Fig. 73). The shaft 1000 also has secured to it, an operating lever 1005 which is connected to a piston rod 1006 which is operated by an air pressure cylinder 1007 as will later be described.

The hollow shaft 1001 also has secured thereon a pair of spaced levers 1008 (Fig. 73). The levers 1004 have adjustably secured thereon at their lower ends a blade 1009 which is pivotably mounted at 1010 (Fig. 74) and made adjustable by means of a screw 1011 in a slot in each of the levers. Opposed to this blade, is a gluing roller 1012 which is rotatably mounted upon the lower ends of the levers 1008 and which is driven and supplied with glue as will presently be described. The roller 1012 is carried on a shaft 1013 which has keyed thereon a sprocket 1014 (Fig. 82) which has a chain 1015 operating over a sprocket 1016 (Fig. 88) on the shaft 1017; the latter shaft being journaled within the hollow shaft 1001.

The sprocket 1016 has keyed thereon a bevel gear 1018 which meshes with a bevel gear 1019 on a shaft 1020. This shaft is suitably journaled at its lower end in the carriage 888 and at its upper end is slidably mounted in a sleeve 1021; the sleeve in turn being journaled in the frame 881. The sleeve has keyed thereto integral sprockets 1022, 1023. The shaft 1020 is provided with a key 1024 which permits the shaft to be slidable up and down in the sleeve 1021 but to be driven thereby. The sprocket 1022 is driven by means of a chain 1030 (Figs. 74 and 79) from a sprocket 1031 on a shaft 1032 which as shown in Fig. 73 is suitably journaled near its two ends and carries a bevel pinion 1033 which meshes the bevel gear 1034 on the shaft 364.

The sprocket 1023 (Fig. 79) drives through a chain a sprocket 1040 on a shaft 1041 which is journaled as shown in Fig. 81 in the casting 881. This shaft has keyed thereon a bevel gear 1042 which meshes with a bevel gear 1043 on a shaft 1044 which carries at its outer end a sprocket 1045 which drives through a chain 1046 a sprocket 1047 on a shaft 1048 as shown in Figs. 74 and 76. The shaft 1048 is suitably journaled in the sides of a glue box 1049 (Fig. 75) and carries a roller 1050 which runs in the glue in the box and feeds glue to a distributor roller 1051 which is mounted upon a shaft 1052. A gear 1053 (Fig. 74) keyed on the shaft 1048 meshes with a gear 1054 on the shaft 1052. The roller 1012 on the rocker-arms 1008 is adapted to be moved into contact with the distributor roller 1051 when the latter is moved outwardly and upwardly as shown in Fig. 74. The distributor roller 1051 is provided with a doctor-blade 1055 (Fig. 75) which is adjustable so as to permit only a predetermined amount of glue to remain on its roller. The excess is scraped off into the glue box which is mounted on the plate 385 and is adjustable toward and from the roller 1012.

The air pressure apparatus for controlling the operation of the arms 1004, 1008, will now be described. This is shown principally in Fig. 75 and Figs. 83 through 87. It includes the air cylinder 1007 which is rotatable on trunnions 1060 in the carriage 888. Within the cylinder is fitted a piston 1061. Tubes 1062, 1063 connect the two ends of the cylinder with the body of a valve 1064. These communicate through openings 1065, 1066 respectively. Exhaust ports 1067, 1068 are located at the sides of the air ports 1065 and 1066.

Air is supplied to the valve through a pipe 1069 from any suitable source of air supply. An air valve 1070 is rotatably mounted within the valve body 1064 by means of a lever 1071 which connects through a link 1072 with a lever 1073 which is pivotally mounted at 907 and is retracted by a spring 1075. The lever 1073 also connects through a link 1076 with a cam-follower-lever 1077 which has a cam-follower-roller operating on the face of a cam 1078 (Figs. 73 and 73—A) on the shaft 364.

With the air valve 1070 in the position shown in Fig. 84, air from the supply pipe 1069 is being admitted through the pipe 1062 to the top of the piston 1061 thereby driving it down and causing the plate 1009 and the roller 1012 to grip the upper end of a bag between them. Having done so, the valve 1069 remains stationary, so long as the pressure continues to be applied by the plate 1009 and the roller 1012. While the pressure is thus applied, the carriage 888 is raised thereby causing the glue that was applied to the bag top at Station 9 to the spread up along the meeting surfaces of the bag top and any excess glue is picked up by the roller 1012 and will be returned to the distributor roller 1015 when the roller 1012 next makes contact with it. At the same time glue, represented by the shaded portions 1079 of Fig. 89, is applied to the bag top by the roller 1012. After the plate 1009 and roller 1012 have been raised above the top of the bag, the squeeze plates 940, 941 (Fig. 75) are lifted and then withdrawn.

Referring to Figs. 84 to 87, the valve 1070 has an opening 1080 which communicates with the passage 1065 when in the position shown in Fig. 84 to deliver air to the top of the piston. At the same time, the valve has a groove 1081 in its lower face. This groove provides communication between the passage 1066 and the exhaust port 1068 as shown in Fig. 86, thereby relieving pressure on the underside of the piston 1061. When, however, this piston is to be raised for spreading the arms 1004 and 1008, the valve 1070 is turned so as to place the passage 1082 in the valve in communication with the passage 1066. At the same time, the groove 1083 will be turned so as to place the passage 1080 in communication with the exhaust port 1067, thereby exhausting the pressure in the top of the cylinder above the piston and permitting the piston 1061 to rise, due to the pressure through the pipe 1063, thus causing the plate 1009 and the roller 1012 to be separated as shown in Fig. 82.

As the roller 1012 is withdrawn, it makes contact with the distributor roller 1051 and deposits on the latter roller any excess glue that it may have picked up from the top of the bag. At the same time, it picks up a new coating of glue for the gluing operation on the next bag.

Referring to Fig. 74, a screw 1091 on the arm 1004 is adapted to strike the arm 1008 and to serve as an adjustable spacer between the two so that glue on the roller 1012 will not be applied to the plate 1009. Likewise, the outer movement of these arms is regulated by means of a screw 1092 which is engaged by the arm 1004 on its outer movement.

*Bag closing apparatus*
*(Station 11)*

The bags, substantially in the condition shown in Fig. 89, are now transferred on the next movement of the turntable to Station 11 where the final closing and sealing operation takes place. The apparatus for performing these functions will now be described. These are shown principally in Figs. 89 through 96. The shaft 365 is journaled in bearing blocks 885 and 1101 which are secured to the main frame casting 124. To these blocks is secured an inverted U-shaped upright frame 1102 and this, in turn, supports an O-shaped or hollow rectangular frame 1103 which is secured thereto by bolts. A top plate 1104 is secured to the top of the frame 1103 and serves, among other things, to support the motor F as shown in Figs. 73 and 79. The frame 1103 has bolted therein a bearing casting 1105 and to this is bolted an adjustable bracket 1106 with spaced sides in which is located a pivot pin 1108. A guide block 1109 has ears at its upper end through which pass the pin 1108 so that the guide block is free to swing about this pin as shown in Fig. 91. A pressure plate 1110 is secured to the bottom of the pressure bar which also has a ledge 1112. A closure plate 1113 is secured to the bottom of a closure bar 1114 and this is slidably mounted in the guide block 1109 parallel to the pressure bar 1107. A pair of springs 1115 between the ledge 1112 and the bottom of the bar 1114 urges the latter downwardly with respect to the pressure bar as shown in Figs. 91 and 93A. A cap-screw 1116 passes through the ledge and screws into the bottom of the bar 1114 and serves to limit the distance the closure plate can pass below the pressure plate.

A bell-crank 1120 is pivotally mounted on a pin carried by a bracket 1121 at the top of the frame in 1103 and is connected through a link 1122 with a bell-crank 1123 on a pin 1124 carried by the casting 1105. The opposite end of the bell-crank 1123 connects through a link 1125 with a rocker-lever 1126 which carries a cam-follower-roller which rolls on the face of a cam 1127 on the shaft 365. The cam-follower-roller is held in contact with the face of the cam by means of a spring 1128. An adjusting screw 1129 fixes the height to which the pressure bar 1107 can rise. The pressure bar has a pair of lugs 1130 which are adapted to overlie the ends of the closure bar 1114 and to continue to press the latter bar down as will later be apparent.

The bracket 1106 has two spaced arms in which is secured a pin 1131 to which are secured two spaced levers 1132 which have pivotably mounted thereon at 1133 a tucker plate 1134. The pin 1131 has secured thereon a lever 1132—A which connects through the opposite end a link 1135 with one arm of a bell-crank 1136 journaled on a pin 1136—A and which connects through a rod 1137, as shown in Figs. 90, 91 and 95, with a cam-follower-lever 1138 which carries a cam-follower-roller which rolls on the face of a cam 1139 on the shaft 365. A spring 1140 serves to hold the cam-follower-roller against the face of the cam. The plate 1134 is moved from the position shown in Fig. 91 to that of Figs. 92 and 93 by means of the rocker lever 1132 and the angle which this plate assumes in any position is controlled by means of a bell-crank 1145 journaled on the pin 1131 and which is pivotably connected at one side to the plate 1134 by means of an adjustable link 1146. The other side of the bell-crank connects through a link 1147 with a bell-crank 1148; the opposite side of the bell-crank connecting through a link 1149 with a cam-follower-lever 1150 which has a cam-follower-roller 1151 rolling on the face of a cam 1152 on the shaft 365. A spring 1153 holds this roller in contact with the face of the cam. By means of this construction, I am able to bring the tucker plate 1134 into contact with the bag at the fold lines H. At the same time, the plate 1113 swings inwardly about the pivot 1108 as shown in Fig. 92 so as to engage the top of the bag and cause it to bend over the edge of the tucker plate as will now be described. The guide block 1109 carries a bracket 1154 which connects through a link 1155 with a bell-crank 1156 journaled on the shaft 1136—A, the opposite end of the bell-crank being connected through a link 1157 with a cam-follower-lever 1158 having a roller rolling on the face of a cam 1159. A spring 1160 holds the roller against the face of the cam. Thus as this cam rotates, it causes the guide block 1109 to swing inwardly over the bag as shown in Figs. 92, 93, 93—A and 94. As it swings in, it bends the top of the bag over the edge of the plate 1134 at the bend lines H. The edge of this plate in contact with the bag is then preferably lowered somewhat as shown in Fig. 93 by means of the cam 1152 to open the mouth of the bag to permit air to escape after which the tucker plate is withdrawn. The closure plate 1113 then continues to descend in advance of the pressure plate as shown in Fig. 93—A and serves to close the outer glued edges of the bag which are shown shaded in Fig. 89. In this case, it will be observed that the outer side of the bag overlaps the inner side so as to insure a perfect closure. It will also be observed that during this closing operation very little opportunity has been given for air to be forced out of the bag. After the closure plate has been firmly pressed down, it is engaged by the pressure plate 1110 which applies pressure to the top of the bag not only under the pressure plate itself, but also on the closure plate by virtue of the lugs 1130. This action forces most of the air out from the top of the bag but without any danger of this air carrying flour or other granular material into contact with the glued surfaces as they are firmly held during this operation by the closure plate. It also gives the top of the bag the final flat form shown in Fig. 94.

The pressure plate then swings upwardly and to one side as shown in Fig. 91 to permit the closed bag to pass on to Station 12 while a new bag moves into Station 11 for closing and sealing.

*Mechanism for inverting bag*
*(Station 12)*

In Station 12, as will now be described, the sealing operation is completed and the bag is inverted and stood on its sealed end while it passes out onto a conveyor so that the weight of the bag holds the bag sealed while the glue sets.

The mechanism for performing these operations is shown in Figs. 97 through 106, and a completed bag is shown in Fig. 110. As the bag leaves Station 11, the outer-most edge G² of the bag top has not been pressed down against the bag for the reason that the closure plate 1114 was set back slightly so that this edge of the bag top protrudes somewhat to avoid getting glue on the closure plate 1113. In order to press this outer edge into engagement with the bag top, I have provided a rotary brush 1170 (Figs. 102 and 114) which overlies the top of the bag as it stands in Station 12, the brush being carried on a shaft journaled in suitable bearings in brackets 1171 which are secured to a vertical casting 1172 which is bolted to the upright frame member 386 and carries an electric motor 1173 for driving the brush by means of suitable pulleys and a V-belt 1174. This brush and the frame on which it is mounted are adjustable by means of a screw 1175 so as to apply varying degrees of pressure to the top of the bag.

Immediately in front of Station 12 is a mechanism for inverting the bag as stated above. This mechanism is carried principally by a housing 1180 which is adjustably mounted on vertical posts 1181, 1182 which are supported at their lower ends by brackets 1183, 1184 which are secured to the main frame casting 124; the post 1181 being secured at its upper end by means of a bracket 1185 to the frame 1103 of Station 11. A casting 1186 connects the posts 1181 and 1182. The casting 1180 is made slidable on the posts 1181 and 1182 and may be clamped thereon in any adjusted position. Adjustment is accomplished by means of a screw 1187 which passes through the casting 1186.

Journaled within the housing 1180 is a circular frame 1188 which has a rectangular opening 1188—A adapted to receive a bag. This opening stands directly in front of Station 12 as shown in Fig. 99. The ram for pushing the bag from Station 12 into this rectangular opening will later be described. Within the rectangular opening is located a sheet metal rectangular frame 1189 which is secured by means of angles 1190 and bolts to the circular frame. Within the bag-holding frame 1189 is located a plurality of side spring plates 1191 and end plates 1191—A as shown in Fig. 100 for the large size bags. These serve to frictionally hold each bag within the frame until it is forced out by the next succeeding bag. The end spring plates 1191—A are stopped by adjusting screws 1191—B.

The circular frame 1188 is guided within the housing by an annular ring 1192 which is adjustably secured thereon as shown in Fig. 100 by a series of cap screws. A ring gear 1193 is bolted to the front of the circular frame and serves to guide it within the housing. It also is adjustably mounted to the circular frame. The ring gear meshes with a gear 1194 which is keyed on the hub of a bevel pinion 1195 (Figs. 97 and 98) which is carried on a shaft 1196, one end of which is journaled in the housing 1180 while the other is carried by a bearing cap 1197, the latter being bolted to the bearing bracket 1198 and this in turn is bolted to the housing 1180. This bearing and bearing cap form the bearing for a bevel gear 1199 which meshes with the bevel pinion 1195. This bevel gear is keyed to a shaft 1200 which is splined for vertical movement in a sleeve 1201 which is journaled within the hub of the sprocket 1202 which is driven by means of a chain 1203 (Figs. 2 and 22) from a sprocket 1204 adjustably mounted on a shaft 1205 which is driven by the chain 135. The shaft 1205 has adjustably secured thereon a sprocket 1206 (Fig. 24) over which runs the chain 135. The lower end of the sleeve 1201 is journaled in the bracket 1207 which is secured to a casting 1208 which is carried by the main frame casting 124. The upper portion of the sleeve 1201 is journaled within the hub of the sprocket 1202 and this in turn is journaled in a bracket 1209 which is secured to the casting 1208.

The mechanism for intermittently rotating the inverter mechanism of Fig. 97 will now be described. A ratchet wheel 1210 (Fig. 104) is securely mounted on the lower end of the hub of the sprocket 1202 and has radial teeth 1211 adapted to be engaged by a pawl 1212 which is pivotally mounted at 1213 on an arm 1214 which is integral with the sleeve 1201 and the pawl 1212 is normally urged toward the wheel by means of a spring 1212—A. A stop 1214—A limits the outer movement of the pawl which is carried by the sleeve 1201. The pawl 1212 has a shoulder 1215 which is adapted to engage the end of a finger 1216 which is pivotably mounted on a shaft 1217 which is journaled in a bracket 1218 carried by the casting 1208. The upper end of the shaft 1217 carries an arm 1219 which has pivotably mounted thereon a bar 1220 which is normally urged in a clockwise direction by a spring 1221 but which engages a roller 1222 on a rocker lever 1223 which is secured on a shaft 1224 which is journaled at its upper end (Fig. 97) in a bearing 1225 secured to the post 1181. The shaft is journaled at its lower end in the main frame 124. A lever arm 1226 is secured to the shaft 1224 and a spring 1227 tends to pull the lever 1226 into engagement with a stop 1228. So long as the finger 1216 is in the position shown in Fig. 104, it holds the pawl 1212 out of engagement with the teeth 1211 thereby preventing rotation of the sleeve 1201 by these teeth. As soon, however, as the finger 1216 is moved out of engagement with the pawl, the latter engages the teeth 1211 (Fig. 105). Thus, the ratchet wheel 1210 driving through the pawl 1212 rotates the sleeve 1201 and this being splined or keyed on the shaft 1200, drives the latter. This shaft in turn acting through the bevel gear 1199 drives the bevel pinion 1195 and this through the gear 1194 drives the ring gear 1193 on the bag inverter as shown in Fig. 97. This inverter will make a half revolution and then will stop for an interval, during which time a new bag may be inserted and the present bag is forced out by the ram shown at the upper portion of Figs. 98 and 99 as will later be apparent.

The shaft 1224 (Fig. 97) has secured thereon a trip lever 1229 which as shown in Fig. 99 lies in the path of a bag as it enters Station 12. As the bag passes this trip lever, the latter is depressed, rotating the shaft 1224 and the rocker lever 1223 from the full line position of Fig. 105 to the dotted line position. The bar 1220 is then forced outwardly from the position shown in Fig. 104 to the position shown in Fig. 105.

On the end of the shaft 365 is secured a cam 1240 on which rolls a cam-follower-roller 1241 journaled on the end of a lever 1242 secured on a shaft 1243 which is journaled in a bracket 1244 (Fig. 97) and carries a lever 1245 which carries at its outer end, a pin 1246 which is adapted to engage a notch 1247 in the bar 1220. The extent to which the finger 1216 can be rotated as shown in Fig. 104 is fixed by a stop 1248 and an adjusting screw 1249 on the lever 1250 on the shaft 1217. A spring 1251 urges the finger 1216 toward the position shown in Fig. 104.

From the foregoing, it will be seen that on each revolution of the shaft 365 a roller 1241 will drop into a depression 1240—A thereby tending to release the pin 1246 from the notch 1247 in the bar 1220. If, at the instant the roller 1241 enters the depression 1240—A, the trip finger 1229 (Fig. 99) on the shaft 1224 is depressed by a bag passing from Station 11 to Station 12, the bar 1220 will be held in the position shown in Fig. 105 by the roller 1222 and when the roller passes out of the notch and onto the dwell portion of the cam, the pin 1246 will again engage the depression 1247 in the bar and will remain locked in that position as shown in Fig. 105 even after the bag has passed the trip finger 1229 of Fig. 99. When therefor, the cam 1240 is again turned so that the roller 1241 rides the high point of the cam as shown in Fig. 105, the finger 1216 is withdrawn and the shaft 1200 is permitted to make one revolution when it is again caught by the finger 1216, and held until again released. During one revolution of the shaft 1200, the gear 1193 and the inverter frame makes one-half a revolution.

It is essential that the bag holding frame stops each time with the frame in the vertical position as shown in Fig. 100. This I accomplish by providing two notches 1260 in the ring 1192. A roller 1261 on one arm of a bell-crank 1262 is urged toward the ring by a spring 1263. This insures the bag holding frame stopping in the right position.

The ejector ram
(Station 12)

The ejector ram for ejecting the sealed bags from the machine is shown in Figs. 35, 97, 98, and 99. A ram 1280 has a guide bar 1281 slidably mounted for horizontal movement in guide ways 1282 on the castings 383 and 384. A link 1285 is pivotably connected to this bar at one end and at the other to a crank 1286. This crank is adjustably mounted upon an intermittent gear 1287 which meshes with and is driven by an interrupted gear 1288 on a shaft 1289 which is journaled at the top in the casting 382 at the bottom in the disc 381 as shown in Fig. 35. The shaft 1289 has a sprocket 1290 adjustably mounted thereon. This sprocket is driven by the chain 137.

The several parts driving the ram are so timed as to cause the ram to move forward after each movement of the turn table. In Fig. 98 is shown the ram in the retracted position. Figs. 99 and 114 show the ram in its most forwardly position. It returns each time to the retracted position of Fig. 98 and remains there until it is again actuated.

The back of each pocket which will later be described in detail is provided with a vertical opening through which the ram operates. Thus with a bag in the inverter, and standing on its closed end as shown in Fig. 98, nothing will happen when next the ram moves forward unless there is a bag in Station 12. From the apparatus as previously described, it will be seen that the inverter will not move until another bag is fed to Station 12. With a bag in Station 12, however, the ram will cause the bag which is still upright in Station 12 to move the inverted bag out of the inverter and itself to replace the inverted bag in the inverter. On the next movement of the machine, the upright bag will then be inverted. The ram moves during the time the roller 1241 (Fig. 105) is traveling on the dwell portion of the cam 1240, while the turn table moves during the time this roller is on the high point of the cam.

Conveyor D

Referring to Figs. 4, 98, 99, 107, 108, 109 the conveyor D transfers the closed and sealed bags away from the machine and has a stationary frame 1300 which has a brace 1301 (Fig. 99) by means of which one corner is supported from the frame of the sealer. Another corner is secured to the frame of the shaper by a brace 1302 while an adjustable support 1303 (Fig. 107) rests upon the floor. An adjustable conveyor frame 1304 has four screws 1305 which extend vertically through the frame 1300, and have worm-wheels 1306 secured thereon, each worm-wheel being operated by means of a worm 1307 on shafts 1308, 1309, which are simultaneously driven by means of sprockets and a chain 1310. One of these shafts has a squared end 1311 for the reception of a hand crank. By turning the shaft 1309, the adjustable conveyor frame is raised and lowered to accommodate bags of different sizes which are to be delivered by the machine.

Head and tail shafts 1312 and 1313 of the conveyor, are suitably journaled in the adjustable frame and carry a conveyor belt 1314. The shaft 1312 has a sprocket 1315 and a chain 1316 by means of which it is driven by a sprocket 1317 on the shaft 1318, the latter having a bevel gear 1319 which meshes with a bevel gear 1320 on a shaft 1321. This shaft is splined in the hub of a sprocket 1322 which is journaled in the stationary frame 1300. This sprocket is driven through a chain 1323 from a sprocket 1324 keyed to the driven sprocket 1202 of the sealer. Thus, the conveyor belt 1314 is driven continuously so as to handle bags as they leave the sealer. The bags are then usually passed to another conveyor belt 1325 (Figs. 1 and 107) to permit the glue to dry. For convenience, I have provided a stationary plate 1326 at the receiving end of the conveyor D to hold a bag as shown in Fig. 98 after it has been forced out of the inverter by the ram and until it in turn is forced onto the conveyor D by the next succeeding bag.

*Adapters for bags of various sizes*

Referring to Figs. 3, 25, 27 and 28, the various stations of the shaper are separated by partitions 1327 extending upwardly from the turn table 120, to which they are bolted as shown in Fig. 28, and have extensions 1328 which are secured together by an annular band 1329. These are used in this form without adapters for full-sized bags, namely 24½-lb. flour bags as shown in Fig. 8.

Where smaller sized bags are used, however, adapters 1336 are placed over the partitions to which they are secured by means of bolts 1337. These adapters have inwardly turned bottom portions which carry dowel pins 1338 which are adapted to be placed in spaced openings 1339 for accurately positioning the adapters on the turn table.

Adapters are necessary throughout the machine for accommodating the smaller sized bags. For example, in Fig. 29, an adapter 1340 is secured to the face of the holding plate 300 of Fig. 9.

The smaller bags must be raised as shown in Fig. 27 so that the height of the bag tops shall be substantially the same for all sizes of bags.

The stations of the sealer are separated by annular partitions 1350 as shown in Figs. 99 and 102 which are bolted to the turn table 121. For the larger sized bags, a spacer 1351 is used which is slightly inwardly and upwardly inclined and is secured by means of a key-shaped member 1352 in a slot 1353 in the side-walls of the partition. The adapter has at its upper end a member 1354 which carries dowels 1355 which engage holes 1356 in the upper portion of the partition members and are secured therein by means of a plate 1357 and cap screws 1358.

In Figs. 111 and 112 is shown an adapter for a smaller sized bag. This adapter consists of sheet metal side-walls 1365 and a bottom 1366 which is made adjustable on the side-walls as shown in Fig. 113. The side-walls 1365 carry dowels 1367 adapted to engage in holes 1368 in the turn table 121. The upper ends of these adapters are secured by means of dowels 1369 in the holes 1356.

It will be observed at this time, that the side-walls of the partitions and adapters are cut away as shown at 1370, Figs. 99 and 112, for the passage of the trip levers.

Referring to Figs. 3, 4 and 91, an apron made up of sections 1371 surrounds the bags at Stations 8, 9, 10 and 11 on the turn table 121 of the sealer and is adjustably secured to the vertical frame as 396, 564, 884 and 1102 by means of slotted brackets 1372 and cap-screws 1373. These permit adjustment radially for various sized bags.

Other adapters required for smaller bags are shown in Figs. 29, 114, etc. Thus an adapter plate 1374 is bolted to the stop plate 292 and an adapter plate 1375 is bolted to the face of the ram 250.

While the bags of all sizes rest upon the top of the turn table 120 of the shaper, the smaller bags are raised and rest upon raised ledges 1366 as shown in Figs. 27. It is necessary to raise the bags at Station 6 to a point slightly higher than the ledge 1366 before the bag is transferred thereto by the ram. To do this, I have provided a lifting foot 1380 which normally lies below the level of the turn table as shown in Figs. 22 and 27 and which is vertically slidable in guide ways 1381. This foot connects through a link 1382 which is connected through an arm 1383 to a plate 1384 which is mounted on a shaft 1385. Another plate 1386 lies adjacent to plate 1384 and is adjustably secured thereto by means of bolts 1387. The plate 1386 carries an arm 1388 which has at its outer end a roller 1389 which rolls upon the face of a cam 1390 secured to the shaft 1205. In Fig. 22 the bag lifting mechanism is shown in inoperative position.

These parts are so timed that the foot 1380 raises the bag of flour or the like at Station 6 of the shaper just before the ram forces the bag forward to Station 7 of the sealer as shown in Fig. 27. Otherwise the operation of transferring the bag and of gripping the same by means of the gripping fingers 196, is the same as that heretofore described.

Thus it will be seen that I have provided a unitary means for automatically shaping the top of a filled paper bag and for closing and sealing the same.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. In a bag closing and sealing machine, means for intermittently conveying a succession of filled bags through the machine, means for longitudinally intucking a bag, means for transversely scoring the top of a bag preparatory to closing, means for gluing the top of the bag, means for transversely folding the bag top, means for closing the bag top, and means for inverting the bag so that it stands on the glued top until the glue is partially set.

2. In a bag closing and sealing machine, means for intermittently conveying a succession of filled bags through the machine, means for longitudinally intucking and tranversely scoring the top of a bag preparatory to closing, means for gluing the top of a bag at the gluing station, means for folding the bag top, means for closing the bag top, means operated by the bag for actuating the gluing means only when a bag is in the gluing station, and means for inverting the bag so that it stands on the glued top until the glue is partially set.

3. In a bag closing and sealing machine, means for intermittently conveying a succession of filled bags through the machine, means for longitudinally intucking and transversely scoring the top of a bag preparatory to closing, means for gluing the top of a bag at the gluing station, means for folding the bag top, means for closing the bag top, and inverting mechanism, and means operated by a bag fed to the inverting mechanism for actuating the same to invert that bag.

4. In a bag closing and sealing machine, means for intermittently conveying a succession of filled bags through the machine, spaced spreader plates, means for inserting the same into the top of the open bag, means for gripping the sides of the bag top about the spreader plates, means for holding the bag top open during this gripping operation, means for gluing the bag top, and means for folding and closing the same.

5. In a bag closing and sealing machine, means for intermittently conveying a succession of filled bags through the machine, spaced spreader plates, means for inserting the same into the top of the open bag, means for gripping the sides of the bag top against the spreader plates, means for folding the sides of the bag top about the spreader plates and tucking the bag between the same to form gussets, means for transversely scoring the bag top, means for gluing the bag top, means for folding the bag top along the score lines, and means for closing the same.

6. In a bag closing and sealing machine, means for intermittently conveying a succession of filled bags through the machine, spaced spreader plates, means for inserting the same into the top of the open bag, means for gripping the sides of the bag top against the spreader plates, means for holding the bag top open during this gripping operation, means for tucking the ends of the bag top between the spreader plates, means for swinging the spreader plates and gripping means toward each other so as to grip and lift the bag by the top to effect a transverse scoring thereof, means for gluing the bag top, means for folding the bag top along the score lines, and means for closing the same.

7. In a bag closing and sealing machine, means for intermittently conveying a succession of filled bags through the machine, a carriage movable up and down above a top-forming station on the conveyor and adapted to receive a bag to be closed, spaced spreader plates hingedly mounted on said carriage, operating arms hingedly mounted adjacent the spreader plates, gripper plates slidably mounted on the operating arms, means for raising and lowering the carriage and spreader plates with respect to the gripper plates, means for swinging the gripper plates toward each other so as to grip the bag top between the gripper plates and the spreader plates, means for depressing the gripper plates below the level of the spreader plates while still gripping the bag top, and means for forcing the spreader plates apart to open the bag top above the gripper plates for the later reception of glue.

8. In a bag closing and sealing machine, means for intermittently conveying a succession of filled bags through the machine, a carriage movable up and down above a top-forming station on the conveyor and adapted to receive a bag to be closed, spaced spreader plates hingedly mounted on said carriage, operating arms hingedly mounted adjacent the spreader plates, gripper plates slidably mounted on the operating arms, means for raising and lowering the carriage and spreader plates with respect to the gripper plates, lugs on the outside faces of the spreader plates having undercut grooves adapted to cooperate with the gripper plates to further grip and score the bag top, means for swinging the gripper plates toward each other so as to grip the bag top between the gripper plates and the spreader plates, means for depressing the gripper plates below the level of the spreader plates while still gripping the bag top, means for forcing the spreader plates apart to open the bag top above the gripper plates for the reception of glue, means for applying glue to the open bag top, means for folding the bag top along the score line, and means for closing the top of the bag.

9. In a bag closing and sealing machine, means for intermittently conveying a succession of filled bags through the machine, means for longitudinally intucking and for transversely scoring the top of a bag preparatory to closing, means for gluing the top of a bag at the gluing station, means for closing the bag top, means for applying glue to the exterior of the bag top, means for folding the bag top about the score lines into sealing engagement with the top of the bag body, the conveying means comprising a turn table, and means for driving the several means in predetermined order.

10. In a bag closing and sealing machine, means for intermittently conveying a succession of filled bags through the machine, means for longitudinally intucking and for transversely scoring the top of a bag preparatory to closing, means for gluing the top of a bag, means for closing the bag top, means for applying glue to the exterior of the bag top, means for folding the bag top about the score lines into sealing engagement with the top of the bag body, the conveying means comprising two adjacent turn tables geared to run in opposite directions, and means for driving the several means in predetermined order.

11. In a bag closing and sealing machine, means for intermittently conveying a succession of filled bags through the machine, means for longitudinally and transversely scoring the top of a bag preparatory to closing, means for gluing the top of a bag, means for closing the bag top, means for folding the bag top, the conveying means comprising two adjacent turn tables geared to run in opposite directions, means for adapting the machine to use bags of different sizes, means for lifting the bag from the normal level to the level of the first adapter, and means for driving the several means in predetermined order.

12. In a bag closing and sealing machine, means for intermittently conveying a succession of filled bags through the machine, means for longitudinally and transversely scoring the top of a bag preparatory to closing, means for gluing the top of a bag, means for closing the bag top, means for folding the bag top, the conveying means comprising two adjacent turn tables geared to run in opposite directions, means for adapting the machine to use bags of different sizes, and means for lifting the bag from the last station of the first turn table to the level of the adapter in the first station of the second turn table.

13. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, means for applying glue to an outside surface and for removing any excess glue from the first gluing operation, means for closing the bag top, and means for sealing the same.

14. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, the last-mentioned means including a gluing roller which applies glue to an outer surface and removes excess glue from the first gluing operation, means for closing the bag top and means for sealing the same.

15. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, the last-mentioned means including a gluing roller which applies glue to an outer surface and removes excess glue from the first gluing operation, means for simultaneously compacting and shaping the top of the bag and contents, and means for closing and sealing the bag top.

16. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, the last-mentioned means including a gluing roller which applies glue to an outer surface and removes excess glue from the first-mentioned gluing operation, bag-operated means for preventing the operation of the means for spreading glue and of the means for applying glue to an outside surface when no bag is present, and means for closing and sealing the bag top.

17. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, the last-mentioned means including a gluing roller which applies glue to an outer surface and removes excess glue from the first-mentioned gluing operation, a closure plate for pressing the upper portion of the bag top into contact with the bag top, and a pressure plate for subsequently squeezing out air from the top of the bag while the closure plate remains pressed down, the closure plate and pressure plate continuing to descend to flatten and shape the bag top and contents and for completing the sealing of the bag top.

18. In a bag closing and sealing machine, means for intermittently conveying a succession of filled bags through the machine, means for longitudinally and transversely scoring the top of a bag preparatory to closing, means for gluing the inside meeting surfaces of the bag top, means for pressing said surfaces together to spread the glue thereon, the last-mentioned means including a gluing roller which applies glue to an outer surface and removes excess glue from the first-mentioned gluing operation, a closure plate for pressing the upper portion of the bag top into contact with the bag top, and a pressure plate for subsequently squeezing out air from the top of the bag while the closure plate remains pressed down, the closure plate and pressure plate continuing to descend to flatten and shape the bag top and contents, the bag top protruding slightly beyond the closure plate, and means for later pressing the protruding portion into contact with the bag top to complete the sealing.

19. In a bag closing and sealing machine, means for conveying a succession of filled bags through the machine, means for partially closing the bag top, means for gluing the bag top, means for folding and closing the bag top, a frame having a rectangular opening substantially the size and shape of the bag, means for moving the sealed bag into said opening, means for rotating the frame 180° to invert the bag onto its glued top.

20. In a bag closing and sealing machine, means for conveying a succession of filled bags through the machine, spaced spreader plates, means for inserting the same into the top of the open bag, means for gripping the sides of the bag top against the spreader plates, means for holding the bag top open during the gripping operation, means for folding the sides of the bag top about the spreader plates and between the same, means including spaced pivots about which the spreader plates and gripping means swing for swinging the spreader plates and gripping means toward each other so as to grip and lift the bag by the top to effect a transverse scoring thereof, means for gluing the bag top, means for folding the bag top along the score lines, and means for closing the same.

21. In a bag closing and sealing machine, means for intermittently conveying a succession of filled bags through the machine, spaced spreader plates having side lugs, means for inserting the same into the top of the open bag, means for progressively gripping and scoring the bag top about the spreader plates and side lugs, means for gluing the bag top, and means for folding and closing the same.

22. In a bag closing and sealing machine, means for intermittently conveying a succession of filled bags through the machine, spaced spreader plates, means for inserting the same into the top of the open bag, a tucker plate at each side of the spreader plate, means for moving the tucker plates from opposite sides between the spreader plates to tuck the paper bag therebetween, means associated with the spreader plates for scoring the bag top, means for gluing the bag top, means for folding the bag top along the score lines, means for applying glue to the outer upper surface of the bag and means for closing the bag.

23. In a bag closing and sealing machine, means for intermittently conveying a succession of filled bags through the machine, spaced spreader plates, means for inserting the same into the top of the open bag, means tending to separate the spreader plates, an undercut lug on the outer side of each spreader plate, a gripper plate on the outside of each spreader plate having a tongue adapted to coact with the undercut lugs to grip a bag top therebetween in such a way as to cause the top of the bag to flare outwardly from an intermediate transversely scored portion, means for applying pressure by the gripper plates, means for withdrawing the spreader plates from between the gripper plates while a bag top is gripped by the latter, whereby the bag top is spread, means for applying glue to the bag top, and means for closing and sealing the bag top.

24. In a bag closing and sealing machine, means for intermittently conveying a succession of filled bags through the machine, means for intucking the bag top, means for pressing the sides of the bag upon the intucked portions, gripping means for making a score line and for holding the top closed along a horizontal line intermediate the height of the top leaving an upper ungripped portion, means for spreading this upper portion and for holding it open, means for applying glue to the inner surfaces, and means for closing the bag top.

25. In a bag closing and sealing machine, means for intermittently conveying a succession of filled bags through the machine, means for intucking the bag top, means for pressing the sides of the bag upon the intucked portions, gripping means for making a score line and for holding the top closed along a horizontal line intermediate the height of the top leaving an upper ungripped portion, fingers hingedly mounted to move about lines above and to the sides of the line where gripping occurs, means for moving said fingers downwardly and outwardly for spreading this upper portion and for holding it open, means for applying glue to the inner surfaces, and means for closing the bag top.

26. In a bag closing and sealing machine, means for intermittently conveying a succession of filled bags through the machine and leaving them at intervals at spaced stations, vertical pressure plates at spaced stations, and means for moving the plates inwardly from opposite sides for laterally compressing the bags to shape them.

27. In a bag closing and sealing machine, a shaper unit comprising means for intermittently conveying a succession of filled bags through the machine and leaving them at intervals at spaced stations, vertical pressure plates at spaced stations, means for moving the plates inwardly from opposite sides for laterally compressing the bags to shape them, means for moving the bags laterally out of the shaper unit, and gripping fingers associated with the moving means for gripping the open tops of the bags to prevent them from toppling over while being moved out of the shaper unit.

28. In a bag closing and sealing machine, means for intucking the ends of the bag top, means for pressing the sides of the bag top on the intucked ends to close the bag top in a vertical plane offset from the center of the bag whereby one side of the bag top will overlap the other, means for gluing the bag top, and means for folding the glued overlapping top down into sealing engagement with the horizontal bag top so as to enclose the under side.

29. In a bag closing and sealing machine, means for intucking the ends of the bag top, means for pressing the sides of the bag top on the intucked ends to close the bag top in a vertical plane offset from the center of the bag whereby one side of the bag top will overlap the other, means for opening the bag top, means for applying glue to the interior surfaces of the bag top, means for applying glue to the intucked sides, means for applying glue to the side of the bag top having the overlapping portion, and means for folding and pressing the overlapping portion into sealing engagement with the bag body.

30. In a bag closing and sealing machine, a rotary turntable, a series of spacers thereon forming stations for the reception of filled paper bags, a stationary frame, a series of aprons secured to the frame and disposed about the table so that each apron lies in front of a station of the turntable, and means for adjusting each apron with respect to its station to handle various sized bags.

HELMER ANDERSON.